United States Patent [19]

Dubois et al.

[11] Patent Number: 5,147,905
[45] Date of Patent: Sep. 15, 1992

[54] ADVANCED AND UNADVANCED COMPOSITIONS, NUCLEOPHILIC DERIVATIVES THEREOF AND CURABLE AND COATING COMPOSITIONS THEREOF

[75] Inventors: Robert A. Dubois, Houston; Duane S. Treybig, Lake Jackson; Allyson Malzman, Lake Jackson; Pong S. Sheih, Lake Jackson; Alan R. Whetten, Lake Jackson, all of Tex.

[73] Assignee: The Dow Chemical Company, Midland, Mich.

[21] Appl. No.: 691,881

[22] Filed: May 1, 1991

[51] Int. Cl.$^5$ ............... C08K 3/20; C08L 63/02; C08G 65/10; C08G 59/06
[52] U.S. Cl. ............... 523/404; 523/414; 523/415; 523/416; 523/417; 523/420; 528/103; 528/104; 528/118; 528/120; 528/94
[58] Field of Search ............ 528/103, 104, 118, 120, 528/94; 523/404, 414, 415, 416, 417, 420

[56] References Cited

U.S. PATENT DOCUMENTS

| | | | |
|---|---|---|---|
| 2,965,607 | 12/1960 | Martin et al. | 528/118 |
| 3,297,519 | 1/1967 | Rambosek | 162/164 |
| 3,522,210 | 7/1970 | Sellers et al. | 260/47 |
| 3,839,252 | 10/1974 | Bosso et al. | 204/181 |
| 3,936,405 | 2/1976 | Sturni et al. | 204/181 |
| 3,947,339 | 3/1976 | Jerabek et al. | 204/181 |
| 4,256,844 | 3/1981 | Martin et al. | 525/507 |
| 4,260,720 | 4/1981 | Bosso et al. | 528/109 |
| 4,417,033 | 11/1983 | Bowditch | 525/481 |
| 4,419,467 | 12/1983 | Wismer et al. | 523/414 |
| 4,507,461 | 3/1985 | Bowditch | 528/104 |
| 4,575,523 | 3/1986 | Anderson et al. | 523/414 |
| 4,698,141 | 10/1987 | Anderson et al. | 204/181.7 |
| 4,835,225 | 5/1989 | Massingill, Jr. et al. | 525/481 |
| 4,863,575 | 9/1989 | Anderson et al. | 204/181.7 |
| 4,868,230 | 9/1989 | Rao et al. | 523/403 |

FOREIGN PATENT DOCUMENTS 0253405 12/1988 European Pat. Off.
0315164 5/1989 European Pat. Off.

OTHER PUBLICATIONS

Chem. Abstract 112:76592m (1990) (Jpn. Kokai JP01/163,145 published Jun. 27, 1989 by Harada, Taira Daikin Industries, Ltd.).
Chem. Abstract 112:78635m (1990) (Jpn. Kokai JP01/207,318 published Aug. 21, 1989 by Mitsui Petrochemical Industires, Ltd.).
Derwent Abstract 88-152736/22; Apr. 4, 1988.
Chem. Abst. 112:8764d; May 9, 1989.

Primary Examiner—Melvyn I. Marquis
Assistant Examiner—Christopher P. Rogers

[57] ABSTRACT

Advanced resins and unadvanced epoxy resins are disclosed wherein the unadvanced compound and at least a portion of the advanced epoxy resin contains at least one $-O-R^1-O-$ or $-(O-CH_2-CHR^2)_n-O-$ group as a bridge between two groups selected independently from the group consisting of (1) a saturated or unsaturated cycloaliphatic group, (2) an aromatic group, (3) a group represented by the formula

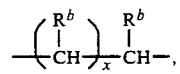

or (4) a group represented by the formula

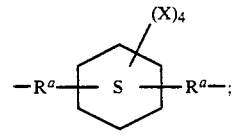

Also disclosed are nucleophilic derivatives thereof, as well as curable compositions and coating compositions containing the advanced or unadvanced epoxy resins or nucleophilic modified advanced or unadvanced epoxy resins. These advanced resins and unadvanced epoxy resins provide coatings with good flexibility or formability as exhibited by good flexural or formable properties determined by reverse impact, T-bend and wedge-bend tests, chip resistance, and with good corrosion resistance and throwpower.

5 Claims, No Drawings

ADVANCED AND UNADVANCED COMPOSITIONS, NUCLEOPHILIC DERIVATIVES THEREOF AND CURABLE AND COATING COMPOSITIONS THEREOF

The present invention concerns advanced and unadvanced resins or compounds wherein the unadvanced resins or compounds and at least a portion of the advanced resins or compounds contains at least one —O—R$^1$—O— or —(O—CH$_2$—CHR$^2$)$_n$—O— group as a bridge between two groups selected independently from the group consisting of (1) a saturated or unsaturated cycloaliphatic group, (2) an aromatic group, (3) a group represented by the formula

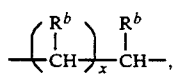

or (4) a group represented by the formula

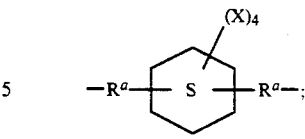

to nucleophilic derivatives thereof; to curable compositions and coating compositions containing the advanced or unadvanced epoxy resins or compounds or nucleophilic modified advanced or unadvanced epoxy resins or compounds.

Advanced epoxy resins have been employed to prepare either water-borne or solvent-borne coating compositions. They are usually prepared by reacting a diglycidyl ether of a bisphenol with the same bisphenol; however, sometimes a different bisphenol is employed. While these resins usually produce coatings with good adhesion and chemical resistance properties, the coatings are often not as flexible or formable as desired. It would be desirable to increase the flexibility or formability of cured compositions of the advanced resins.

One aspect of the present invention pertains to an advanced resin or an unadvanced compound or mixture of such advanced resins and/or unadvanced compounds in any combination represented by the following formulas IA, IB, IC, ID, IE or IF

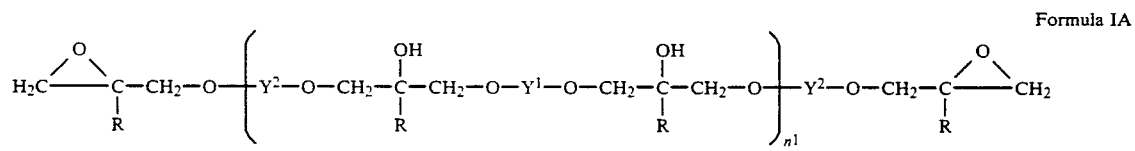

Formula IA

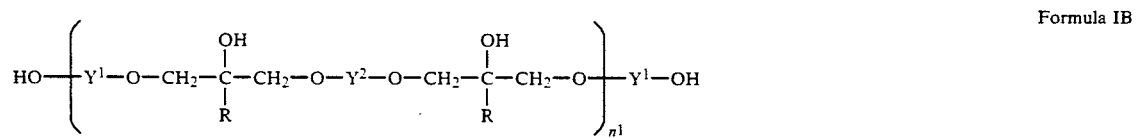

Formula IB

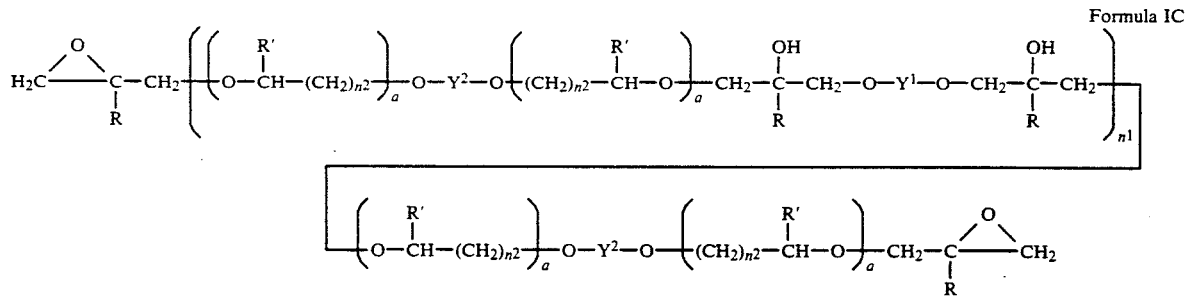

Formula IC

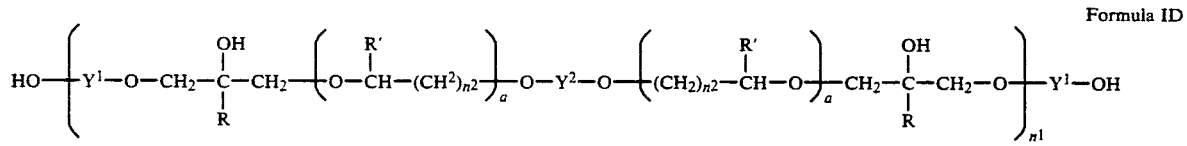

Formula ID

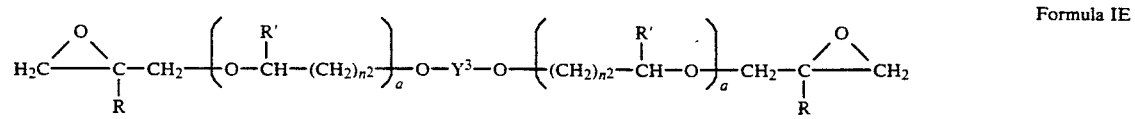

Formula IE

-continued

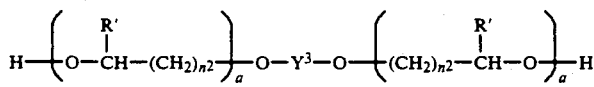

Formula IF wherein each A is independently a single bond, —O—, —S—, —S—S—, —SO—, —SO$_2$—, —CO—, —O—CO—O—, —O—R$^1$—O—, —(O—CH$_2$—CHR$^2$—)$_n$—O— or —R$^3$—; each Q is independently a divalent group represented by the formulas

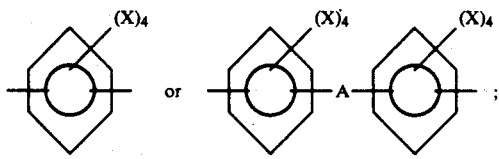

each Q' is independently a divalent saturated or unsaturated aliphatic or cycloaliphatic group having from 2 to 20, preferably from 2 to 15 carbon atoms or Q' is a group represented by the formulas

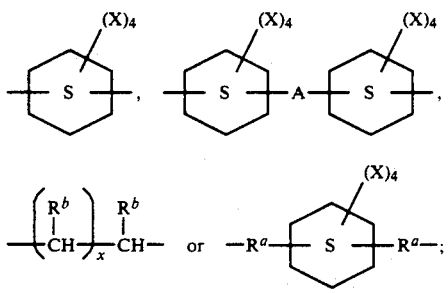

each Q$^1$ is independently a divalent group represented by the formula

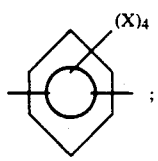

each Q$^2$ is independently a group represented by the formula

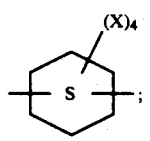

each R is independently hydrogen or a C$_1$ to C$_4$ alkyl group; each R' is independently hydrogen or an alkyl group having from 1 to 6, preferably from 1 to 4 carbon atoms; each R$^a$ is independently a divalent hydrocarbyl group having from 1 to 6, preferably from 1 to 4, more preferably from 1 to 2, carbon atoms; each R$^b$ is independently hydrogen or a monovalent hydrocarbyl group having from 1 to 6, preferably from 1 to 4, more preferably from 1 to 2, carbon atoms; R$^1$ is a divalent hydrocarbyl group having from 1 to 36, preferably from 2 to 24, more preferably from 2 to 12, most preferably from 2 to 8, carbon atoms; R$^2$ is hydrogen, methyl, ethyl or phenyl; R$^3$ is a divalent hydrocarbyl group having from 1 to 36, preferably from 1 to 24, more preferably from 1 to 12, carbon atoms; T is —OR$^1$O— or —(O—CH$_2$—CHR$^2$—)$_n$—O—; each Y$^1$ is independently —(Q—T)$_m$—Q—; each Y$^2$ is independently —(Q—T)$_m$—Q— or —(Q'—T)$_m$—Q', or —(Q—T)$_m$—Q—(O—CH$_2$—C(OH)(R)—CH$_2$—O—(Q—T)$_m$—Q)$_{n3}$; each Y$^3$ is independently a divalent group represented by the formulas

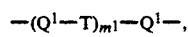

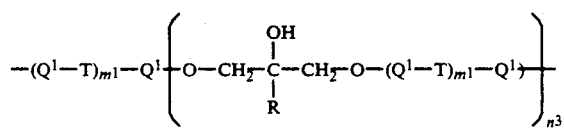

or

each X is independently hydrogen, a halogen, —SO—R$^4$, —SO$_2$—R$^4$, —CO—R$^4$, —CO—O—R$^4$, —O—CO—R$^4$, —S—R$^4$, —OR$^4$, or —R$^4$; R$^4$ is a monovalent hydrocarbyl group having from 1 to 12, preferably from 1 to 10, more preferably from 1 to 8, most preferably from 1 to 6, carbon atoms; each a independently has a value from 1 to 25, preferably from 1 to 15, more preferably from 1 to 10; each m independently has a value from zero to 25, preferably from zero to 10, more preferably from zero to 5; m$^1$ has a value from 1 to 25, preferably from 1 to 10, more preferably from 1 to 5; n has a value from 1 to 10, preferably from 2 to 8, more preferably from 2 to 5; n$^1$ has a value from 1 to 100, preferably from 1 to 80, more preferably from 2 to 60, most preferably from 2 to 30; n$^2$ has a value of 1 or 3; n$^3$ has a value from zero to 10, preferably from 0.1 to 5; and x has a value from 2 to 19, preferably from 3 to 10, more preferably from 3 to 5; with the proviso that at least one of said advanced resins or unadvanced compounds contains at least one —O—R$^1$—O— or —(O—CH$_2$—CHR$^2$)$_n$—O— group as a bridge between two groups selected independently from the group consisting of (1) a saturated or unsaturated cycloaliphatic group, (2) an aromatic group, (3) a group represented by the formula

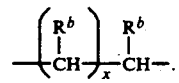

or (4) a group represented by the formula

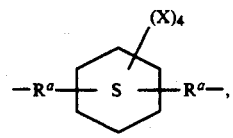

Another aspect of the present invention pertains to an advanced resin prepared by reacting a composition comprising (1) at least one diglycidyl ether of a compound containing an average of more than one but not more than two phenolic hydroxyl groups per molecule; with (2) at least one compound containing an average of more than one but not more than two phenolic hydroxyl groups per molecule;

wherein components (1) and (2) are employed in amounts which provide a ratio of phenolic hydroxyl groups per epoxide group of from 0.5:1 to 2:1; and with the proviso that at least one of the components (1) or (2) contains at least one —O—$R^1$—O— group or an —(O—$CH_2$—$CHR^2$)$_n$—O— group as a bridge between two groups selected independently from the group consisting of (1) a saturated or unsaturated aliphatic group, (2) an aromatic group, (3) a group represented by the formula

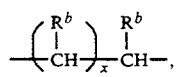

or (4) a group represented by the formula

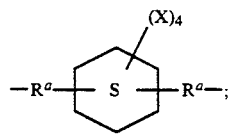

wherein $R^1$ is a divalent hydrocarbyl group having from 1 to 36, preferably from 2 to 24, more preferably from 2 to 12, most preferably from 2 to 8, carbon atoms and $R^2$ is hydrogen, methyl, ethyl or phenyl.

Another aspect of the present invention pertains to an acidified advanced resin or an acidified unadvanced compound resulting from reacting a composition comprising (A) at least one nucleophilic compound;

(B) at least one advanced resin or unadvanced compound or any combination of such advanced resins and/or unadvanced compounds represented by the aforementioned formulas IA, IC or IE

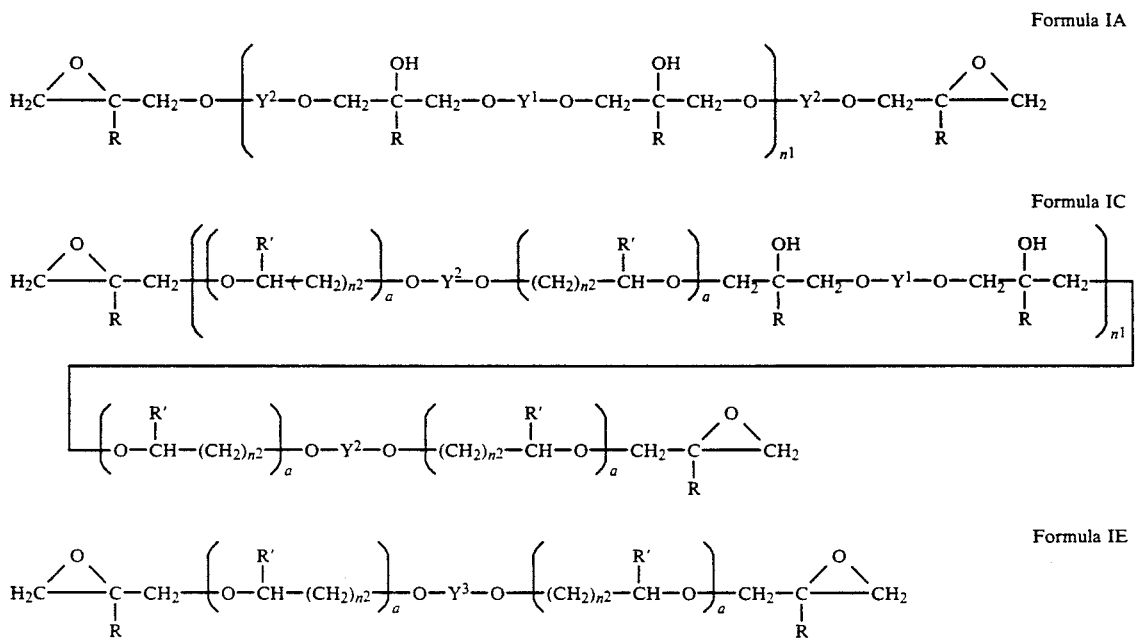

Formula IA

Formula IC

Formula IE wherein A, Q, Q', R, R', $R^a$, $R^b$, $R^1$, $R^2$, $R^3$, T, X, $Y^1$, $Y^2$, $Y^3$, a, m, $m^1$, n, $n^1$, $n^2$, $n^3$ and x are as hereinbefore defined; with the proviso that at least one of said advanced resins or unadvanced compounds contains at least one —O—$R^1$—O— or —(O—$CH_2$—$CHR^2$)$_n$—O— group is present as a bridge between two groups selected independently from the group consisting of (1) a saturated or unsaturated cycloaliphatic group, (2) an aromatic group, (3) a group represented by the formula

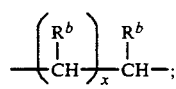

or (4) a group represented by the formula

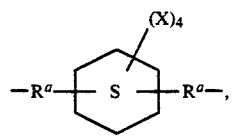

and (C) at least one Broönsted acid.

Another aspect of the present invention pertains to an acidified advanced resin comprising the product resulting from reacting a composition comprising (A) at least one nucleophilic compound;

(B) at least one advanced epoxy resin comprising the product prepared by reacting (1) at least one diglycidyl ether of a compound containing an average of more than one but not more than two phenolic hydroxyl groups per molecule; with (2) at least one compound containing an average of more than one but not more than two phenolic hydroxy groups per molecule;

wherein components (1) and (2) are employed in amounts which provide a ratio of phenolic hydroxyl groups per epoxide group of from 0.5:1 to 2:1; and with the proviso that at least one of the components (1) or (2) contains at least one $-O-R^1-O-$ group or $-(O-CH_2-CHR^2)_n-O-$ group as a bridge between two groups selected independently from the group consisting of (1) a saturated or unsaturated cycloaliphatic group, (2) an aromatic group, (3) a group represented by the formula

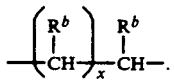

or (4) a group represented by the formula

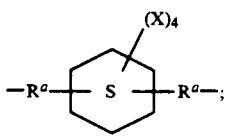

wherein $R^1$ is a divalent hydrocarbyl group having from 1 to 36 carbon atoms, $R^2$ is hydrogen, methyl, ethyl or phenyl, and n has a value from 1 to 10; and (C) at least one Brönsted acid.

Another aspect of the present invention pertains to an aqueous dispersion comprising the aforementioned acidified advanced resin or acidified unadvanced resin and water.

Another aspect of the present invention pertains to curable compositions comprising (I) any of the aforementioned advanced resin compositions and (II) a curing amount of at least one suitable curing agent therefor.

Another aspect of the present invention pertains to a process for coating an aqueous cationic epoxy resin based composition onto an object having an electroconductive surface by steps comprising immersing the electroconductive object into a coating bath comprising an aqueous dispersion of cationic particles of the epoxy based composition, passing an electric current through said bath sufficient to electrodeosite a coating of said composition on the object by providing a difference of electric potential between the object and an electrode that is (a) spaced apart from said object, (b) is in electrical contact with said bath, and (c) is electrically positive in relation to said object; wherein said aqueous cationic epoxy resin based composition contains any of the aforementioned cationic epoxy-containing compositions and a curing amount of a suitable curing agent therefor.

A further aspect of the present invention pertains to a coating composition comprising any of the aforementioned curable compositions.

A still further aspect of the present invention pertains to an article coated with the aforementioned coating compositions which coating has subsequently been cured.

The present invention provides coating with good flexibility or formability as exhibited by good flexural or formable properties determined by reverse impact, T-bend and wedge-bend tests, chip resistance, and with good corrosion resistance and throwpower.

The present invention may suitably comprise, consist of, or consist essentially of, the aforementioned components.

The invention illustratively disclosed herein suitably may be practiced in the absence of any component or substituent group which is not specifically disclosed or enumerated herein.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the element to which it is attached. The term divalent hydrocarbyl group refers to the aforementioned hydrocarbyl groups minus an additional hydrogen atom. The aliphatic and cycloaliphatic groups can be saturated or unsaturated. These hydrocarbyl groups can also contain substituent groups such as halogens including chlorine bromine, fluorine, iodine, nitro, nitrile. Also, these groups can be specifically free of any one or more of such substituent groups. In any of the formulas employed herein, the cyclic group with an S in the middle of the ring indicates a saturated or unsaturated cyclohexyl group wherein the cyclohexyl group can contain one or two unsaturated groups in the ring.

The advanced resins of the present invention can be either terminated in epoxy groups or phenolic hydroxyl groups as desired.

The advanced resins of the present invention can be prepared by reacting the appropriate epoxy resin with the appropriate phenolic hydroxyl-containing compound at a temperature of from 25° C. to 280° C., preferably from 75° C. to 240° C., more preferably from 100° C. to 220° C. for a time sufficient to complete the reaction, usually from 0.025 to 48, preferably from 0.05 to 24, more preferably from 0.01 to 10, hours. Higher reaction temperatures require less time than the lower reaction temperatures. The pressure is not particularly significant except that the reaction is conducted at pressures which will maintain the reactive components and any solvents or reaction medium employed in the liquid phase.

At temperatures below 25° C., little or no reaction occurs.

At temperatures above 280° C., gelation of the reaction mixture occurs and the resin undergoes degradation.

The epoxy resin and the phenolic hydroxyl-containing compound are employed in amounts which provide a ratio of phenolic hydroxyl groups to epoxide groups of from 0.5:1 to 2:1, preferably from 0.7:1 to 1:1, more preferably from 0.75:1 to 0.95:1. In those instances wherein the phenolic hydroxyl groups are present in excess, the majority of the product will be terminated in phenolic hydroxyl groups; whereas in those instances wherein the epoxy groups are present in excess, the majority of the product will be terminated in epoxide groups.

When the ratio of phenolic hydroxyl groups to epoxide group is less than 0.5:1, an excess of unreacted diglycidyl ether remains in the reaction product.

When the ratio of phenolic hydroxyl groups to epoxide group is greater than 2:1, an excess of unreacted diphenol remains in the reaction product.

If desired, the advanced resins can be prepared employing catalytic quantities of a suitable catalyst for the reaction between the epoxide groups and the phenolic hydroxyl groups. Representative examples of such catalysts include metal hydroxides, tertiary amines, phosphines, quaternary ammonium and phosphonium compounds, combinations thereof. Preferred such catalysts include, for example, ethyltriphenylphosphonium chloride, ethyltriphenylphosphonium bromide, ethyltriphenyl phosphonium iodide, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate.acetic acid complex, tetrabutylphosphonium phosphate, triphenylphosphine, N-methylmorpholine, sodium hydroxide, potassium hydroxide, tetrabutyammonium halide, benzyltrimethylammonium chloride butyltriphenylphosphoniumtetrabromo bisphenate, butyltriphenylphosphonium bisphenate, butyltriphenylphosphonium bicarbonate, triethylamine, tripropylamine, tributylamine, 2-methylimidazole, combinations thereof. These catalysts are employed in catalytic amounts and the particular amount depends upon the particular reactants and catalyst being employed. However, usually the amount is from 0.0001 to 10, preferably from 0.05 to 1, more preferably from 0.1 to 0.5, percent by weight based upon the weight of the epoxy resin.

If desired, the advancement reaction can be conducted in the presence of a solvent such as, for example, alcohols, glycol ethers, aromatic hydrocarbons, aliphatic hydrocarbons, ketones, amides, sulfones, cyclic ethers, any combination thereof. Preferred such solvents include, for example, isopropanol, ethanol, butylene glycol methyl ether, diethylene glycol n-butyl ether, diethylene glycol ethyl ether, diethylene glycol methyl ether, dipropylene glycol methyl ether, ethylene glycol n-butyl ether, ethylene glycol ethyl ether, ethylene glycol methyl ether, ethylene glycol phenyl ether, propylene glycol phenyl ether, propylene glycol methyl ether, tripropylene glycol methyl ether, toluene, xylene, decane, cyclohexane, acetone, methyl ethyl ketone, methyl isobutyl ketone, any combination thereof.

Suitable epoxy resins which can be employed to prepare the advanced resins of the present invention (the resins represented by the aforementioned formulas IA, IB, IC, and ID) include those represented by the aforementioned formula IE and the following formula II and III an oxyalkylated polyol represented by the following Formula IV:

wherein Z is $Y^2$ or $Y^3$ and R', $Y^2$, $Y^3$, a and $n^2$ are defined as hereinbefore. The resulting halohydrin product is then dehydrohalogenated by known methods with a basic acting substance, such as sodium hydroxide to produce the corresponding diglycidyl ether.

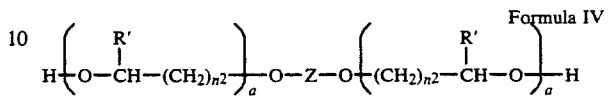

Formula IV

The oxyalkylated diols of Formula IV are produced by reacting a diol of the following Formula V

HO—Z—OH        (Formula V)

wherein Z is defined as hereinbefore, with the appropriate molar ratio of ethylene oxide, propylene oxide, butylene oxide, tetrahydrofuran, styrene oxide or an alkyl or aryl glycidyl ether or mixtures thereof. Combinations of these oxides added in sequential manner can also be used so as to form block copolymers rather than random polymers. Examples of useful diols include, bisphenol A, bisphenol F, hydroquinone, dihydroxydiphenyl oxide, resorcinol, p-xylenol, poly(bisphenol A)ether of ethylene glycol, poly(bisphenol F)ether of ethylene glycol, bisphenol capped epoxy resin, 1,3-cyclohexanediol, 1,4-cyclohexanediol, 1,4-cyclohexanedimethanol, hydrogenated bisphenol A, hydrogenated bisphenol F, butanediol, hexanediol, ethylene glycol, propylene glycol, neopentyl glycol, and any combination thereof.

Some of the common methods of synthesis of the diglycidylethers of aliphatic diols produce significant amounts of organic chloride-containing impurities. However, other processes are known for preparing products with lower levels of such impurities. While the low-chloride resins are not required for the practice of this invention, they can be used, if desired, for possible improvements in the process of preparing the resins, in the storage properties of the resins or formulated coatings made therefrom or in the performance properties of the products.

Particularly suitable epoxy resins include, for example, the diglycidyl ethers of biphenol, bisphenol A, bisphenol F, bisphenol K, bisphenol AP (1,1-bis(4-hydroxyphenyl)-1-phenyl ethane), 1,2-bis(3-hydroxyphenoxy)ethane, 1,4-bis(3-hydroxyphenoxy)butane, 1,4-

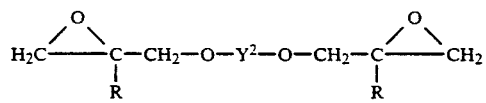

Formula II

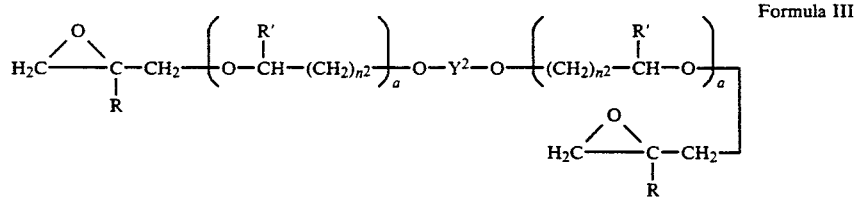

Formula III wherein R, R', $Y^2$, $Y^3$, a, and $n^2$ are as hereinbefore defined.

The glycidyl ethers of the oxyalkylated diols are produced by the condensation of an epihalohydrin with bis(4-hydroxyphenoxy)butane, 1,8-bis(3-hydroxyphenoxy)octane, 1,8-bis(4-hydroxyphenoxy)octane, 1,10-bis(4-hydroxyphenoxy)decane, 1,12-bis(4-hydroxyphenoxy)decane, the reaction product of bisphenol A or bisphenol F with from 2 to 6 moles of propylene oxide or ethylene oxide, poly(bisphenol A)ether of ethylene glycol, poly(bisphenol F)ether of ethylene glycol, any combination thereof.

Suitable phenolic hydroxyl-containing compounds which can be employed herein include, for example, those represented by the aforementioned formula IB and following formula VIA or VIB

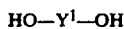   (Formula VIA)

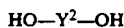   (Formula VIB)

wherein $Y^1$ and $Y^2$ are as previously defined.

Particularly suitable phenolic hydroxyl-containing compounds which can be employed herein include, for example, biphenol, bisphenol A, bisphenol F, bisphenol K, bisphenol AP (1,1-bis(4-hydroxyphenyl)-1-phenyl ethane), 1,2-bis(3-hydroxyphenoxy)ethane, 1,4-bis(3-hydroxyphenoxy)butane, 1,4-bis(4-hydroxyphenoxy)butane, 1,8-bis(3-hydroxyphenoxy)octane, 1,8-bis(4-hydroxyphenoxy)octane, 1,10-bis(4-hydroxyphenoxy)octane, 1,12-bis(4-hydroxyphenoxy)dodecane, poly(bisphenol A)ether of ethylene glycol, poly(bisphenol F)ether of ethylene glycol, any combination thereof.

Most of the phenols are well known as well as the procedures for their preparation. However, those wherein A is an $-O-R^1-O-$ or an $-(O-CH_2-CHR^2)_n-O-$ group can be prepared by reacting a catechol, hydroquinone, resorcinol, bisphenol A, bisphenol F, or bisphenol K with the appropriate dihalogen containing compound, i.e. those represented by the formulas $Hal-R^1-Hal$ or $Hal-CH_2-CHR^2-(O-CH_2-CHR^2)_{n4}-Hal$; wherein $R^1$ and $R^2$ are as hereinbefore defined, Hal is a halogen, preferably chlorine or bromine and $n^4$ has a value from zero to 9, at a temperature of from 0° C. to 200° C., preferably from 25° C. to 150° C., more preferably from 50° C. to 125° C., in the presence of a hydrogen halide scavenging compound for a time sufficient to complete the reaction, usually from 0.1 to 24, preferably from 0.5 to 10, more preferably from 1 to 5, hours. The higher reaction temperatures require less time to complete the reaction whereas the lower temperatures require more time to complete the reaction. The reaction is usually conducted in the presence of water or ethanol so as to reduce the viscosity of the slurried reaction mixture and make it more susceptible to stirring by conventional means. The particular amount of water being that amount which provides the desired stirring viscosity, and can vary from as little as 2 to as much as 30, preferably from 3 to 20, more preferably from 5 to 10, percent by weight based upon the amount of phenolic hydroxyl-containing compound employed. The particular amount of ethanol can vary from 2 to 500, preferably from 10 to 200, more preferably from 50 to 150 percent by weight based upon the amount of phenolic hydroxyl-containing compound employed.

At temperatures below 0° C., little or no reaction occurs.

At temperatures above 200° C., the yield significantly decreases as a result of side reactions.

Hydrogen halide scavenging compounds which can be employed herein include, for example, alkali metal hydroxides, alkali metal carbonates, alkaline earth metal hydroxides, alkaline earth metal carbonates. Preferred hydrogen halide scavenging compounds include, for example, sodium hydroxide, potassium hydroxide, lithium hydroxide, any combination thereof.

In those instances where it is desirable to have a water-borne coating composition, the advanced resin can be rendered water compatible i.e. water soluble or miscible. This can be accomplished by reacting the advanced resins of the present invention including mixtures of these advanced resins with a different epoxy resin having an average of more than one vicinal epoxide group per molecule with one or more nucleophilic compounds.

The nucleophilic compound is suitably employed in an amount sufficient to convert at least a portion of the epoxy groups to cationic groups or cation-forming groups. When the nucleophilic compound is added to the epoxy-containing compound in the presence of an acid, a cationic group is formed. When the nucleophilic compound is added to the epoxy-containing compound in the absence of an acid, an adduct of the epoxy-containing compound and the nucleophilic compound is formed which is a cation-forming group which forms a cationic group when an acid is added. The nucleophilic compound is usually employed in an amount which provides a ratio of moles of nucleophilic compound per epoxide group of from 0.15:1 to 1.1:1, preferably from 0.4:1 to 1:1, more preferably from 0.7:1 to 0.9:1, in the presence of a Brönsted acid.

At ratios of moles of nucleophilic compound per epoxide group less than 0.15:1, an unstable aqueous dispersion is usually obtained because it has a low charge density.

At ratios of moles of nucleophilic compound per epoxide group greater than 1.1:1 an aqueous solution is usually obtained. Whether this stoichiometry results in an aqueous solution or dispersion depends upon the molecular weight of the epoxy resin. With a low (<2,000) number average molecular weight epoxy resin, the 1.1:1 stoichiometry gives a solution in most instances. With a high (>2,000) number average molecular weight epoxy resin, the 1.1:1 stoichiometry may give a dispersion rather than a solution.

The reaction is usually conducted at temperatures of from 25° C. to 110° C., preferably from 60° C. to 100° C., more preferably from 70° C. to 90° C., for a time sufficient to complete the desired reaction, usually from 0.5 to 24, preferably from 1 to 12, more preferably from 2 to 8, hours. The higher reaction temperatures require less time than the lower reaction temperatures.

At temperatures below 25° C., the reaction is too slow to be practical.

At temperatures above 110° C., the reaction is often accompanied by undesirable side reactions.

For water-borne systems, the charge density of the solid resin is used to determine the quantity of nucleophilic compound per epoxy group contained in the epoxy resin. The charge density is the milliequivalents of nucleophilic compound per gram of solid. A larger charge density is required for a high molecular weight epoxy resin than a low epoxy resin to obtain a dispersion. For the same molecular weight epoxy resin, a low charge density gives an aqueous dispersion whereas a higher charge density may give an aqueous solution. The charge density may vary from 0.08 to 1.4, preferably from 0.35 to 0.6, more preferably from 0.35 to 0.45, milliequivalents of nucleophilic compound per gram of solid. The ratio of epoxy-containing reactant/nucleophilic compound/Brösted acid is variable so long as the reaction mixture is at neutral or acid pH. Stoichiometry of the reaction requires 1 equivalent of nucleophilic compound and 1 equivalent of acid per vicinal epoxy group converted. In order to form the instant nucleophilic compounds from strong acids, an excess of the nucleophilic compound is required. With weaker acids, good results can be achieved by using substantially stoichiometric amounts of reactants although a slight excess or deficiency of the epoxy-containing reactant or pyridine can be used. With still weaker acids a slight excess of acid is preferred to maximize the yield of nucleophilic compound salts. Good results have been achieved using a ratio of 1.1 equivalents of weak acid and one equivalent of nucleophilic compound per epoxide equivalent.

The amount of water that is included in the reaction mixture, for water-borne compositions, can be varied to convenience so long as there is sufficient acid and water present to stabilize nucleophilic compound salt formed during the course of the reaction. Normally, it has been found preferably to include water in the reaction in amounts of from 10 to 30 moles per epoxy equivalent.

The aqueous compositions of the present invention can also contain any amount of an organic solvent such as ethylene glycol monobutyl ether. These solvents are usually employed in amounts of from 1 to 75, preferably from 4 to 35, more preferably from 6 to 18, percent by weight based upon the weight of the aqueous dispersion or solution.

Usually, the Brösted acid is employed in amounts which provides a ratio of moles of acid to moles of nucleophilic compound of from 0.2:1 to 10:1, preferably from 0.5:1 to 1.5:1, more preferably from 1:1 to 1.1:1.

The nucleophilic compounds which are used advantageously in forming the cations required for forming the cationic resins in this invention are represented by the following classes of compounds, sometimes called Lewis bases:
(a) monobasic heteroaromatic nitrogen compounds;
(b) tetra (lower alkyl)thioureas;
(c) $R^5$—S—$R^6$ wherein $R^5$ and $R^6$ individually are lower alkyl, hydroxy lower alkyl or are combined as one divalent acyclic aliphatic radical having 3 to 5 carbon atoms;
(d)

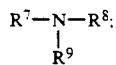

wherein $R^8$ and $R^9$ individually are lower alkyl, hydroxy lower alkyl,

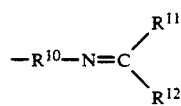

or are combined as one divalent acyclic aliphatic radical having from 3 to 5 carbon atoms, $R^{10}$ is a divalent acyclic aliphatic group having from 2 to 10 carbon atoms, $R^{11}$ and $R^{12}$ individually are lower alkyl and $R^7$ is hydrogen or lower alkyl, aralkyl or aryl, except that when $R^8$ and $R^9$ together are a divalent acyclic aliphatic group then $R^7$ is hydrogen, lower alkyl or hydroxyalkyl and when either or both of $R^8$ and $R^9$ is

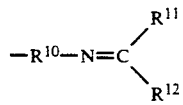

then $R^7$ is hydrogen; or
(e)

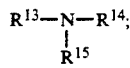

wherein $R^{13}$, $R^{14}$ and $R^{15}$ individually are lower alkyl, hydroxy lower alkyl or aryl.

By the term lower it is meant a group having from 1 to 10, preferably from 1 to 6, more preferably from 1 to 4, carbon atoms.

Suitable pyridine compounds which can be employed herein as the nucleophilic compound include monopyridine compounds and polypyridine compounds.

Monopyridine compounds which can be employed herein include, for example, those represented by the following formulas VII–IX

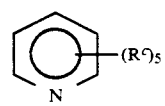

Formula VII

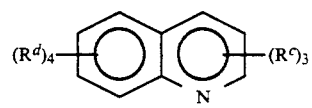

Formula VIII

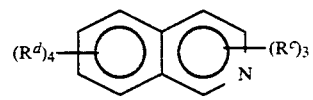

Formula IX wherein each $R^c$ and $R^d$ is independently hydrogen, a halogen atom, particularly chlorine or bromine, a hydrocarbyl or hydrocarbyloxy or a hydroxy substituted hydrocarbyl group having from 1 to 10, preferably from 1 to 4, carbon atoms, a carbamoyl group (—CO—NH$_2$), or a hydroxyl group. Preferred monopyridine compounds include nicotinamide, pyridine, 2-picoline, 3-picoline, 4-picoline, 4-ethylpyridine, 3,4-dimethylpyridine, 3,5-dimethylpyridine, 4-phenylpyridine, 4-propanolpyridine, quinoline, 4-methylquinoline, isoquinoline, mixtures thereof. The most preferred monopyridine compound is nicotinamide.

Polypyridines which can be employed include any compound having more than one pyridine group per molecule. Particularly suitable such pyridine-containing compounds include those represented by the following formulas X-XII

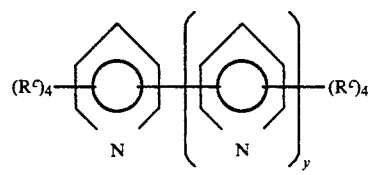

Formula X

-continued

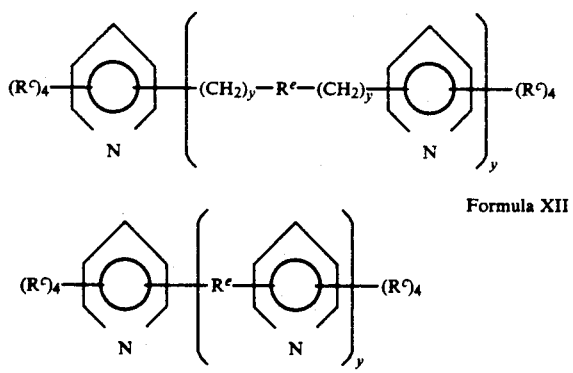

Formula XI

Formula XII wherein each $R^c$ is independently hydrogen, a halogen atom, particularly chlorine or bromine, a hydrocarbyl or hydrocarbyloxy or a hydroxy substituted hydrocarbyl group having from 1 to 10, preferably from 1 to 4, carbon atoms, a carbamoyl group (—CO—NH$_2$), or a hydroxyl group; each $R^e$ is independently an alkyl group having from 1 to 10 carbon atoms, an amine group, a urea group, a thiourea group, a carbonyl group, —S—S— group, —S—CH$_2$—CH$_2$—S— group, —C(OH)H—CO—group, or an amide group; and each y independently has a value from 1 to 5. Particularly suitable polypyridine compounds include, for example, 1,2-bis(4-pyridyl)ethane, 4,4'-trimethylenedipyridine, 3,3'-bipyridine, 4,4'-bipyridine, 4,4'-bipyridinehydrate, 2,3'-bipyridine, 2,4'-bipyridine, 4,4'-dimethyl-2,2'-bipyridine, 1,3-di-(3-picolyl)urea, 1,3-di-(3-picolyl)thiourea, di-(2-picolyl)amine, 2,2'-(3,6-dithiaoctamethylene) dipyridine, trans-1,2-bis(4-pyridyl)ethylene, 2,2',6',2''-terpyridine, aldrithiol-4, 2,2'-bipyridine, alpha-methyl-1,2-di-3-pyridyl-1-propanone, alpha-pyridoin, any combination thereof.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butyl-phosphine, trimethylamine, triethylamine, tri-n-propylamine, triisobutylamine, hydroxyethyl-dimethylamine, butyldimethylamine, trihydroxyethylamine, triphenylphosphorus, N,N,N-dimethylphenethylamine, methyldiethanolamine, dimethylethanolamine, any combination thereof.

Substantially any organic acid, especially a carboxylic acid, can be used in the conversion reaction to form onium salts so long as the acid is sufficiently strong to promote the reaction between the nucleophilic compound and the vicinal epoxide group(s) on the resinous reactant. In the case of the salts formed by addition of acid to a secondary amine-epoxy resin reaction product, the acid should be sufficiently strong to protonate the resultant amine product to the extent desired.

Suitable Brönsted acids which can be employed include any such acid or combination of acids which promotes the reaction between the pyridine compound and the epoxide group and provides a compatible anion in the final product. By "compatible anion", it is meant one which exists in close association with the cationic nitrogen of the pyridine compound for an indefinite period. Monobasic acids are usually preferred. The Bronsted acids can be inorganic or inorganic acids. Preferred inorganic acids which can be employed include, for example, phosphoric acid, hydrochloric acid, hydrobromic acid, nitric acid, sulfuric acid, any combinations thereof. Organic acids which can be employed herein include, for example, those saturated or unsaturated acids having from 2 to 30, preferably from 2 to 6, more preferably from 2 to 3 carbon atoms. Also suitable are the hydroxy-functional carboxylic acids (e.g., glycolic acid, lactic acid, etc.) and organic sulfonic acids (e.g., methanesulfonic acid). The preferred organic acids include, for example, acetic acid, propionic acid, acrylic acid, methacrylic acid, itaconic acid, ethanesulfonic acid, decanoic acid, triacontanoic acid, lactic acid, any combination thereof.

The conversion reaction to form cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from 25° C. to 100° C., with preferred reaction rates being observed at temperatures from 60° to 100° C.

Good results can be achieved by using substantially stoichiometric amounts of reactants although a slight excess or deficiency of the epoxy-containing resin or the nucleophilic compounds can be used. With weak acids, useful ratios of the reactants range from 0.5 to 1.0 equivalent of nucleophilic compounds per epoxide group of the resin and 0.4 to 1.1 equivalents of organic acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophilic compounds and the epoxy group of the resin. When the nucleophilic compounds is a secondary amine, the amine-epoxy reaction can be conducted first, followed by addition of the organic acid to form the salt and thus produce the cationic form of the resin. Larger excesses of amine can be used and the excess amine subsequently removed as known in the art such as by vacuum distillation, steam distillation, falling film distillation.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from 5 to 30 moles per epoxy equivalent. When the nucleophilic compound is a secondary amine, the water can be added before, during, or after the resin epoxy group/nucleophile reaction. The preferred range of charge density of the cationic, advanced epoxy resin is from 0.2 to 0.8 milliequivalent of charge per gram of the resin, calculated assuming complete salting of the limited reagent (acid or amine).

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included.

When a desired degree of reaction is reached, any excess nucleophilic compound can be removed by standard methods, e.g., dialysis, vacuum stripping and steam distillation.

The cationic, advanced epoxy resins of this invention in the form of aqueous dispersions are useful as coating compositions, especially when applied by electrodeposition. The coating compositions containing the cationic resins of this invention as the sole resinous component are useful but it is preferred to include crosslinking agents in the coating composition so that the coated films, when cured at elevated temperatures, will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; polyester resins; and phenol-aldehyde resins.

The advanced resins of the present invention can be cured by any suitable curing agent for curing epoxy resins, e.g. those resins containing a vicinal epoxide group as well as those curing agents which cure through the secondary hydroxyl groups appearing along the backbone of either the epoxy terminated resins and the hydroxyl terminated resins.

Suitable curing agents which cure through the epoxide groups include, compounds containing at least two primary or secondary amine hydrogen atoms such as, for example primary and secondary aliphatic, cycloaliphatic or aromatic amine compounds; compounds containing at least two carboxylic acid groups per molecule (organic polybasic acids) and their anhydrides such as for example, saturated an unsaturated aliphatic or cycloaliphatic carboxylic acids and aromatic carboxylic acids.

Suitable primary or secondary amine-containing compounds which can be employed as the epoxy curing agent include, for example, ethylenediamine, diethylenetriamine, triethylenetetramine, tetraethylenepentamine, isophoronediamine, N-aminoethylpiperazine, methanediamine, 1,3-diaminocyclohexane, xylylenediamine, m-phenylenediamine, 1,4-methylenedianiline, metaphenylenediamine, diaminodiphenylsulfone, diaminodiphenyl ether, 2,4-toluenediamine, 2,6-diaminopyridine, bis(3,4-diaminophenyl)sulfone, resins prepared from aniline and formaldehyde, aminated polyglycols, any combination of any two or more such curing agents.

Organic polybasic acid curing agents include, for example, oxalic acid, phthalic acid, maleic acid, aconitic acid, carboxyl terminated polyesters, any combination of any two or more such curing agents.

Anhydrides of polycarboxylic acids include, for example, phthalic anhydride, succinic anhydride, citraconic anhydride, itaconic anhydride, dodecenylsuccinic anhydride, Nadic Methyl Anhydride (methylbicyclo(2.2.1)heptene-2,3-dicarboxylic anhydride isomers), pyromellitic dianhydride, cyclopentanetetracarboxylic dianhydride, benzophenonetetracarboxylic dianhydride, any combination thereof.

Other curing agents include, for example, amides and polyamides, urea-aldehyde resins, melamine-aldehyde resins, hexamethoxymethylmelamine, imidazoles, guanimines, aromatic hydroxyl-containing compounds, any combination thereof. Preferred other curing agents which can be employed herein include, for example, dicyandiamide, 2-methylimidazole, phenol-formaldehyde resins, cresol-formaldehyde resins, any combination thereof.

Curing agents which cure through the secondary hydroxyl groups along the backbone of the advanced resins include, for example, polyisocyanates, blocked polyisocyanates, urea-aldehyde resins, melamine-aldehyde resins, phenol-aldehyde novolac resins, alkylated phenol-aldehyde novolac resins, any combination thereof. Preferred such curing agents include, for example, hexamethoxymethylmelamine, urea-formaldehyde resins, melamine-formaldehyde resins, aromatic or cycloaliphatic or aliphatic polyisocyanates, blocked polyisocyanates, a mixture of the allyl ethers of mono-, di- and tri-methylol phenol, a mixture of the allyl ethers of methylol phenol partially polymerized, phenolformaldehyde novolac resins and cresol-formaldehyde novolac resins, any combination thereof.

Blocked polyisocyanates include, for example, those blocked with alcohols, phenols, oximes, lactams and N,N-dialkylamides or esters of alpha-hydroxyl group-containing carboxylic acids. Particularly suitable polyisocyanates include, for example, isocyanurate trimer of hexamethylene diisocyanate, toluene diisocyanate, methylene diphenylene diisocyanate, isophorone diisocyanate, a prepolymer of toluene diiocyanate and trimethylolpropane. Preferred blocked polyisocyanates are those blocked with oximes of ketones also known as ketoximes. The preferred ketoximes is methyl ethyl ketoxime, acetone oxime, methyl ethyl ketoxime, methyl amyl ketoxime, methyl isobutyl ketoxime, cyclohexanone ketoxime.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition can be used such as a ketone or an ester. A catalyst can also be employed such as dibutyl tin dilaurate.

The blocked polyisocyanate crosslinking agents are incorporated into the coating composition at levels corresponding to from 0.2 to 2.0 blocked isocyanate groups per hydroxyl group of the cationic resin. The preferred level is from 0.3 to 1 blocked isocyanate group per resin hydroxyl group.

A catalyst can, optionally, be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. Amounts used typically range between 0.1 and 3 weight percent of binder solids.

The curing agents are employed in amounts which will generally cure the advanced resin, i.e. that amount which is sufficient to render the resultant cured coating composition non-tacky. In those instances where the curing agent cures by reacting with the epoxide groups, they are employed in amounts which provide a ratio of equivalents of curing agent per epoxide group of from 0.01:1 to 10:1, preferably from 0.1:1 to 5:1, more preferably from 0.5:1 to 1.5:1. In those instances where the advanced resin cures through the secondary hydroxyl groups along the backbone, the curing agent is employed in amounts which provide a ratio of equivalents of curing agent per secondary hydroxyl group of from 0.05:1 to 5:1, preferably from 0.1:1 to 3:1, more preferably from 0.3:1 to 2:1.

The advanced resins of the present invention can be blended with other materials such as solvents or diluents, fillers, pigments, dyes, flow modifiers, thickeners, reinforcing agents, antifoam agents, slip agents, adhesion promoters, flexibility promoters, surface tension modifiers, stress release agents, gloss reducing agents, rheology modifiers, stabilizers, surfactants, plasticizers, or any combination thereof.

The amount of additive depends on the additive type, formulation, crosslinker (curing agent) concentration and type, and many other variables. As a consequence, the Applicants do not wish to be bound by any particular concentration range. Typically additives are usually employed in amounts of from 0.00001 to 10, preferably from 0.001 to 5, more preferably from 0.01 to 0.05 percent by weight based upon the weight of total solids.

Fillers are added in amounts up to 60 percent by weight.

Plasticizers are added in quantities of from 10 to 40 percent by weight.

Solvents or diluents which can be employed herein include, for example, alcohols, hydrocarbons, ketones, glycol ethers, or any combination thereof. Particularly suitable solvents or diluents include, for example, methanol, ethanol, isopropanol, butanol, pentanol, toluene, benzene, xylene, methyl ethyl ketone, methyl isobutyl ketone, diethylene glycol methyl ether, dipropylene glycol methyl ether, ethylene glycol methyl ether, ethylene glycol ethyl ether, ethylene glycol butyl ether, ethylene glycol phenyl ether, or any combination thereof.

Reinforcing materials which can be employed herein include natural and synthetic fibers in the form of woven cloth, mat, monofilament, multifilament. Suitable reinforcing materials include, glass, ceramics, nylon, rayon, cotton, aramid, graphite, or any combination thereof.

Suitable fillers which can be employed herein include, for example, inorganic oxides, ceramic microspheres, plastic microspheres, or any combination thereof.

The advanced resins of the present invention are particularly useful in the preparation of coatings; however, they may also find utility in castings, laminates, encapsulants.

The coating compositions can be applied by any conventional method known in the coating industry. Therefore, spraying, rolling, dipping, flow control or electrodeposition applications can be employed for both clear and pigmented films. Spraying is the preferred technique for the aqueous coating compositions. After application onto the substrate, the coating is thermally cured at temperatures of from 95° C. to 280° C. or higher, for periods in the range of from 0.08 to 60 minutes. The resultant films can be dried at ambient temperatures for longer periods of time.

Unpigmented coating compositions are prepared by blending the resinous product with the crosslinking agent and optionally any additives such as catalysts, solvents, surfactants, flow modifiers, plasticizers, defoamers, or other additives. This mixture is then dispersed in water by any of the known methods. A preferred method is the technique known as phase-inversion emulsification, wherein water is slowly added with agitation to the above mixture, usually at temperatures ranging from ambient to 70° C., until the phases invert to form an organic phase-in-water dispersion. The solids content of the aqueous dispersion is usually between 5 and 45 percent by weight and preferably between 10 and 30 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A pigment grinding vehicle suitable for use with electrodepositable coatings consists of a water-soluble cationic resinous product, water, and a minor amount of water-compatible solvent. The cationic resinous product is prepared by reacting an epichlorohydrin/bisphenol A condensation product having an epoxide group content of 8 percent with a nucleophilic compound, an acid, and water in a similar fashion as described above for the cationic resins used in the preferred embodiment of the invention. The water-soluble product can be diluted with water to form a clear solution useful as a pigment grinding vehicle.

The pH and/or conductivity of the coating compositions can be adjusted to desired levels by the addition of compatible acids, bases, and/or electrolytes known in the art. Other additives such as solvents, surfactants, defoamers, anti-oxidants, bactericides, etc. can also be added to modify or optimize properties of the compositions or the coating in accordance with practices known to those skilled in the art.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage can range from 10 to 1,000 volts, typically 50 to 500. The film thickness achieved generally increases with increasing voltage. In the case of the coating compositions of the invention, suitable films may be achieved at higher voltages than for compositions using resins prepared by a one-step preparation. Current is allowed to flow for between a few seconds to several minutes, typically two minutes over which time the current usually decreases. Any electrically conductive substrate can be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from 200° F. to 536° F. (93° C. to 280° C.), for periods of 0.08 to 60 minutes.

EXAMPLE 1

Recrystallization of 1,2-Bis-(3-Hydroxyphenoxy)Ethane

Technical grade (85 percent purity) of 1,2-Bis-(3-hydroxyphenoxy)ethane, 3,3'-ethylenedioxydiphenol, was obtained from Aldrich Chemical Company. A 300 gram sample was dissolved in 750 ml of acetone which was then treated with decolorizing carbon and filtered through a filter aid, celite, to remove particulate matter and colored impurities. The filtrate was concentrated to 600 ml by distillation at atmospheric pressure and allowed to stand at room temperature overnight. A crystalline material, 29 grams, was removed by filtration under reduced pressure and enough acetone was added to the filtrate to bring the volume up to 800 ml. After cooling in the refrigerator overnight, another 115 grams of white crystalline material was recovered and high pressure liquid chromtography (HPLC) analysis revealed 95 percent purity by peak area. This 115 gram fraction was redissolved in acetone to a volume of 300 ml and, after cooling in a refrigerator overnight, a 91.6 gram fraction of white crystalline material (97.3 area percent purity by HPLC analysis) was recovered for use in examples 8, 9, 17, and 21. Both 1H and 13C nuclear magnetic resonance (NMR) spectra were consistent with the known structure.

EXAMPLE 2

Preparation of 1,4-Bis(3-Hydroxyphenoxy)Butane

A five neck five liter round bottom flask equipped with a mechanical stirrer, two condensers, and a dropping funnel was purged with nitrogen then charged under a nitrogen blanket with 1.5 kg (13.6 moles) resorcinol, 120 grams deionized water, and 138.75 grams (0.64 moles) 1,4-dibromobutane. The reaction slurry was slowly heated with stirring to reflux under a slow nitrogen purge; then a solution of 109 grams (1.64 moles) 85 percent KOH pellets in 109 grams water was added dropwise under a nitrogen blanket over a two hour period. After an additional hour of refluxing, the reaction mixture was allowed to cool enough to pour the contents into 10 liters deionized water. The water slurry was acidified with 30 percent sulfuric acid and allowed to stand at room temperature overnight before filtering under reduced pressure and washing with several portions of warm water. The residue, 80 grams of yellow amorphous solid, was then extracted with large quantities of boiling water to remove oils. After cooling to room temperature, the water extracts (14 liters) yield 28 grams of white, shiny platelets. HPLC analysis revealed 92 percent purity by peak area. Recrystallization from acetone yielded product of >98 percent purity by HPLC analysis with a melting point of 103° C.-106° C. (literature melting point, 105° C.-108° C.) for use in examples 10, 18 and 20. Both 1H and 13C NMR spectra were consistent with the proposed structure.

EXAMPLE 3

Preparation of 1,4-Bis(4-Hydroxyphenoxy)Butane

A five neck five liter round bottom flask equipped with a mechanical stirrer, two condensers, and a dropping funnel was purged with nitrogen then charged under a nitrogen blanket with 1.25 kg (11.36 moles) hydroquinone, 350 grams deionized water, and 231.25 grams (1.07 moles) 1,4-dibromobutane. The reaction mass becomes a stirable slurry as it was slowly heated to reflux under a slow nitrogen purge. A solution of 180 grams (2.7 moles) 85 percent KOH pellets in 180 grams water was added dropwise under a nitrogen blanket over a two hour period. After about one third of the KOH had been added, the slurry had converted to a tea colored solution; then, after most of the KOH had been added, a white material precipitates in increasing amounts as the refluxing was continued an additional hour. The reaction mixture was quenched before cooling by pouring into 6 liters deionized water. The water slurry was acidified with 30 percent sulfuric acid and allowed to stand at room temperature overnight before filtering under reduced pressure and washing with several portions of boiling water to remove hydroquinone. The white residue was dried in a vacuum oven at 140° C. to a weight of 240 grams. It was then taken up in 4 liters boiling MEK, treated with decoloring carbon and filtered through a filter aid, celite, to remove particulates and colored impurities. A total of 154 grams of a white product was recovered from a series of filtrates. Analysis by gpc showed contamination by higher molecular weight species which were much less soluble in acetone than the desired product; thus, the product was taken up in boiling acetone, filtered, and cooled to recover 135 grams (46 percent yield based on the dibromobutane). HPLC analysis showed >90 percent purity by peak area. Another crystallization from 3 liters boiling acetone yields 116 grams of white "mica-like" crystals (melting point 202° C.-204° C.) with greater than 96 percent purity by HPLC peak area for use in examples 11 and 22. Both 1H and 13C NMR spectra were consistent with the proposed structure.

EXAMPLE 4

Preparation of 1,8-Bis(4-Hydroxyphenoxy)Octane

A five neck five liter round bottom flask equipped with a mechanical stirrer, two condensers, and a dropping funnel was purged with nitrogen then charged under a nitrogen blanket with 1.1 kg (10.0 moles) hydroquinone, 350 grams deionized water, and 272.0 grams (1.0 moles) 1,8-dibromooctane. The reaction mass becomes a stirable slurry as it was slowly heated to reflux under a slow nitrogen purge. A solution of 184 grams (2.7 moles) 85 percent KOH pellets in 184 grams water was added dropwise under a nitrogen blanket over a period of 75 minutes. After about one third of the KOH had been added, the slurry had converted to a tea colored solution; then, after most of the KOH had been added, a white material precipitates in increasing amounts as the refluxing was continued an additional 90 minutes. The reaction mixture was quenched with one liter of water then poured into 4 liters of water. The water slurry was acidified with 30 percent sulfuric acid and filtered under reduced pressure. The filter cake was slurried in warm (50°-70° C.) water, filtered again and washed with several portions of boiling water. It was then dried in a vacuum oven at 120° C. and 310 grams of crude white product was recovered. The product was treated with 8 liters of boiling ethanol and filtered to remove oligomers. The filtrate yields a total of 134 grams (41 percent Yield based on the dibromide) of white, shiny, "mica-like" crystals more than 95 percent pure by HPLC peak area and GPC analysis. A final crystallization from 1.1 liters boiling ethanol gives product more than 99 percent pure by HPLC peak area (m.p. 151°-153.5° C.) for use in preparation of the copolymer epoxy resin, examples 12, 14, 15, 23 and 24. The ultraviolet absorption spectrum in 30/70 (by volume) methanol/dimethylformamide (DMF) showed a maximum absorption at 297 nm and in 30/70 (by volume) 1.0N KOH in methanol/DMF at 315 nm.

EXAMPLE 5

Preparation of 1,8-Bis(3-Hydroxyphenoxy)Octane

A five neck five liter round bottom flask equipped with a mechanical stirrer, two condensers, and a dropping funnel was purged with nitrogen then charged under a nitrogen blanket with 1.6 kg (14.5 moles) resorcinol, 160 grams deionized water, and 296.7 grams (1.091 moles) 1,8-dibromooctane. The easily stirable reaction mass was slowly heated to reflux under a slow nitrogen purge. A solution of 181 grams (2.74 moles) 85 percent KOH pellets in 184 grams water was added dropwise at reflux under a nitrogen blanket over a period of two hours. After about 25 percent of the KOH had been added, the reaction mass had dissolved to light tea colored solution then it becomes increasingly clouded as salt was formed. The reaction mixture was refluxed an additional hour after all the KOH had been added. The pH of the reaction mixture was basic. The reaction was quenched with 1.5 liters of water and acidified with 40 percent sulfuric acid. The reaction mixture was then poured into 4 liters of water, cooled in an ice bath to a temperature of 10° C. and filtered to recover a tan colored solid which was slurried in 1.2 liters boiling water to wash out resorcinol and KBr. The cooled slurry was then filtered and 350 grams of crude product was recovered. Crystallization from 400 ml acetone yield 170 grams white crystals, 88 percent pure by HPLC peak area, and recrystallization from 500 ml acetone yields 97.4 grams product of 96 percent purity by HPLC peak area and high purity by gel permeation chromatography (m.p. 78°-82° C.).

EXAMPLE 6

Preparation of the Diglycidyl Ether of 1,8-Bis(4-Hydroxyphenoxy)Octane

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 574.4 grams of a 20 wt. percent solution of propylene glycol methyl ether in epichlorohydrin (4.98 moles epichlorohydrin) and 111.02 grams (0.336 moles) of 1,8-Bis(4-hydroxyphenoxy)octane from example 4. The Dean Stark trap was filled with a 20 wt. percent solution of propylene glycol methyl ether in epichlorohydrin, the system was purged with nitrogen and the reaction mixture was heated to reflux (65° C. at 170 mm Hg pressure controlled by a I2R Manostat with nitrogen bleed). Analysis by ultraviolet spectroscopy (UV) of a sample of the reaction slurry taken at this point showed 15.3 wt percent diphenol (compared to 16.2 wt. percent based on amounts charged). 53.76 grams of 50 percent aqueous caustic (0.672 moles of NaOH) was added through the dip tube at a constant rate over a one hour period at reflux (65° C. at 170 mm Hg pressure). After about 25 percent of the caustic had been added, the reaction mixture dissolves into a dark purple solution then it becomes increasingly clouded as NaBr was produced. Increasing amounts of water was collected in the Dean Stark trap. A sample taken near the end of caustic addition was neutral to pH test paper and showed 95 percent conversion of the starting diphenol. The remaining caustic along with a 5-10 percent excess was added over a twenty minute period and refluxing was continued another 15 minutes. The reaction mixture at this point was basic to pH test paper and it showed better than 99.8 percent conversion of the starting diphenol by UV analysis. The heating mantle was removed and the reaction was quenched by acidifying with $CO_2$ chips. A 300 ml portion of methylene chloride was added to the cooled, viscous reaction mass to allow filtration under reduced pressure. The filter pad was then taken up in 3.5 liters of warm methylene chloride and filtered to remove salt and insoluble materials. The methylene chloride solution was washed with three portions of 300 ml each of distilled water and was then passed through 2 V filter paper twice to remove most of the resorcinol and NaBr. The clear solution was concentrated under reduced pressure and was allowed to crystallize. The white crystals (108.8 grams, m.p. 120°-122° C.) were better than 99 percent pure by HPLC peak area and titration revealed 18.1 percent epoxide (theoretical, 19.4 percent).

EXAMPLE 7

Preparation of the Diglycidyl Ether of 1,8-Bis(3-Hydroxyphenoxy)Octane

A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 574.4 grams of a 20 wt. percent solution of propylene glycol methyl ether in epichlorohydrin (4.98 moles epichlorohydrin) and 111.02 grams (0.336 moles) of 1,8-Bis(3-hydroxyphenoxy)octane from example 5. The Dean Stark trap was filled with a 20 wt. percent solution of propylene glycol methyl ether in epichlorohydrin, the system was purged with nitrogen and the reaction mixture was heated to reflux (65° C. at 180 mm Hg pressure controlled by a I2R Manostat with nitrogen bleed). Then 56 grams of 50 percent aqueous caustic (0.70 moles of NaOH) was added to the light yellow reaction solution through the dip tube at a constant rate over a one hour period at reflux (65° C. at 170 mm Hg pressure). The solution darkens during caustic addition and becomes increasingly clouded as NaBr was produced. Reflux was continued an additional 30 minutes after caustic addition was completed. A sample tests neutral to pH test paper and showed better than 99.4 percent conversion of the starting diphenol by UV analysis. The heating mantle was removed and the reaction was quenched by acidifying with $CO_2$ chips. The cooled reaction mass was filtered under reduced pressure and the residue was taken up into boiling acetone and was filtered to remove NaBr, then the acetone was stripped under reduced pressure and a white solid was recovered. The reaction mixture filtrate was stripped of epichlorohydrin and propylene glycol methyl ether under reduced pressure and a white solid was recovered. The two portions of white solid product were taken up in 1.5 liters of methylene chloride and washed with three portions of 200 ml each of distilled water then passed through 2 V filter paper twice to remove most of the suspended water, then the methylene chloride was removed by stripping under reduced pressure and the white solid product was dissolved in 450 mL hot acetone and allowed to crystallize at 10° C. The first crop of white crystals (72.3 grams) was 98.5 percent pure by HPLC peak area and titration revealed 18.36 percent epoxide. The second crop of white crystals (41.9 grams) was 92 percent pure by HPLC peak area and titration revealed 18.32 percent epoxide. The last crop of white crystals (10.4 grams) was 82 percent pure by HPLC peak area and titration revealed 18.05 percent epoxide.

EXAMPLE 8

Preparation of the Diglycidyl Ether of 1,2-Bis(3-Hydroxyphenoxy)Ethane

A five liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 2,500 grams of a 20 wgt. percent solution of propylene glycol methyl ether in epichlorohydrin (21.6 moles epichlorohydrin) and 248.2 grams (1.008 moles) of 1,2-Bis(3-hydroxyphenoxy)ethane from example 1. The Dean Stark trap was filled with a 20 wgt. percent solution of propylene glycol methyl ether in epichlorohydrin, the system was purged with nitrogen and the reaction mixture was heated to reflux (65° C. at 170 mm Hg pressure controlled by a $I^2R$ Manostat with nitrogen bleed). Then 172.0 grams of 50 percent aqueous caustic (2.15 moles of NaOH) was added through the dip tube at a constant rate over a 1.5 hour period at reflux (65° C. at 170 mm Hg pressure). The solution darkens during caustic addition and becomes increasingly clouded as NaBr was produced. After the first 168 grams of caustic addition, a sample tests neutral to pH test paper. Reflux was continued an additional 45 minutes after adding the remainder of the caustic and a sample then tests basic to pH test paper. The heating mantle was removed and the reaction was quenched by acidifying with $CO_2$ chips. The reaction mixture was then filtered under reduced pressure to remove the salt. The filtrate was concentrated under reduced pressure to a volume of 1,500 ml, washed with three portions of 300 ml each of distilled water, then passed through 2 V filter paper twice to remove most of the suspended water before stripping the remaining epichlorohydrin and propylene glycol methyl ether under reduced pressure. The solid residue was dissolved in 800 ml warm acetone and allowed to crystallize overnight. The first crop of white solid (105.2 grams, m.p. 100° C.) was 96 percent pure by HPLC peak area and titration revealed 23.3 percent epoxide (theoretical, 23.9 percent). The second crop of white solid (29.9 grams) was 93.5 percent pure by HPLC peak area and titration revealed 23.1 percent epoxide.

EXAMPLE 9

Preparation of the Diglycidyl Ether of 1,8-Bis(3-Hydroxyphenoxy)Octane

A five liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 2,500 grams of a 20 wgt. percent solution of propylene glycol methyl ether in epichlorohydrin (21.6 moles epichlorohydrin) and 333.0 grams (1.008 moles) of 1,8-Bis(3-hydroxyphenoxy)octane from example 5. The Dean Stark trap was filled with a 20 wgt. percent solution of propylene glycol methyl ether in epichlorohydrin, the system was purged with nitrogen and the reaction mixture was heated to reflux (65° C. at 170 mm Hg pressure controlled by a $I^2R$ Manostat with nitrogen bleed). Then 164.5 grams of 50 percent aqueous caustic (2.06 moles of NaOH) was added through the dip tube at a constant rate over a 1 hour and forty-five minute period at reflux (65° C. at 170 mm Hg pressure). The solution darkens during caustic addition and becomes increasingly clouded as NaBr was produced. After an additional fifteen minutes of reflux, a sample tests neutral to pH test paper. Another 4.0 grams caustic was added and refluxing was continued forty-five minutes longer. A sample then tests basic to pH test paper. The heating mantle was removed and the reaction was quenched by acidifying with $CO_2$ chips. The reaction mixture was then filtered under reduced pressure to remove the salt. The filtrate was then stripped of most of the epichlorohydrin and propylene glycol methyl ether under reduced pressure and 2.5 liters methylene chloride was added. The resulting solution was washed with three portions of 300 ml each of distilled water, then passed through 2 V filter paper twice to remove most of the suspended water before stripping the methylene chloride and the remaining epichlorohydrin and propylene glycol methyl ether under reduced pressure. The light brown liquid product was dissolved in 1.2 liters warm acetone and allowed to crystallize overnight in a refrigerator. The first crop of white solid (331 grams, m.p. 75° to 80° C.) was 94 percent pure by HPLC peak area and titration revealed 18.3 percent epoxide (theoretical, 19.4 percent). The second crop of white solid (46.5 grams) was 89 percent pure by HPLC peak area and titration revealed 18.3 percent epoxide.

EXAMPLE 10

Preparation of Poly(Bisphenol A) Ether of Ethylene Glycol

A five liter, five neck flask equipped with two reflux condensers, an addition funnel, and an air driven stirrer shaft was charged with 136.7 grams (2.12 moles) of 87 percent pure KOH pellets and 1.4 liters ethanol. The system was purged with nitrogen while the mixture was brought into solution with stirring. The reactor was then charged with 1,368 grams (6.0 moles) bisphenol A (polycarbonate grade) under a nitrogen stream, then it was heated to reflux before 159.7 grams (0.85 moles) ethylene dibromide in 100 mls ethanol was added from the addition funnel in a rapid dropwise fashion. The reaction mixture was refluxed twenty hours, then most of the ethanol was distilled out before adding 1.5 liters toluene which was used to distill out the remaining ethanol as an azeotrope with toluene. The toluene was replenished occassionally to maintain a reaction volume of about 3 liters. The reaction mixture was neutralized with aqueous HCl and water was removed as an azeotrope with toluene through a Dean Stark trap. The reaction mixture was filtered hot by gravity filtration, then the salt residue was washed with more hot toluene and the filtrates were combined (207 grams of KBr was recovered). After standing overnight at room temperature, the clear toluene solution was decanted off from crystallized bisphenol A and the toluene was stripped under reduced pressure. The solid residue, 111 grams, was dissolved in hot methylene chloride, and after standing at room temperature several hours some of the excess bisphenol A crystallizes. The mixture was filtered and the filtrate was stripped under reduced pressure giving 84 grams of a white solid with 8.027 percent phenolic OH determined by UV analysis. HPLC analsis showed about 24 percent by peak area of unreacted bisphenol A. Another 79 grams of product with 7.878 percent phenolic OH containing about 24 percent bisphenol A by HPLC peak area was extracted from the crystallized bisphenol A fractions by recrystallizing from toluene, removing the crystals, stripping the toluene filtrate, dissolving the residue in hot methylene chloride, removing the bisphenol A crystals and stripping the methylene chloride. Finally, another 80 grams of product with 8.353 percent phenolic OH containing about 33 percent unreacted bisphenol A was extracted from the recrystallized fractions of bisphenol A by recrystallizing from methylene chloride, removing the bisphenol A crystals, concentrating the filtrate by 50 percent and removing another crop of bisphenol A crystals, then stripping the methylene chloride under reduced pressure.

EXAMPLE 11

Preparation of the Diglycidyl Ether of Poly(Bisphenol A) Ether of Ethylene Glycol A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 574.4 grams of a 20 wgt. percent solution of propylene glycol methyl ether in epichlorohydrin (4.98 moles epichlorohydrin) and 81.4 grams (0.20 moles) of the poly(bisphenol A) ether of ethylene glycol (8.353 percent phenolic OH) from example 45529-32. The Dean Stark trap was filled with a 20 wgt. percent solution of propylene glycol methyl ether in epichlorohydrin, the system was purged with nitrogen and the reaction mixture was heated to reflux (65° C. at 180 mm Hg pressure controlled by a I²R Manostat with nitrogen bleed). Then 37.5 grams of 50 percent aqueous caustic (0.47 moles of NaOH) was added through the dip tube at a constant rate over a 1.5 hour period at reflux (65° C. at 180 mm Hg pressure). Fifteen minutes after the first 34 grams of caustic addition, a sample tests neutral to pH test paper. The remaining caustic was added and a sample taken fifteen minutes later tests basic to pH test paper. The heating mantle was removed and the reaction was quenched by acidifying with $CO_2$ chips. The reaction mixture was then filtered warm under reduced pressure to remove the salt and methylene chloride was added to a total volume of 1 liter. The solution was washed with three portions of 200 ml each of distilled water, then passed through 2 V filter paper twice to remove most of the suspended water before stripping under reduced pressure to give 100 grams of a clear, yellow, viscous oil. A final stripping at 150° C. with a nitrogen bleed at 10 to 20 mm Hg pressure gives 99.6 grams product with a EEW of 236.173.

EXAMPLE 12

Preparation of Poly(Bisphenol F) Ether of Ethylene Glycol

A five liter, five neck flask equipped with with two reflux condensers, an addition funnel, and an air driven stirrer shaft was charged with 122.4 grams (1.90 moles) of 87 percent pure KOH pellets and 1.6 liters ethanol. The system was purged with nitrogen while the mixture was brought into solution with stirring. The reactor was then charged with 400 grams (2.0 moles) bisphenol F under a nitrogen stream, then it was heated to reflux before 150.2 grams (0.80 moles) ethylene dibromide in 200 mls ethanol was added from the addition funnel in a rapid dropwise fashion. The reaction mixture was refluxed forty-eight hours, then neutralized with aqueous HCl, and filtered warm under reduced pressure. The gummy residue was extracted with boiling methylene chloride and the ethanol filtrate was stripped under reduced pressure and the resulting residue was extracted with boiling methylene chloride. The methylene chloride extracts were stripped under reduced pressure and the brown gummy residue was treated with several portions of boiling water totaling 2 liters. The cooled water fractions yield white crystals of the para isomer of bisphenol F. The gummy residue was dissolved in 2 liters boiling methylene chloride, and a water layer was removed. After standing overnight at room temperature, 40.6 grams of brown crystals of bisphenol F were recovered by filtration. The filtrate was stripped under reduced pressure and 186 grams of a brown, tacky product with 11.1 percent phenolic OH determined by titration in pyridine with tetrabutyl ammonium hydroxide (F. E. Critchfield, "Organic Functional Group Analysis", MacMillan, N. Y., pp. 32 and 33, 1963) was recovered. HPLC analsis showed about 60 percent by peak area of unreacted bisphenol F.

EXAMPLE 13

Preparation of Poly(Bisphenol F) Ether of Ethylene Glycol

A five liter, five neck flask equipped with with two reflux condensers, an addition funnel, and an air driven stirrer shaft was charged with 122.4 grams (1.90 moles) of 87 percent pure KOH pellets and 1.6 liters ethanol. The system was purged with nitrogen while the mixture was brought into solution with stirring. The reactor was then charged with 400 grams (2.0 moles) bisphenol F under a nitrogen stream, then it was heated to reflux before 150.2 grams (0.80 moles) ethylene dibromide in 200 mls ethanol was added from the addition funnel in a rapid dropwise fashion. The reaction mixture was refluxed forty-eight hours, then neutralized with 130 mls 10 percent aqueous HCl. After cooling to room temperature, the reaction mixture was decanted from the salt and concentrated by distillation to 750 mls. More salt was removed and the reaction mixture was concentrated to 700 mls before it was added 1.5 liters of water and a gummy layer forms. The aqueous mixture was boiled 3 to 5 minutes, the water was decanted off and the water washing was repeated twice more. The residue was then treated with 3 liters hot methylene chloride and a gummy residue was removed by gravity filtration. After standing at room temperature overnight, 45.6 grams of brown crystals of bisphenol F were recovered by filtration. The filtrate was stripped under reduced pressure and 257 grams of a brown tacky material with 10.7 percent phenolic OH determined by titration in pyridine with tetrabutyl ammonium hydroxide (F. E. Critchfield, "Organic Functional Group Analysis", MacMillan, N. Y., pp. 32 and 33, 1963) was recovered. HPLC analsis showed about 66 percent by peak area of unreacted bisphenol F.

EXAMPLE 14

Preparation of the Diglycidyl Ether of Poly(Bisphenol F) Ether of Ethylene Glycol A one liter, five neck flask equipped with a Truebore Vacuum stirrer, a Dean Stark trap designed to replenish the flask with the more dense layer of propylene glycol methyl ether in epichlorohydrin while retaining the less dense layer of water, a glycol cooled condenser, a thermometer, and a dip tube for adding caustic solution fed by a peristaltic pump was charged with 574.4 grams of a 20 wgt. percent solution of propylene glycol methyl ether in epichlorohydrin (4.98 moles epichlorohydrin) and 91.8 grams (0.30 moles) of the poly(bisphenol F) ether of ethylene glycol (11.1 percent phenolic OH) from example 46361-6. The Dean Stark trap was filled with a 20 wgt. percent solution of propylene glycol methyl ether in epichlorohydrin, the system was purged with nitrogen and the reaction mixture was heated to reflux (65° C. at 180 mm Hg pressure controlled by a I$^2$R Manostat with nitrogen bleed). Then 49.6 grams of 50 percent aqueous caustic (0.62 moles of NaOH) was added through the dip tube at a constant rate over a forty-five minute period at reflux (65° C. at 180 mm Hg pressure). The reaction mixture was cooked another fifty minutes and a sample tests only slightly basic pH test paper. The heating mantle was removed and the reaction was quenched by acidifying with $CO_2$ chips. The reaction mixture was then filtered warm under reduced pressure to remove the salt which was washed with methylene chloride. The filtrates were then stripped under reduced pressure and the remaining yellow-brown viscous liquid was dissolved in 1.2 liters methylene chloride which was then washed with three portions of 200 ml each of distilled water. The methylene chloride solution was then passed through 2 V filter paper until clear to remove most of the water. The methylene chloride was removed under reduced pressure and the product was stripped of traces of epichlorohydrin at 150° C. with a nitrogen bleed at 10 to 20 mm Hg pressure to give 127 grams product with a EEW of 228.6.

EXAMPLE 15

Preparation of Advanced Epoxy Resin from 1,2-Bis(3-Hydroxyphenoxy)Ethane and Diglycidyl Ether of Bisphenol A A three-neck 250 ml round bottom flask equipped with a condenser, a thermometer, and an air driven steel stirrer shaft was charged with 113.17 grams of the diglycidyl ether of bisphenol A having an epoxy equivalent weight (EEW) of 180.6, and heated to about 90° C. under a nitrogen purge of 200 ml/min. Then, 66.49 grams (0.270 moles) 1,2-bis(3-hydroxyphenoxy)ethane prepared in example 1 was added and dispersed well before adding 0.25 grams of a 70 percent by weight solution of ethyltriphenyl phosphonium acetate.acetic acid as a catalyst. The temperature was increased over a 45 minute period to 190° C. At that point the reaction exotherms, so the mantle was removed and a stream of cooling air was directed at the flask. The reaction temperature peaks at 197° C. The reaction mixture was cooked at 185° C. for only a few minutes before quickly pouring out the relatively viscous contents on a sheet of aluminum foil to cool. The EEW of the final product was 2,443.

EXAMPLE 16

Preparation of Advanced Epoxy Resin from 1,2-Bis(3-Hydroxyphenoxy)Ethane and Diglycidyl Ether of Bisphenol A A three-neck 250 ml round bottom flask equipped with a condenser, a thermometer, and an air driven steel stirrer shaft was charged with 130.58 grams of the diglycidyl ether of bisphenol A having an EEW of 180.6, and 74.57 grams (0.3028 moles) 1,2-Bis(3-hydroxyphenoxy)ethane prepared in example 1, then heated to about 90° C. under a nitrogen purge of 200 ml/min. before adding 0.286 grams of a 70 percent by weight solution of ethyltriphenyl phosphonium acetate.acetic acid complex catalyst in methanol. The temperature was increased over a one hour period of 190° C. At that point the reaction exotherms, so the mantle was removed and a stream of cooling air was directed at the flask. The reaction temperature peaks at 191° C. The reaction mixture was cooked at 185° C. for only another 45 minutes then quickly heated to 210° C. before quickly pouring out the relatively viscous contents on a sheet of aluminum foil to cool. Samples were removed at 15, 30, and 45 minutes after the reaction temperature reaches 190° C. to determine extent of reaction and the EEW (epoxide equivalent weight) of each was 1894, 1955, and 1972 respectively, and the final EEW was 2019.

EXAMPLE 17

Preparation of Advanced Epoxy Resin from 1,4-Bis(3-Hydroxyphenoxy)Butane and Diglycidyl Ether of Bisphenol A A three-neck 250 ml round bottom flask equipped with a condenser, a thermometer, and an air driven steel stirrer shaft was charged with 130.58 grams of the diglycidyl ether of bisphenol A having an EEW of 180.6, and heated to about 90° C. under a nitrogen purge of 200 ml/min. Then, 83.12 grams (0.303 moles) 1,4-Bis(3-hydroxyphenoxy)butane prepared in example 2 was added and dispersed well before adding 0.286 grams of a 70 percent by weight solution of ethyltriphenyl phosphonium acetate.acetic acid complex catalyst in methanol. The temperature was increased over a 70 minute period to 190° C. At that point the reaction exotherms, so the mantle was removed and a stream of cooling air was directed at the flask. The reaction temperature peaks at 196° C. The reaction mixture was cooked at about 185° C. for nearly 30 minutes before quickly heating to 210° C. and pouring out the relatively viscous contents on a sheet of aluminum foil to cool. Samples were removed at 15 minutes and thirty minutes after the beginning of the exotherm to determine extent of reaction and the EEW's of each was 2098 and 2108 respectively and the final EEW was 2118.

EXAMPLE 18

Preparation of Advanced Epoxy Resin from 1,4-Bis(4-Hydroxyphenoxy)Butane and Diglycidyl Ether of Bisphenol A A three-neck 250 ml round bottom flask equipped with a condenser, a thermometer, and an air driven steel stirrer shaft was charged with 130.58 grams of the diglycidyl ether of bisphenol A having an EEW of 180.6, and heated to about 100° C. under a nitrogen purge of 200 ml/min. Then, 83.12 grams (0.303 moles) 1,4-Bis(4-hydroxyphenoxy)butane prepared in example 3 was added and dispersed well before adding 0.286 grams of a 70 percent % by weight solution of ethyltriphenyl phosphonium acetate.acetic acid complex catalyst in methanol. The temperature was increased over a one hour period to 190° C. The reaction mixture was cooked at about 185° C. for another 90 minutes before quickly heating to 210° C. and pouring out the relatively viscous contents on a sheet of aluminum foil to cool. Samples were removed at 15, 30, 60, and 90 minutes after the peak temperature of 190° C. to determine extent of reaction and the EEW's of the first three were 1587, 1599, and 1617 respectively and the final EEW was 1706.

EXAMPLE 19

Preparation of Advanced Epoxy Resin from 1,8-Bis(4-Hydroxyphenoxy)Octane and Diglycidyl Ether of Bisphenol A A three-neck 250 ml round bottom flask equipped with a condenser, a thermometer, and an air driven steel stirrer shaft was charged with 113.86 grams of the diglycidyl ether of bisphenol A having an EEW of 180.6, and 88.14 grams (0.267 moles) 1,8-Bis(4-hydroxyphenoxy)octane prepared in example 4. The mixture was heated with stirring to about 120° C. to obtain a well mixed slurry. After cooling to about 90° C., 0.572 grams of a 70 percent by weight solution of ethyltriphenyl phosphonium acetate.acetic acid complex catalyst in methanol was added under a nitrogen purge of 200 ml/min. The temperature was increased over a fifty minute period to 190° C. The reaction mixture was cooled for another hour at 185° to 195° C. before quickly heating to 200° C. and pouring out the contents on a sheet of aluminum foil to cool. Samples were removed at 15, 30, and 60 minutes after the peak temperature of 190° C. to determine extent of reaction by measuring the EEW's which were 2067, 2077, and 2118 respectively. The final EEW was 2139.

EXAMPLE 20

Preparation of Epoxy Resin from 1,4-Bis(4-Hydroxyphenoxy)Butane and Diglycidyl Ether of Bisphenol A A three-neck 250 ml round bottom flask equipped with a condenser, a thermometer, and an air driven steel stirrer shaft was charged with 130.58 grams of the diglycidyl ether of bisphenol A having an EEW of 180.6, and 83.12 grams (0.303 moles) 1,4-Bis(4-hydroxyphenoxy)butane prepared in example 3. The mixture was heated with stirring to about 81° C. before adding 0.572 grams of a 70 percent by weight solution of ethyltriphenyl phosphonium acetate/acetic acid complex catalyst in methanol under a nitrogen purge of 200 ml/min. The temperature was increased over a fifty-three minute period to 190° C. The reaction mixture was cooked for another two hours at about 185° C., then another 0.572 grams of the catalyst solution was added and the reaction was continued another hour at 185° C. before pouring out the contents on a sheet of aluminum foil to cool.

EXAMPLE 21

Preparation of Epoxy Resin from 1,4-Bis(4-Hydroxyphenoxy)Butane and Diglycidyl Ether of Bisphenol A A three-neck 250 ml round bottom flask equipped with a condenser, a thermometer, and an air driven steel stirrer shaft was charged with 130.58 grams of the diglycidyl ether of bisphenol A having an EEW of 180.6, and 83.12 grams (0.303 moles) 1,4-Bis(4-hydroxyphenoxy)butane prepared in example 3. The mixture was heated with stirring to about 85° C. before adding 0.572 grams of a 70 percent by weight solution of ethyltriphenyl phosphonium acetate/acetic acid complex catalyst in methanol under a nitrogen purge of 200 ml/min. The temperature was increased over a thirty-five minute period to 190° C. The reaction mixture was cooked for another hour at about 183° C. before pouring out the contents on a sheet of aluminum foil to cool. The EEW of the product was 1560.

EXAMPLE 22

Preparation of Advanced Epoxy Resin from 1,8-Bis(4-Hydroxyphenoxy)Octane and the Diglycidyl Ether of Bisphenol A A three-neck 250 milliliter round bottom flask equipped with a condenser, a thermometer, and an air driven steel stirrer shaft was charged with 113.86 grams (0.630 equiv.) of a diglycidyl ether of bisphenol A having an epoxy equivalent weight (EEW) of 180.6 and 88.14 grams (0.267 moles) 1,8-bis(4-hydroxyphenoxy)octane. The reactor contents were heated to 105° C. Then 0.572 grams of a 70 percent by weight solution of ethyltriphenylphosphonium acetate.acetic acid complex in methanol catalyst was added to the well dispersed mixture. The temperature was increased over a 24 minute period to 150° C. At that point the reaction exotherms to 185° C. Then the reactor contents were heated to 190° C. Samples were removed at fifteen minutes, thirty minutes and one hour to determine the extent of the reaction after the reactor contents were heated to 190° C.

The corresponding epoxide equivalent weights of the samples were 2028, 2047, and 2067, respectively. The final EEW was 2087.

EXAMPLE 23

Preparation of Epoxy Resin from
1,8-Bis(3-Hydroxyphenoxy)Octane and Diglycidyl Ether of Bisphenol A A three-neck 250 ml round bottom flask equipped with a condenser, a thermometer, and an air driven steel stirrer shaft was charged with 56.45 grams of the diglycidyl ether of bisphenol A having an EEW of 180.6, and 43.41 grams (0.1313 moles) 1,8-Bis(3-hydroxyphenoxy)octane prepared as in example 5 and recrystallized from acetone to a purity of 93 percent by HPLC peak area. The mixture was heated with stirring to about 75° C. before adding 0.143 grams of a 70 percent by weight solution of ethyltriphenyl phosphonium acetate/acetic acid complex catalyst in methanol under a nitrogen purge of 200 ml/min. The temperature was increased over a sixty-six minute period to 180° C. then it was cooked over a twenty minute period at 185° C. before pouring out the contents on a sheet of aluminum foil to cool. The EEW of the resultant advanced epoxy resin was 2057.

EXAMPLE 24

Preparation of Epoxy Resin from
1,8-Bis(3-Hydroxyphenoxy)Octane and Diglycidyl Ether of Bisphenol A A three-neck 250 ml round bottom flask equipped with a condenser, a thermometer, and an air driven steel stirrer shaft was charged with 57.21 grams of the diglycidyl ether of bisphenol A having an EEW of 180.6, and 42.64 grams (0.129 moles) 1,8-Bis(3-hydroxyphenoxy) octane prepared as in example 5 and recrystallized from acetone to a purity of 93 percent by HPLC peak area. The mixture was heated with stirring to about 90° C. before adding 0.0700 grams of a 70 percent by weight solution of ethyltriphenyl phosphonium acetate/acetic acid complex catalyst in methanol under a nitrogen purge of 200 ml/min. The temperature was increased over a forty-six minute period to 187° C. then cooked at that temperature another thirty-nine minutes before pouring out the contents on a sheet of aluminum foil to cool. Samples were removed at 15 and 30 minutes after the peak temperature of 187° C. was reached to determine extent of reaction by measuring the EEW's which were 1770 and 1784 respectively. The final EEW was 1799.

EXAMPLE 25

Preparation of Epoxy Resin from
1,8-Bis(3-Hydroxyphenoxy)Octane and Diglycidyl Ether of Bisphenol A A three-neck 250 ml round bottom flask equipped with a condenser, a thermometer, and an air driven steel stirrer shaft was charged with 57.21 grams of the diglycidyl ether of bisphenol A having an EEW of 180.6, and 42.64 grams (0.129 moles) 1,8-Bis(3-hydroxyphenoxy)octane prepared as in example 5 and recrystallized from acetone to a purity of 93 percent by HPLC peak area. The mixture was heated with stirring to about 90° C. before adding 0.0700 grams of a 70 percent by weight solution of ethyltriphenyl phosphonium acetate/acetic acid complex catalyst in methanol under a nitrogen purge of 200 ml/min. The temperature was increased over a thirty minute period to 120° C. then over a ten minute period to 150° C. The reaction mixture was cooked for another thirty-five minutes at 146° to 150° C. before pouring out the contents on a sheet of aluminum foil to cool. Samples were removed when the temperature reaches 120° C. and 150° C. and at 15 and 35 minutes after the peak temperature of 150° C. was reached to determine extent of reaction by measuring the EEW's which were 338, 459, 843, and 1654 respectively.

EXAMPLE 26

Preparation of Epoxy Resin from
1,8-Bis(3-Hydroxyphenoxy)Octane and Diglycidyl Ether of Bisphenol A A three-neck 250 ml round bottom flask equipped with a condenser, a thermometer, and an air driven steel stirrer shaft was charged with 57.21 grams of the diglycidyl ether of bisphenol A having an EEW of 180.6, and 42.64 grams (0.129 moles) 1,8-Bis(3-hydroxyphenoxy)octane prepared as in example 5 and recrystallized from acetone to a purity of 93 percent by HPLC peak area. The mixture was heated with stirring to about 90° C. before adding 0.0700 grams of a 70 percent by weight solution of ethyltriphenyl phosphonium acetate/acetic acid complex catalyst in methanol under a nitrogen purge of 200 ml/min. The temperature was increased over an eleven minute period to 120° C. then over a five minute period to 130° C. The reaction peaks briefly at 150° C. and was then cooked at 120° to 130° C. before pouring out the contents on a sheet of aluminum foil to cool fifty minutes after the temperature first reaches 120° C. Samples were removed when the temperature first reaches 120° C. and at 5, 20, and 35 minutes thereafter to determine the extent of reaction by measuring the EEW's which were 350, 399, 753, and 1049 respectively. The final EEW was 1509.

EXAMPLE 27

Preparation of Epoxy Resin from
1,8-Bis(3-Hydroxyphenoxy)Octane and Diglycidyl Ether of Bisphenol A A three-neck 250 ml round bottom flask equipped with a condenser, a thermometer, and an air driven steel stirrer shaft was charged with 57.21 grams of the diglycidyl ether of bisphenol A having an EEW of 180.6, and 42.64 grams (0.129 moles) 1,8-Bis(3-hydroxyphenoxy)octane prepared as in example 5 and recrystallized from acetone to a purity of 93 percent by HPLC peak area. The mixture was heated with stirring to about 90° C. before adding 0.0700 grams of a 70 percent by weight solution of ethyltriphenyl phosphonium acetate/acetic acid complex catalyst in methanol under a nitrogen purge of 200 ml/min. The temperature was increased over a fifteen minute period to 120° C. then over a seven minute period to 140° C. The reaction mixture was cooked for another thirty-eight minutes at 140° C. before pouring out the contents on a sheet of aluminum foil to cool. Samples were removed when the temperature reaches 140° C. and at 15, 30, and 38 minutes after the temperature reaches 140° C. to determine extent of reaction by measuring the EEW's which were 329, 779, 1433, and 1604 respectively.

EXAMPLE 28

Preparation of Advanced Epoxy Resin from the Diglycidyl Ether of Bisphenol A and 1,8-Bis(3-Hydroxyphenoxy)Octane An aluminum pan was charged with 5.06 grams (0.0280 epoxy equiv.) of a diglycidyl ether of bisphenol A having an EEW of 180.6, and 3.60 grams (0.0 moles) 1,8-Bis(3-hydroxyphenoxy)octane from example 5. The pan was then heated on a hotplate at 130° to 140° C. to effect a homogeneous melt of the reactants. Two drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 20 minutes after the addition of catalyst. The EEW of the resultant advanced epoxy resin was 1300.

COMPARATIVE EXPERIMENT A

Preparation of Advanced Epoxy Resin from the Diglycidyl Ether of Bisphenol A and Bisphenol A A three-neck 250 ml round bottom flask equipped with a condenser, a thermometer, and an air driven steel stirrer shaft was charged with 113.86 grams (0.63 epoxy equiv.) of a diglycidyl ether of bisphenol A having an EEW of 180.6, and 60.90 grams (0.267 moles, 0.534 OH equiv.) of bisphenol A, then heated to about 90° C. under a nitrogen purge of 200 ml/min. before adding 0.250 grams of a 70 percent by weight solution of ethyltriphenylphosphonium acetate.acetic acid complex catalyst in methanol. The temperature was increased over a one hour period to 190° C. At that point the reaction exothermed, so the mantle was removed and a stream of cooling air was directed at the flask. The reaction temperature peaks at 197° C. The reaction mixture was cooked at 185° C. for another hour and was then quickly heated to 210° C. before quickly pouring out the contents on a sheet of aluminum foil to cool. The EEW of the resultant advanced epoxy resin was 1955.

COMPARATIVE EXPERIMENT B

Preparation of Advanced Epoxy Resin from the Diglycidyl Ether of Bisphenol A and Bisphenol A A three-neck 250 ml round bottom flask equipped with a thermocouple and an air driven steel stirrer shaft was charged with 130.6 grams (0.72 equiv.) of a diglycidyl ether of bisphenol A having an EEW of bisphenol A, then heated with stirring under a nitrogen purge of 200 ml/min to about 85° C. before adding 0.286 grams of a 70 percent by weight solution of ethyltriphenyl phosphonium acetate/acetic acid complex catalyst in methanol. The temperature was increased over a forty-five minute period to 190° C. At that point the reaction exothermed, so the heating mantle was removed and a stream of cooling air was directed at the flask. The reaction temperature peaks at 194° C. The reaction mixture was cooked at 185° C. for another hour and was then quickly heated to 210° C. before quickly pouring out the contents on a sheet of aluminum foil to cool. The EEW of the resultant advanced epoxy resin was 1845.

COMPARATIVE EXPERIMENT C

Preparation of Advanced Epoxy Resin from the Diglycidyl Ether of Bisphenol A and Bisphenol A five-neck 1000 ml round bottom flask equipped with a thermometer and an air driven steel stirrer shaft was charged with 420.37 grams (2.328 equiv.) of a diglycidyl ether of bisphenol A having an EEW of 180.6, and 228.70 grams (1.002 moles, 2.004 OH equiv.) of bisphenol A, then heated with stirring under a nitrogen purge of 200 ml/min to about 85° C. before adding 0.93 grams of a 70 percent by weight solution of ethyltriphenyl phosphonium acetate/acetic acid complex catalyst in methanol. The temperature was increased over a forty-eight minute period to 190° C. At that point the reaction exothermed, so the heating mantle was removed and a stream of cooling air was directed at the flask. The reaction temperature peaks at 195° C. The reaction mixture was cooked at 183° C. for another hour before quickly pouring out the contents on a sheet of aluminum foil to cool. The EEW of the resultant advanced epoxy resin was 2349. Samples were removed 15 minutes and thirt minutes after the peak temperature was reached to determine extent of reaction by measuring the EEW's which were 2118 and 2150 respectively. The final EEW was 2183.

The advanced epoxy resins of Examples 15 through 28 and comparative experiments A, B and C were represented by Formula A.

The characteristics of these resins were provided in Table I.

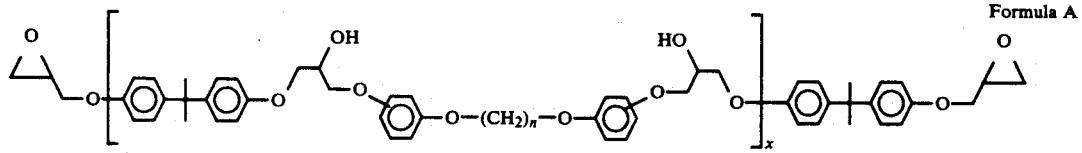

Formula A

TABLE I

| Expt. No. | Advanced Resin Employed | | Values of | | Isomer[c] | Viscosity | | | Tge °C. | Mw[f] |
|---|---|---|---|---|---|---|---|---|---|---|
| | Type | EEW | n | x[b] | | Gardner 25° C. | Cone and Plate 200° C. | | | |
| | | | | | | | cps | Pa·s | | |
| A*4 | C.E.B[g] | 1,845 | N/A[d] | N/A[d] | N/A[d] | Z2.5 | ND[a] | ND[a] | 80 | 12,028 |

TABLE I-continued

| Expt. No. | Advanced Resin Employed Type | EEW | Values of n | $x^b$ | Isomer[c] | Gardner 25° C. | Viscosity Cone and Plate 200° C. cps | Pa·s | Tge °C. | $M_w^f$ |
|---|---|---|---|---|---|---|---|---|---|---|
| B* | C.E.C[h] | 2,183 | N/A[d] | N/A[d] | N/A[d] | Z3.5 | ND[a] | ND[a] | 83 | 10,193 |
| C* | C.E.A[i] | 1,955 | N/A[d] | N/A[d] | N/A[d] | Z2— | 13,000 | 13 | 81 | 12,934 |
| D | Ex. 15 | 2,443 | 2 | 7.8 | m, m' | ND[a] | ND[a] | ND[a] | 59 | 47,381 |
| E | Ex. 16 | 2,019 | 2 | 6.3 | m, m' | Z4.5 | 13,500 | 13.5 | 61 | 22,630 |
| F | Ex. 17 | 2,118 | 4 | 6.3 | m, m' | Z2— | 10,250 | 10.25 | 54 | 21,674 |
| G | Ex. 18 | 1,706 | 4 | 5.0 | p, p' | Z1.5 | ND[a] | ND[a] | 53 | 11,413 |
| H | Ex. 19 | 2,139 | 8 | 5.9 | p, p' | Z4 | 5,500 | 5.5 | 41 | 14,937 |
| I | Ex. 20 | ND[a] | 4 | ND[a] | p, p' | Z1.5 | 5,190 | 5.19 | 54 | 12,473 |
| J | Ex. 21 | 1,560 | 4 | 4.5 | p, p' | ND[a] | 3,250 | 3.25 | 50 | 10,857 |
| K | Ex. 22 | 2,087 | 8 | 5.7 | p, p' | ND[a] | ND[a] | ND[a] | ND[a] | 14,356 |
| L | Ex. 23 | 2,057 | 8 | 5.6 | m, m' | ND[a] | ND[a] | ND[a] | 40.7 | 69,501 |
| M | Ex. 24 | 1,799 | 8 | 4.8 | m, m' | ND[a] | ND[a] | ND[a] | 42 | 65,444 |
| N | Ex. 25 | 1,654 | 8 | 4.4 | m, m' | ND[a] | 8,000 | 8 | 41 | 28,692 |
| O | Ex. 26 | 1509 | 8 | 4.0 | m, m' | ND[a] | 3,750[j] | 3.75[j] | <30 | 7,039 |
| P | Ex. 27 | 1,604 | 8 | 4.3 | m, m' | ND[a] | 23,000[j] | 23[j] | 39 | 18,102 |
| Q | Ex. 28 | 1,300 | 8 | 3.4 | m, m' | ND[a] | ND[a] | ND[a] | ND[a] | ND[a] |

Footnotes to Table I.
*Not an example of the present invention.
[a]Not Determined.
[b]x = ((2 × EEW) − 340.4)/Formula Weight of repeating unit.
[c]m = meta. p = para.
[d]Not Applicable.
[e]Glass transition temperature determined by differential scanning calorimetry (DSC).
[f]Weight average molecular weight by gel permeation chromatography (GPC) calibrated to polystyrene standards.
[g]The diglycidyl ether of bisphenol A advanced with bisphenol A having an EEW of 1845.
[h]The diglycidyl ether of bisphenol A advanced with bisphenol A having an EEW of 2183.
[i]The diglycidyl ether of bisphenol A advanced with bisphenol A having an EEW of 1955.
[j]Cone and plate viscosity at 150° C.

EXAMPLE 29

Preparation of Epoxy Resin From 1,8-Bis(4-Hydroxyphenoxy)Octane and the Diglycidyl Ether of 1,8-Bis(4-Hydroxyphenoxy)Octane An aluminum pan was charged with 6.38 grams (0.0268 epoxide equivalents) of the diglycidyl ether from example 6 and 3.60 grams (0.011 moles) of 1,8-Bis(4-hydroxyphenoxy)octane from example 4. The pan was then heated on a hot plate at 130° to 140° C. to effect a homogeneous melt of the reactants. Four drops of a 70 percent by weight solution of ethyltriphenyl phosphonium acetate.acetic acid complex catalyst in methanol was added with stirring and the temperature of the hot plate was increased to 195° C. to 205° C. The viscosity increases and the aluminum pan was removed from the hot plate 15 minutes after the addition of catalyst. The opaque, tan colored, brittle solid product was insoluble in methylene chloride, and soluble in hot (100° C.) 2-butoxyethanol and hot (100° C.) cyclohexanone.

EXAMPLE 30

Preparation of Epoxy Resin From 1,8-Bis(4-Hydroxyphenoxy)Octane and A 1/1 Molar Mixture of the Diglycidyl Ether of 1,8-Bis(4-Hydroxyphenoxy)Octane and Diglycidyl Ether of Bisphenol A An aluminum pan was charged with 3.19 grams (0.0134 epoxide equivalents) of the diglycidyl ether from example 6 and 2.53 grams (0.014 epoxide equivalents) of diglycidyl ether of bisphenol A having an EEW of 180.6 and 3.60 grams (0.011 moles) of 1,8-Bis(4-hydroxyphenoxy)octane from example 4. The pan was then heated on a hot plate at 130° to 140° C. to effect a homogeneous melt of the reactants. Four drops of a 70 percent by weight solution of ethyltriphenyl phosphonium acetate.acetic acid complex catalyst in methanol was added with stirring and the temperature of the hot plate was increased to 195° C. to 205° C. The viscosity increases and the aluminum pan was removed from the hot plate 15 minutes after the addition of catalyst. The opaque, tan colored, brittle solid product was swelled by methylene chloride, and soluble in hot (100° C.) 2-butoxyethanol and hot (100° C.) cyclohexanone.

EXAMPLE 31

Preparation of Epoxy Resin From 1,8-Bis(4-Hydroxyphenoxy)Octane and Diglycidyl Ether of Bisphenol A An aluminum pan was charged with 5.06 grams (0.028 epoxide equivalents) of the diglycidyl ether of bisphenol A having an EEW of 180.6 and 3.60 grams (0.011 moles) of 1,8-Bis(4-hydroxyphenoxy)octane from example 4. The pan was then heated on a hot plate at 130° C. to 140° C. to effect a homogeneous melt of the reactants. Four drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 10 minutes after the addition of catalyst. The clear, brittle solid product was soluble in methylene chloride, 2-butoxyethanol, and cyclohexanone and had an EEW of 1280.

EXAMPLE 32

Preparation of Epoxy Resin From Bisphenol A and the Diglycidyl Ether of 1,8-Bis(4-Hydroxyphenoxy)Octane An aluminum pan was charged with 6.38 grams (0.0268 epoxide equivalents) of the diglycidyl ether of 1,8-bis(4-hydroxyphenoxy)octane from example 6 and 2.51 grams (0.011 moles) bisphenol A. The pan was then heated on a hot plate at 130° C. to 140° C. to effect a homogeneous melt of the reactants. Four drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 10 minutes after the addition of catalyst. The clear, brittle solid product was slightly soluble in methylene chloride, and soluble in cyclohexanone, hot (100° C.) 2-butoxyethanol, and a 40/60 mixture by weight of cyclohexanone/2-butoxyethanol and had an EEW of 1822.

EXAMPLE 33

Preparation of Epoxy Resin From 1,2-Bis(3-Hydroxyphenoxy)Ethane and the Diglycidyl Ether of 1,8-Bis(4-Hydroxyphenoxy)Octane An aluminum pan was charged with 6.76 grams (0.028 epoxide equivalents) of the diglycidyl ether of 1,8-bis(4-hydroxyphenoxy)octane from example 6 and 2.71 grams (0.011 moles) 1,2-Bis(3-hydroxyphenoxy)ethane from example 1. The pan was then heated on a hot plate at 130° C. to 140° C. to effect a homogeneous melt of the reactants. One drop of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 7 minutes after the addition of catalyst. The opaque, brittle solid product was not soluble in methylene chloride, but it was soluble in hot 2-butoxyethanol. It was also soluble in warm (50° C.) cyclohexanone and a warm (50° C.) 40/60 mixture by weight of cyclohexanone/2-butoxyethanol, but only slightly soluble in these two solvents at room temperature.

EXAMPLE 34

Preparation of Epoxy Resin From 1,4-Bis(3-Hydroxyphenoxy)Butane and the Diglycidyl Ether of 1,8-Bis(4-Hydroxyphenoxy)Octane An aluminum pan was charged with 6.76 grams (0.028 epoxide equivalents) of the diglycidyl ether of 1,8-bis(4-hydroxyphenoxy)octane from example 6 and 3.01 grams (0.011 moles) 1,4-Bis(3-hydroxyphenoxy)butane from example 2. The pan was then heated on a hot plate at 1300° C. to 140° C. to effect a homogeneous melt of the reactants. One drop of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The opaque, brittle solid product was swelled by methylene chloride, but it was soluble in hot (100° C.) 2-butoxyethanol. It was also soluble in cyclohexanone at room temperature and a warm (50° C.) 40/60 mixture by weight of cyclohexanone/2-butoxyethanol, but only slightly soluble in the latter solvent mix at room temperature.

EXAMPLE 35

Preparation of Epoxy Resin From 1,8-Bis(3-Hydroxyphenoxy)Octane and the Diglycidyl Ether of 1,8-Bis(4-Hydroxyphenoxy)Octane An aluminum pan was charged with 6.76 grams (0.028 epoxide equivalents) of the diglycidyl ether of 1,8-bis(4-hydroxyphenoxy)octane from example 6 and 3.63 grams (0.011 moles) 1,8-Bis(3-hydroxyphenoxy)octane from example 5. The pan was then heated on a hot plate at 130° C. to 140° C. to effect a homogeneous melt of the reactants. One drop of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The opaque, brittle solid product was slightly soluble in methylene chloride and soluble in hot (100° C.) 2-butoxyethanol. It was also soluble in cyclohexanone at room temperature and a warm (50° C) 40/60 mixture by weight of cyclohexanone/2-butoxyethanol, but only slightly soluble in the latter solvent mix at room temperature.

EXAMPLE 36

Preparation of Epoxy Resin From 1,4-Bis(3-Hydroxyphenoxy)Butane and the Diglycidyl Ether of Bisphenol F An aluminum pan was charged with 5.96 grams (0.0344 epoxide equivalents) of the diglycidyl ether of Bisphenol F and 4.02 grams (0.0147 moles) 1,4-Bis(3-hydroxyphenoxy)butane from example 2. The pan was then heated on a hot plate to effect a homogeneous melt of the reactants. Two drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The clear, brittle solid was soluble in methylene chloride and in hot (100° C.) 2-butoxyethanol. It was also soluble in cyclohexanone and in a 40/60 mixture by weight of cyclohexanone/2-butoxyethanol at room temperature. The product had an EEW of 1563, and a Tg of 43° C. was determined on the product by Differential Scanning Calorimetry.

EXAMPLE 37

Preparation of Epoxy Resin From 1,2-Bis(3-Hydroxyphenoxy)Ethane and the Diglycidyl Ether of Bisphenol F An aluminum pan was charged with 6.20 grams (0.0358 epoxide equivalents) of the diglycidyl ether of Bisphenol F and 3.78 grams (0.0154 moles) 1,2-Bis(3-hydroxyphenoxy)ethane from example 1. The pan was then heated on a hot plate to effect a homogeneous melt of the reactants. Two drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The clear, brittle solid product was swelled by methylene chloride and was slightly soluble in hot (100° C.) 2-butoxyethanol. It was also soluble in cyclohexanone and in 40/60 cyclohexanone/2-butoxyethanol at room temperature. The product had an EEW of 2129, and a Tg of 54° C. was determined for the product by Differential Scanning Calorimetry.

EXAMPLE 38

Preparation of Epoxy Resin From
1,4-Bis(4-Hydroxyphenoxy)Butane and the Diglycidyl Ether of Bisphenol F An aluminum pan was charged with 5.96 grams (0.0344 epoxide equivalents) of the diglycidyl ether of Bisphenol F and 4.02 grams (0.0147 moles) 1,4-Bis(4-hydroxyphenoxy)butane from example 3. The pan was then heated on a hot plate to effect a homogeneous melt of the reactants. Three drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The clear, brittle solid product was soluble in methylene chloride and in hot (100° C.) 2-butoxyethanol. It was also soluble in cyclohexanone and in a 40/60 mixture by weight of cyclohexanone/2-butoxyethanol at room temperature. The product had an EEW of 1581, and a Tg of 42° C. was determined for the product by Differential Scanning Calorimetry.

EXAMPLE 39

Preparation of Epoxy Resin from
1,8-Bis(4-Hydroxyphenoxy)octane and the Diglycidyl Ether of Bisphenol F An aluminum pan was charged with 5.53 grams (0.0319 epoxide equivalents) of the diglycidyl ether of Bisphenol F and 4.44 grams (0.0134 moles) 1,8-Bis(4-hydroxyphenoxy)octane from example 4. The pan was then heated on a hot plate to effect a homogeneous melt of the reactants. Three drops of a 70 percent by weight solution of ethyltriphenyl phosphonium acetate.acetic acid complex catalyst in methanol was added with stirring and the temperature of the hot plate was increased to 200° C. to 220° C. The viscosity increases and the aluminum pan was removed from the hot plate 15 minutes after the addition of catalyst. The clear, brittle solid product was soluble in methylene chloride and in warm (50° C.) 2-butoxyethanol. It was also soluble in cyclohexanone and in a 40/60 mixture by weight of cyclohexanone/2-butoxyethanol at room temperature. The product had an EEW of 1514.

EXAMPLE 40

Preparation of Epoxy Resin from
1,8-Bis(4-Hydroxyphenoxy)octane and a 1/1 Molar Mixture of the Diglycidyl Ether of
1,8-Bis(4-Hydroxyphenoxy)octane and of Bisphenol F An aluminum pan was charged with 3.19 grams (0.0134 epoxide equivalents) of the diglycidyl ether of 1,8-bis(4-hydroxyphenoxy)octane from example 6 and 2.53 grams (0.014 epoxide equivalents) of the diglycidyl ether of Bisphenol F and 3.60 grams (0.011 moles) of 1,8-Bis(4-hydroxyphenoxy)octane from example 4. The pan was then heated on a hot plate at 130° C. to 140° C. to effect a homogeneous melt of the reactants. Three drops of a 70 percent by weight solution of ethyltriphenyl phosphonium acetate.acetic acid complex catalyst in methanol was added with stirring and the temperature of the hot plate was increased to 195° C. to 205° C. The viscosity increases and the aluminum pan was removed from the hot plate 15 minutes after the addition of catalyst. The moderately opaque, tan colored, brittle solid product was swelled by methylene chloride, and soluble in hot (100° C.) 2-butoxyethanol and warm cyclohexanone. It was slightly soluble in warm (50° C.) 2-butoxyethanol and in cyclohexanone at room temperature. It was also slightly soluble in a warm (50° C.) 40/60 mixture by weight of cyclohexanone/2-butoxyethanol.

EXAMPLE 41

Preparation of Epoxy Resin from
1,8-Bis(4-Hydroxyphenoxy)octane and the Diglycidyl Ether of Bisphenol F An aluminum pan was charged with 11.06 grams (0.0638 epoxide equivalents) of the diglycidyl ether of Bisphenol F and 8.88 grams (0.0269 moles) 1,8-Bis(4-hydroxyphenoxy)octane from example 4. The pan was then heated on a hotplate to about 130° to 140° C. to effect a homogeneous melt of the reactants. Six drops of a 70 percent by weight solution of ethyltriphenyl phosphonium acetate/acetic acid complex catalyst in methanol was added with stirring and the temperature of the hotplate was increased to 190° to 210° C. The viscosity increases and the aluminum pan was removed from the hotplate 18 minutes after the addition of catalyst. The clear, brittle solid was soluble in methylene chloride and in warm 2-butoxyethanol. It was also soluble in cyclohexanone and in 40/60 cyclohexanone/2-butoxyethanol at room temperature. An epoxide equivalent weight of 1853 was determined by a standard epoxide titration method.

EXAMPLE 42

Preparation of Epoxy Resin from
1,8-Bis(3-Hydroxyphenoxy)octane and the Diglycidyl Ether of 1,8-Bis(3-Hydroxyphenoxy)octane A three-neck 250 ml round bottom flask equipped with a thermocouple and an air driven steel stirrer shaft was charged with 64.31 grams of the diglycidyl ether of 1,8-Bis(3-hydroxyphenoxy)octane having an EEW of 234.75 prepared in example 50-32, and 35.55 grams (0.1076 moles) 1,8-Bis(3-hydroxyphenoxy)octane prepared as in example 5 and recrystallized from acetone to a purity of 93 percent by HPLC peak area. The mixture was heated with stirring to about 100° C. to melt the reactants, then cooled to 80° C. before adding 0.100 grams of a 70 percent by weight solution of ethyltriphenyl phosphonium acetate/acetic acid complex catalyst in methanol under a nitrogen purge of 200 ml/min. The temperature was increased over a one hour and eleven minute period to 185° C. and cooked for another forty-eight minutes at 185° C. before pouring out the contents on a sheet of aluminum foil to cool. The EEW of the product was 1853.

EXAMPLE 43

Preparation of Epoxy Resin from
1,8-Bis(3-Hydroxyphenoxy)octane and the Diglycidyl Ether of 1,8-Bis(3-Hydroxyphenoxy)octane A three-neck 250 ml round bottom flask equipped with a thermocouple and an air driven steel stirrer shaft was charged with 64.31 grams of the diglycidyl ether of 1,8-Bis(3-hydroxyphenoxy)octane having an EEW of 234.75 prepared in example 50-32, and 35.55 grams (0.1076 moles) 1,8-Bis(3-hydroxyphenoxy)octane prepared as in example 5 and recrystallized from acetone to a purity of 93 percent by HPLC peak area. The mixture was heated with stirring to about 80° C. before adding 0.070 grams of a 70 percent by weight solution of ethyltriphenyl phosphonium acetate/acetic acid complex catalyst in methanol under a nitrogen purge of 200 ml/min. The temperature was increased over a thirty-one minute period to 120° C. then over a nineteen minute period to 150° C. The reaction mixture was cooked for another forty-five minutes at 130° C. before pouring out the contents on a sheet of aluminum foil to cool. Samples were removed when the temperature reaches 120° C. and at zero, 15, 30, and 45 minutes after the peak temperature of 150° C. was reached to determine extent of reaction by measuring the EEW's which were 415, 789, 1378, 1598, and 1713 respectively.

EXAMPLE 44

Preparation of Epoxy Resin from 1,2-Bis(3-Hydroxyphenoxy)ethane and the Diglycidyl Ether of 1,8-Bis(3-Hydroxyphenoxy)octane A three-neck 250 ml round bottom flask equipped with a thermocouple and an air driven steel stirrer shaft was charged with 70.25 grams of the diglycidyl ether of 1,8-Bis(3-hydroxyphenoxy)octane having an EEW of 234.75 prepared in example 50-32, and 29.61 grams 1,2-Bis(3-hydroxyphenoxy)ethane from example 1. The mixture was heated with stirring to about 85° C. before adding 0.0700 grams of a 70 percent by weight solution of ethyltriphenyl phosphonium acetate/acetic acid complex catalyst in methanol under a nitrogen purge of 200 ml/min. The temperature was increased over a thirty minute period to 120° C. then over a seven minute period to 140° C. The reaction mixture was cooked for another forty-six minutes at 135° to 140° C. before pouring out the contents on a sheet of aluminum foil to cool. Samples were removed when the temperature reaches 120° C. and at zero, 15, 30, and 46 minutes after the peak temperature of 140° C. was reached to determine extent of reaction by measuring the EEW's which were 448, 991, 1706, 1838, and 1902 respectively.

EXAMPLE 45

Preparation of Epoxy Resin from 1,2-Bis(3-Hydroxyphenoxy)ethane and the Diglycidyl Ether of 1,2-Bis(3-Hydroxyphenoxy)ethane A three-neck 250 ml round bottom flask equipped with a thermocouple and an air driven steel stirrer shaft was charged with 64.74 grams of the diglycidyl ether of 1,2-Bis(3-hydroxyphenoxy)ethane having an EEW of 186.3 prepared in example 50-38, and 35.11 grams 1,2-Bis(3-hydroxyphenoxy)ethane from example 1. The mixture was heated with stirring to about 85° C. before adding 0.0700 grams of a 70 percent by weight solution of ethyltriphenyl phosphonium acetate/acetic acid complex catalyst in methanol under a nitrogen purge of 200 ml/min. The temperature was increased over a fifteen minute period to 120° C. then over a six minute period to 135° C. The reaction mixture was cooked for another thirty minutes at 135° C. before pouring out the contents on a sheet of aluminum foil to cool. Samples were removed when the temperature reaches 120° C. and at zero, 15, and 30 minutes after the peak temperature of 135° C. was reached to determine extent of reaction by measuring the EEW's which were 341, 435, 840, and 1784 respectively.

EXAMPLE 46

Preparation of Advanced Epoxy Resin from the Diglycidyl Ether of Bisphenol A and Poly(Bisphenol A) Ether of Ethylene Glycol A three-neck 250 ml round bottom flask equipped with a thermocouple and an air driven steel stirrer shaft was charged with 50.815 grams (0.281 equiv.) of a diglycidyl ether of bisphenol A having an EEW of 180.6, and 49.042 grams (0.1158 moles, 0.2316 OH equiv., 8.0266 percent OH) of poly(bisphenol A) ether of ethylene glycol prepared in example 45529-32, then heated with stirring under a nitrogen purge of 200 ml/min to about 80° C. before adding 0.143 grams of a 70 percent by weight solution of ethyltriphenyl phosphonium acetate/acetic acid complex catalyst in methanol. The temperature was increased over a twenty-nine minute period to 185° C. and held at that temperature for one hour before quickly pouring out the contents on a sheet of aluminum foil to cool. A sample was removed when the peak temperature of 185° C. was reached to determine extent of reaction by measuring the EEW which was 2905. The EEW of the resultant advanced epoxy resin was 3805.

EXAMPLE 47

Preparation of Advanced Epoxy Resin from the Diglycidyl Ether of Bisphenol A and Poly(Bisphenol A) Ether of Ethylene Glycol An aluminum pan was charged with 7.559 grams (0.0444 epoxy equiv.) of a diglycidyl ether of bisphenol A having an EEW of 180.6, and 7.420 grams (0.0172 moles, 0.0344 OH equiv., 7.878 percent OH) of poly(bisphenol A) ether of ethylene glycol prepared in example 45529-32. The pan was then heated on a hotplate at 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 30 minutes after the addition of catalyst. The EEW of the resultant advanced epoxy resin was 2299.

EXAMPLE 48

Preparation of Advanced Epoxy Resin from the Diglycidyl Ether of Bisphenol A and Poly(Bisphenol A) Ether of Ethylene Glycol An aluminum pan was charged with 7.622 grams (0.0422 epoxy equiv.) of a diglycidyl ether of bisphenol A having an EEW of 180.6, and 7.356 grams (0.0174 moles, 0.0347 OH equiv., 8.0266 percent OH) of poly(bisphenol A) ether of ethylene glycol prepared in example 45529-32. The pan was then heated on a hotplate at 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 15 minutes after the addition of catalyst. The EEW of the resultant advanced epoxy resin was 1945.

EXAMPLE 49

Preparation of Advanced Epoxy Resin from the Diglycidyl Ether of Bisphenol A and Poly(Bisphenol A) Ether of Ethylene Glycol An aluminum pan was charged with 8.354 grams (0.0491 epoxy equiv.) of a diglycidyl ether of bisphenol A having an EEW of 180.6, and 6.624 grams (0.0190 moles, 0.0380 OH equiv., 9.74 percent OH) of poly(bisphenol A) ether of ethylene glycol prepared as in example 45529-32. The pan was then heated on a hotplate at 130° to 140° C. to effect a homogeneous melt of the reactants. Then 0.0215 grams of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 45 minutes after the addition of catalyst. The EEW of the resultant advanced epoxy resin was 1268.

EXAMPLE 50

Preparation of Advanced Epoxy Resin from the Diglycidyl Ether of Bisphenol A and Poly(Bisphenol A) Ether of Ethylene Glycol An aluminum pan was charged with 8.670 grams (0.0480 epoxy equiv.) of a diglycidyl ether of bisphenol A having an EEW of 180.6, and 6.309 grams (0.0198 moles, 0.0397 OH equiv., 10.7 percent OH) of poly(bisphenol A) ether of ethylene glycol prepared as in example 45529-32. The pan was then heated on a hotplaee at 130° to 140° C. to effect a homogeneous melt of the reactants. Then 0.0215 grams of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 30 minutes after the addition of catalyst. The EEW of the resultant advanced epoxy resin was 1000.

EXAMPLE 51

Preparation of Advanced Epoxy Resin from the Diglycidyl Ether of Bisphenol A and Poly(Bisphenol A) Ether of Ethylene Glycol An aluminum pan was charged with 7.559 grams (0.0444 epoxy equiv.) of a diglycidyl ether of bisphenol A having an EEW of 180.6, and 7.420 grams (0.0172 moles, 0.0344 OH equiv., 7.878 percent OH) of poly(bisphenol A) ether of ethylene glycol prepared in example 45529-32. The pan was then heated on a hotplate at 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 15 minutes after the addition of catalyst. The EEW of the resultant advanced epoxy resin was 2019.

EXAMPLE 52

Preparation of Advanced Epoxy Resin from the Diglycidyl Ether of Poly(Bisphenol A) Ether of Ethylene Glycol and Poly(Bisphenol A) Ether of Ethylene Glycol An aluminum pan was charged with 8.4543 grams (0.0358 epoxy equiv.) of the diglycidyl ether of poly(bisphwol A) ether of ethylene glycol prepared in example 45529-41 having an EEW of 236.173, and 6.5243 grams (0.0154 moles, 0.0308 OH equiv., 8.0266 percent OH) of poly(bisphenol A) ether of ethylene glycol prepared in example 45529-32. The pan was then heated on a hotplate at 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 15 minutes after the addition of catalyst. The EEW of the resultant advanced epoxy resin was 2986.

EXAMPLE 53

Preparation of Advanced Epoxy Resin from the Diglycidyl Ether of Poly(Bisphenol A) Ether of Ethylene Glycol and Poly(Bisphenol A) Ether of Ethylene Glycol An aluminum pan was charged with 8.7332 grams (0.0370 epoxy equiv.) of the diglycidyl ether of poly(bisphenol A) ether of ethylene glycol prepared in example 45529-41 having an EEW of 236.173, and 6.2456 grams (0.0148 moles, 0.0295 OH equiv., 8.0266 percent OH) of poly(bisphenol A) ether of ethylene glycol prepared in example 45529-32. The pan was then heated on a hotplate at 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 20 minutes after the addition of catalyst. The EEW of the resultant advanced epoxy resin was 2515.

EXAMPLE 54

Preparation of Advanced Epoxy Resin from the Diglycidyl Ether of Poly(Bisphenol A) Ether of Ethylene Glycol and Bisphenol F A three-neck 250 ml round bottom flask equipped with a thermocouple and an air driven steel stirrer shaft was charged with 71.16 grams (0.3013 epoxide equiv.) of a diglycidyl ether of poly(bisphenol A) ether of ethylene glycol prepared in example 45529-41 having an EEW of 236.173, and 28.70 grams (0.1433 moles, 0.2867 OH equiv.) of bisphenol F, then heated with stirring under a nitrogen purge of 200 ml/min to about 65° C. before adding 0.143 grams of a 70 percent by weight solution of ethyltriphenyl phosphonium acetate/acetic acid complex catalyst in methanol. The temperature was increased over a thirty minute period to 130° C. and held at that temperature four minutes before quickly pouring out the contents on a sheet of aluminum foil to cool. The EEW of the resultant advanced epoxy resin was 3872.

EXAMPLE 55

Preparation of Epoxy Resin From 1,8-Bis(3-Hydroxyphenoxy)Octane and the Diglycidyl Ether of Bisphenol F An aluminum pan was charged with 11.06 grams (0.0638 epoxide equivalents) of the diglycidyl ether of Bisphenol F and 8.88 grams (0.0269 moles) 1,8-Bis(3-hydroxyphenoxy)octane from example 5. The pan was then heated on a hotplate to about 130° to 140° C. to effect a homogeneous melt of the reactants. Six drops of a 70 percent by weight solution of ethyltriphenyl phosphonium acetate/acetic acid complex catalyst in methanol was added with stirring and the temperature of the hotplate was increased to 190° to 210° C. The viscosity increases and the aluminum pan was removed from the hotplate 17 minutes after the addition of catalyst. The clear, brittle solid was soluble in methylene chloride and in warm 2-butoxyethanol. It was also soluble in cyclohexanone and in 40/60 cyclohexanone/2-butoxyethanol at room temperature. An epoxide equivalent weight of 1861 was determined by a standard epoxide titration method.

EXAMPLE 56

Preparation of Epoxy Resin From 1,8-Bis(4-Hydroxyphenoxy)Octane and the Diglycidyl Ether of 1,8-Bis(3-Hydroxyphenoxy)Octane An aluminum pan was charged with 6.34 grams (0.0271 epoxide equivalents) of the diglycidyl ether from example 7 (18.36 percent epoxide) and 3.64 grams (0.011 moles) 1,8-Bis(3-hydroxyphenoxy)octane from example 4. The pan was then heated on a hotplate at 130° to 140° C. to effect a homogeneous melt of the reactants. Two drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 20 minutes after the addition of catalyst. The clear, rubber-like product had an EEW of 1593 and was slightly soluble in methylene chloride.

COMPARATIVE EXPERIMENT D

Preparation of Advanced Epoxy Resin From the Diglycidyl Ether of Bisphenol A and Bisphenol F A three-neck 250 ml round bottom flask equipped with a thermocouple and an air driven steel stirrer shaft was charged with 113.17 grams (0.627 epoxide equiv.) of a diglycidyl ether of bisphenol A having an EEW of 180.6, and 54.06 grams (0.270 moles, 0.540 OH equiv.) of bisphenol F, then heated with stirring under a nitrogen purge of 200 ml/min to 85° C. before adding 0.25 grams of a 70 percent by weight solution of ethyltriphenyl phosphonium acetate/acetic acid complex catalyst in methanol. The temperature was increased over a thirty-seven minute period to 190° C. At that point the reaction exotherms up to a peak temperature of 195° C., so the heating mantle was removed and a stream of cooling air was directed at the flask. The reaction mixture was cooked at 185° C. until one hour after the reaction temperature first reaches 190° C., then it was quickly heated to 210° C. before quickly pouring out the contents on a sheet of aluminum foil to cool. The EEW of the resultant advanced epoxy resin was 2205.

COMPARATIVE EXPERIMENT E

Preparation of Advanced Epoxy Resin From the Diglycidyl Ether of Bisphenol A and Bisphenol F A three-neck 250 ml round bottom flask equipped with a thermocouple and an air driven steel stirrer shaft was charged with 135.34 grams (0.749 epoxide equiv.) of a diglycidyl ether of bisphenol A having an EEW of 180.6, and 64.66 grams (0.323 moles, 0.646 OH equiv.) of bisphenol F, then heated with stirring under a nitrogen purge of 200 ml/min to 89° C. before adding 0.286 grams of a 70 percent by weight solution of ethyltriphenyl phosphonium acetate/acetic acid complex catalyst in methanol. The temperature was increased over a forty minute period to 190° C. At that point the reaction exotherms up to a peak temperature of 198° C., so the heating mantle was removed and a stream of cooling air was directed at the flask. The reaction mixture was cooked at 185° C. until one hour after the reaction temperature first reaches 190° C., then it was quickly heated to 210° C. before quickly pouring out the contents on a sheet of aluminum foil to cool. The EEW of the resultant advanced epoxy resin was 2263.

COMPARATIVE EXPERIMENT F

Preparation of Advanced Epoxy Resin From the Diglycidyl Ether of Bisphenol A and Bisphenol A A three-neck 250 ml round bottom flask equipped with a thermometer and an air driven steel stirrer shaft was charged with 129.53 grams (0.717 equiv.) of a diglycidyl ether of bisphenol A having an EEW of 180.6, and 70.47 grams (0.309 moles, 0.618 OH equiv.) of bisphenol A, then heated with stirring under a nitrogen purge of 200 ml/min to about 85° C. before adding 0.286 grams of a 70 percent by weight solution of ethyltriphenyl phosphonium acetate/acetic acid complex catalyst in methanol. The temperature was increased over a forty-five minute period to 190° C. At that point the reaction exothermed, so the heating mantle was removed and a stream of cooling air was directed at the flask. The reaction temperature peaks at 196° C. The reaction mixture was cooked at 185° C. and was then quickly heated to 210° C. before quickly pouring out the contents on a sheet of aluminum foil to cool thirty minutes after the temperature of 190° C. was reached. The EEW of the resultant advanced epoxy resin was 2139.

COMPARATIVE EXPERIMENT G

Preparation of Advanced Epoxy Resin From the Diglycidyl Ether of Bisphenol A and Bisphenol A A three-neck 250 ml round bottom flask equipped with a thermocouple and an air driven steel stirrer shaft was charged with 128.7 grams (0.71 equiv.) of a diglycidyl ether of bisphenol A having an EEW of 180.6, and 71.0 grams (0.311 moles, 0.622 OH equiv.) of bisphenol A, then heated with stirring under a nitrogen purge of 200 ml/min to about 85° C. before adding 0.286 grams of a 70 percent by weight solution of ethyltriphenyl phosphonium acetate/acetic acid complex catalyst in methanol. The temperature was increased over a forty-one minute period to 190° C. At that point the reaction exothermed, so the heating mantle was removed and a stream of cooling air was directed at the flask. The reaction temperature peaks at 195° C. The reaction mixture was cooked at 185° C. for another hour and was then quickly heated to 210° C. before quickly pouring out the contents on a sheet of aluminum foil to cool. The EEW of the resultant advanced epoxy resin was 2349.

COMPARATIVE EXPERIMENT H

Preparation of Advanced Epoxy Resin From the Diglycidyl Ether of Bisphenol A and Bisphenol A A three-neck 250 ml round bottom flask equipped with a thermocouple and an air driven steel stirrer shaft was charged with 65.99 grams (0.352 equiv.) of a diglycidyl ether of bisphenol A having an EEW of 187.36, and 33.87 grams (0.1484 moles, 0.297 OH equiv.) of bisphenol A, then heated with stirring under a nitrogen purge of 200 ml/min to about 80° C. before adding 0.143 grams of a 70 percent by weight solution of ethyltriphenyl phosphonium acetate/acetic acid complex catalyst in methanol. The temperature was increased over a thirty-seven minute period to 176° C., then cooked an additional thirty minutes at 175° C. and quickly heated to 210° C. before quickly pouring out the contents on a sheet of aluminum foil to cool. Samples were removed at the peak temperature of 176° C. and 15 minutes after the peak temperature to determine extent of reaction by measuring the EEW's which were 1920 and 1991 respectively. The final EEW was 2038.

COMPARATIVE EXPERIMENT I

Preparation of Advanced Epoxy Resin From the Diglycidyl Ether of Bisphenol A and Bisphenol A A three-neck 250 ml round bottom flask equipped with a thermocouple and an air driven steel stirrer shaft was charged with 65.98 grams (0.352 equiv.) of a diglycidyl ether of bisphenol A having an EEW of 187.31, and 33.88 grams (0.1484 moles, 0.297 OH equiv.) of bisphenol A, then heated with stirring under a nitrogen purge of 200 ml/min to about 80° C. before adding 0.143 grams of a 70 percent by weight solution of ethyltriphenyl phosphonium acetate/acetic acid complex catalyst in methanol. The temperature was increased over a twenty-seven minute period to 175° C., then cooked an additional thirty minutes at 175° C. and quickly heated to 210° C. before quickly pouring out the contents on a sheet of aluminum foil to cool. Samples were removed when the peak temperature of 175° C. was reached and 15 minutes after the peak temperature was reached to determine extent of reaction by measuring the EEW's which were 1748 and 1830 respectively. The final EEW was 1861.

COMPARATIVE EXPERIMENT J

Preparation of Advanced Epoxy Resin From the Diglycidyl Ether of Bisphenol F and Bisphenol F A three-neck 250 ml round bottom flask equipped with a thermocouple and an air driven steel stirrer shaft was charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 85° C. before adding 0.143 grams of a 70 percent by weight solution of ethyltriphenyl phosphonium acetate/acetic acid complex catalyst in methanol. The temperature was increased over a fourteen minute period to 200° C., then cooked one hour at 185° C. before quickly pouring out the contents on a sheet of aluminum foil to cool. A sample was removed when the peak temperature of 200° C. was reached to determine extent of reaction by measuring the EEW which was 1741. The final EEW was 2139.

COMPARATIVE EXPERIMENT K

Preparation of Advanced Epoxy Resin From the Diglycidyl Ether of Bisphenol F and Bisphenol F A three-neck 250 ml round bottom flask equipped with a thermocouple and an air driven steel stirrer shaft was charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 80° C. before adding 0.143 grams of a 70 percent by weight solution of ethyltriphenyl phosphonium acetate/acetic acid complex catalyst in methanol. The temperature was increased over a thirteen minute period to 135° C., then cooked another twenty-nine minutes at 130° C. before quickly pouring out the contents on a sheet of aluminum foil to cool. A sample was removed when the peak temperature of 135° C. was reached to determine extent of reaction by measuring the EEW which was 1734. The final EEW was 2150.

COMPARATIVE EXPERIMENT L

Preparation of Advanced Epoxy Resin From the Diglycidyl Ether of Bisphenol F and Bisphenol F A three-neck 250 ml round bottom flask equipped with a thermocouple and an air driven steel stirrer shaft was charged with 66.472 grams (0.383 equiv.) of a diglycidyl ether of bisphenol F having an EEW of 173.39, and 33.385 grams (0.1667 moles, 0.3334 OH equiv.) of bisphenol F, then heated with stirring under a nitrogen purge of 200 ml/min to 70° C. before adding 0.143 grams of a 70 percent by weight solution of ethyltriphenyl phosphonium acetate/acetic acid complex catalyst in methanol. The temperature was increased over a fourteen minute period to 79° C., then increased again over a ten minute period to 123° C., and cooked another fifteen minutes at 120° C. before quickly pouring out the contents on a sheet of aluminum foil to cool. The EEW of the resultant advanced epoxy resin was 1937.

COMPARATIVE EXPERIMENT M

Preparation of Advanced Epoxy Resin From the Diglycidyl Ether of Bisphenol F and Bisphenol A A three-neck 250 ml round bottom flask equipped with a thermocouple and an air driven steel stirrer shaft was charged with 63.65 grams (0.367 equiv.) of a diglycidyl ether of bisphenol F having an EEW of 173.39, and 36.21 grams (0.1586 moles, 0.317 OH equiv.) of bisphenol A, then heated with stirring under a nitrogen purge of 200 ml/min to 65° C. before adding 0.143 grams of a 70 percent by weight solution of ethyltriphenyl phosphonium acetate/acetic acid complex catalyst in methanol. The temperature was increased over a twenty-three minute period to 85° C., then increased again over a twenty-one minute period to 130° C., and cooked another seventeen minutes at 130° C. before quickly pouring out the contents on a sheet of aluminum foil to cool. The EEW of the resultant advanced epoxy resin was 1955.

COMPARATIVE EXPERIMENT N

Preparation of Advanced Epoxy Resin From the Diglycidyl Ether of Bisphenol F and Bisphenol F A three-neck 250 ml round bottom flask equipped with a thermocouple and an air driven steel stirrer shaft was charged with 66.18 grams (0.382 equiv.) of a diglycidyl ether of bisphenol F having an EEW of 173.39, and 33.67 grams (0.168 moles, 0.336 OH equiv.) of bisphenol F, then heated with stirring under a nitrogen purge of 200 ml/min to 61° C. before adding 0.143 grams of a 70 percent by weight solution of ethyltriphenyl phosphonium acetate/acetic acid complex catalyst in methanol. The temperature was increased over a twenty-five minute period to 125° C., and cooked another five minutes at 135° C. before quickly pouring out the contents on a sheet of aluminum foil to cool. The EEW of the resultant advanced epoxy resin was 1762.

COMPARATIVE EXPERIMENT O

Preparation of Advanced Epoxy Resin From Bisphenol A and the Diglycidyl Ether of Bisphenol F An aluminum pan was charged with 12.73 grams (0.0734 epoxy equiv.) of a diglycidyl ether of Bisphenol F and 7.24 grams (0.0317 moles, 0.0634 OH equiv.) of bisphenol A. The pan was then heated on a hotplate to about 130° to 140° C. to effect a homogeneous melt of the reactants. Four drops of a 70 percent by weight solution of ethyltriphenyl phosphonium acetate/acetic acid complex catalyst in methanol was added with stirring and the temperature of the hotplate was increased to 190° to 210° C. The viscosity increases and the aluminum pan was removed from the hotplate 15 minutes after the addition of catalyst. The EEW of the resultant advanced epoxy resin was 1911.

COMPARATIVE EXPERIMENT P

Comparative Example 44752-4B. Preparation of Advanced Epoxy Resin From the Diglycidyl Ether of Bisphenol A and Bisphenol A An aluminum pan was charged with 11.32 grams (0.0627 epoxy equiv.) of a diglycidyl ether of bisphenol A having an EEW of 180.6, and 6.16 grams (0.0270 moles, 0.0540 OH equiv.) of bisphenol A. The pan was then heated on a hotplate at 130° to 140° C. to effect a homogeneous melt of the reactants. Three drops of a 70 percent by weight solution of ethyltriphenyl phosphonium acetate/acetic acid complex catalyst in methanol was added with stirring and the temperature of the hotplate was increased to 200° C. The viscosity increases and the aluminum pan was removed from the hot plate 20 minutes after the addition of catalyst. The EEW of the resultant advanced epoxy resin was 2057.

The advanced epoxy resins of Examples 29 to 56 were represented by Formula B. The characteristics of these resin are provided in Table II.

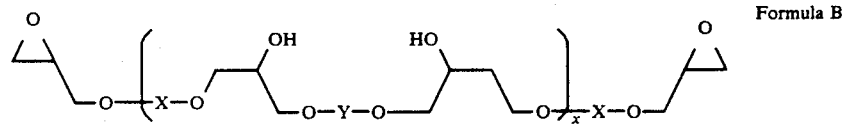

Formula B

TABLE II

| Expt. No. | Resin Prep. (Ex. No.) | Resin$^a$ X Residue of | Resin$^a$ Y Residue of | Value of $x$ | EEW | Viscosity Gardner 25° C. | Viscosity Cone and Plate 200° C. Cps | Viscosity Cone and Plate 200° C. Pa·s | Tg °C. | MWw |
|---|---|---|---|---|---|---|---|---|---|---|
| R | 29 | p-ODDP$^a$ | p-ODDP$^a$ | 4.6$^{e,g}$ | 2000$^{e,g}$ | ND$^d$ | ND$^d$ | ND$^d$ | ND$^d$ | ND$^d$ |
| S | 30 | p-ODDP$^a$, Bis A (50% ea.) | p-ODDP$^a$ | 5.0$^{e,g}$ | 2000$^{e,g}$ | ND$^d$ | ND$^d$ | ND$^d$ | ND$^d$ | ND$^d$ |
| T | 31 | Bis A | p-ODDP$^a$ | 3.3 | 1280 | ND$^d$ | ND$^d$ | ND$^d$ | ND$^d$ | ND$^d$ |
| Y | 32 | p-ODDP$^a$ | Bis A | 4.8 | 1822 | ND$^d$ | ND$^d$ | ND$^d$ | ND$^d$ | ND$^d$ |
| V | 33 | p-ODDP$^a$ | m-EDDP$^b$ | 5.2$^{e,g}$ | 2000$^{e,g}$ | ND$^d$ | ND$^d$ | ND$^d$ | ND$^d$ | ND$^d$ |
| W | 34 | p-ODDP$^a$ | m-BDDP$^c$ | 5.0$^{e,g}$ | 2000$^{e,g}$ | ND$^d$ | ND$^d$ | ND$^d$ | ND$^d$ | ND$^d$ |
| X | 35 | p-ODDP$^a$ | m-ODDP$^a$ | 4.6$^{e,g}$ | 2000$^{e,g}$ | ND$^d$ | ND$^d$ | ND$^d$ | ND$^d$ | ND$^d$ |
| Y | 36 | Bis F | m-BDDP$^c$ | 4.8 | 1563 | ND$^d$ | ND$^d$ | ND$^d$ | 45 | |
| Z | 37 | Bis F | m-EDDP$^b$ | 7.1 | 2129 | ND$^d$ | ND$^d$ | ND$^d$ | 57 | ND$^d$ |
| AA | 38 | Bis F | p-BDDP$^c$ | 4.9 | 1581 | ND$^d$ | ND$^d$ | ND$^d$ | 44 | ND$^d$ |
| AB | 39 | Bis F | p-ODDP$^a$ | 4.2 | 1514 | ND$^d$ | ND$^d$ | ND$^d$ | ND$^d$ | ND$^d$ |
| AC | 40 | p-ODDP$^a$, Bis F (50% ea.) | p-ODDP$^a$ | 5.1$^{e,g}$ | 2,000$^{e,g}$ | ND$^d$ | ND$^d$ | ND$^d$ | ND$^d$ | ND$^d$ |
| AD* | C.E. D | Bis A | Bis F | 7.5 | 2,205 | Z1+ | ND$^d$ | ND$^d$ | 67 | 10,261 |
| AF* | C.E. E | Bis A | Bis F | 7.7 | 2,263 | ND$^d$ | 6,750 | 6.75 | 74 | 15,996 |
| AG* | C.E. F | Bis A | Bis A | 6.9 | 2,139 | Z3.5 | 18,250 | 18.25 | 82 | 14,619 |
| AH* | C.E. G | Bis A | Bis A | 7.7 | 2,349 | Z4 | 26,500 | 26.5 | 85 | 15,702 |
| AI* | C.E. H | Bis A | Bis A | 6.6 | 2,038 | ND$^d$ | 9,875 | 9.875 | 80 | 11,163 |
| AJ* | C.E. I | Bis A | Bis A | 6.0 | 1,861 | ND$^d$ | 9,062 | 9.062 | 80 | 10,094 |
| AK | 41 | Bis F | p-ODDP$^a$ | 5.3 | 1,853 | ND$^d$ | ND$^d$ | ND$^d$ | ND$^d$ | ND$^d$ |
| AL | 42 | m-ODDP$^a$ | m-ODDP$^a$ | 4.2 | 1,853 | ND$^d$ | ND$^d$ | ND$^d$ | ND$^d$ | 26,957 |
| AM | 43 | m-ODDP$^a$ | m-ODDP$^a$ | 3.8 | 1,713 | ND$^d$ | ND$^d$ | ND$^d$ | 9 | 18,645 |
| AN | 44 | m-ODDP$^a$ | m-EDDP$^b$ | 4.9 | 1,902 | ND$^d$ | 11,000 | 11.0 | 22 | 17,301 |
| AO | Ex. 45 | m-EDDP$^b$ | m-EDDP$^b$ | 5.3 | 1,784 | ND$^d$ | 18,000 | 18.0 | 48 | 14,526 |
| AP | Ex. 46 | Bis A | polyBis A$^f$ | 9.5 | 3,805 | ND$^d$ | 13,500 | 13.5 | 81 | 13,211 |

TABLE II-continued

| | | Resin$^a$ | | | | Viscosity | | | |
|---|---|---|---|---|---|---|---|---|---|
| Expt. No. | Resin Prep. (Ex. No.) | X Residue of | Y Residue of | Value of x | EEW | Gardner 25° C. | Cone and Plate 200° C. Cps | Pa·s | Tg °C. | MWw |
| AQ | Ex. 47 | Bis A | polyBis A$^f$ | 5.5 | 2,299 | ND$^d$ | ND$^d$ | ND$^d$ | 74.9 | 8,552 |
| AR | Ex. 48 | Bis A | polyBis A$^f$ | 4.6 | 1,945 | ND$^d$ | 4,063 | 4.063 | 72.5 | 7,037 |
| AS | Ex. 49 | Bis A | polyBis A$^f$ | 3.2 | 1,268 | ND$^d$ | 1,500 | 1.5 | 65 | 5,726 |
| AT | Ex. 50 | Bis A | polyBis A$^f$ | 2.3 | 1000 | ND$^d$ | 250 | .25 | 57 | 4,341 |
| AU | Ex. 51 | Bis A | polyBis A$^f$ | 4.8 | 2,019 | ND$^d$ | 4,750 | 4.75 | 74 | 6,824 |
| AV | Ex. 52 | polyBis A$^f$ | polyBis A$^f$ | 5.8 | 2,986 | ND$^d$ | 9,250 | 9.25 | 71 | 9,531 |
| AW | Ex. 53 | polyBis A$^f$ | polyBis A$^f$ | 4.8 | 2,515 | ND$^d$ | 9,200 | 9.2 | 78 | 10,622 |
| AX* | C.E. J | Bis F | Bis F | 7.7 | 2,139 | ND$^d$ | 7,938 | 7.938 | 65 | 36,964 |
| AY* | C.E. K | Bis F | Bis F | 7.8 | 2,150 | ND$^d$ | 6,575 | 6.575 | 64 | 29,681 |
| AZ* | C.E. L | Bis F | Bis F | 6.9 | 1,937 | ND$^d$ | 4,250 | 4.25 | 63 | 21,130 |
| BA* | C.E. M | Bis F | Bis A | 6.6 | 1,955 | ND$^d$ | 4,250 | 4.25 | 66 | 11,719 |
| BB* | C.E. N | Bis F | Bis F | 6.3 | 1,762 | ND$^d$ | 1,750 | 1.75 | 61 | 11,258 |
| BC | Ex. 54 | polyBis A$^f$ | Bis F | 13.4 | 3,872 | ND$^d$ | 21,500 | 21.5 | 77 | 21,118 |
| BD | 55 | Bis F | m-ODDP$^a$ | 5.3 | 1,861 | ND$^d$ | ND$^d$ | ND$^d$ | ND$^d$ | ND$^d$ |
| BE | 56 | m-ODDP$^a$ | p-ODDP$^a$ | 3.6 | 1,593 | ND$^d$ | ND$^d$ | ND$^d$ | ND$^d$ | ND$^d$ |
| BF | C.E. O | Bis F | Bis A | 6.5 | 1911 | ND$^d$ | ND$^d$ | ND$^d$ | ND$^d$ | ND$^d$ |
| BG | C.E. P | Bis A | Bis A | 6.6 | 2057 | ND$^d$ | ND$^d$ | ND$^d$ | ND$^d$ | ND$^d$ |

Footnotes to Table II.
*Not an example of the present invention.
$^a$ODDP = (octylenedioxy)diphenol.
$^b$EDDP = (ethylenedioxy)diphenol.
$^c$BDDP = (butylenedioxy)diphenol. Bis F = Bisphenol F.
$^d$Not determined.
$^e$Actual value not determined since the product was not soluble in methylene chloride, the solvent employed in the method for determining the EEW. The value 2000 was the target EEW.
$^f$Polybisphenol A was poly(bisphenol A) ether of ethylene glycol.
$^g$Theoretical value based on the target EEW of 2000.

EXAMPLE 57

Preparation of Coatings

Some of the advanced resins were formulated into coating compositions employing the following procedures.

COATING PROCEDURE I FOR ADVANCED EPOXY RESIN PREPARED BY REACTING THE DIGLYCIDYL ETHER OF BISPHENOL A WITH p-(OCTYLENEDIOXY)DIPHENOL PREPARED IN EXAMPLE 19

Four solutions of copolymer epoxy resin and METHYLON TM 75108 were prepared to give 25% total solids in an 80/20 by weight blend of 2-butoxyethanol/-cyclohexanone. The amount of METHYLON TM 75108 (a mixture of the allyl ethers of mono-, di-, and tri-methylol phenols commercially available from BTL Specialty Resins Corp.) curing agent was adjusted to comprise 2.5, 5.0, 10.0 and 20.0 weight percent based on total solids. To each solution was added an amount of BYK TM 361 (a proprietary acrylic copolymer flow modifier available from BYK Chemie USA) and 85% phosphoric acid sufficient to comprise 0.05 and 0.30 weight percent, respectively, based on total solids. These four, acidified solutions were then shaken 24 hours at room temperature and used as stock solutions. To a portion of each stock solution was added an additional amount of 85% phosphoric acid sufficient to comprise a total phosphoric acid content of 0.50 weight percent based on total solids. To a second portion of each solution was added an additional amount of 85% phosphoric acid sufficient to comprise a total phosphoric acid content of 0.75 weight percent based on total solids. Finally, to a third portion of each stock solution was added an additional amount of 85% phosphoric acid to comprise a total phosphoric acid content of 1.00 weight percent based on total solids. The three portions of each stock solution were then shaken at least 24 hours at room temperature before applying to a tin free steel substrate with a #16 wire wound drawdown bar and baking at 400° F. (204.4° C.) for 10 or 20 minutes. The properties of the cured coatings are given in Table III.

COATING PROCEDURE II FOR AN ADVANCED EPOXY RESIN PREPARED BY REACTING THE DIGLYCIDYL ETHER OF BISPHENOL A WITH p-(BUTYLENEDIOXY)DIPHENOL PREPARED IN EXAMPLE 11

Three stock solutions of epoxy resin and METHYLON TM 75108 were prepared to give 30 to 34% total solids in a blend of 80/20 2-butoxyethanol/cyclohexanone (Gardner G viscosity at 25° C.). The amount of METHYLON TM 75108 had been adjusted to comprise 2.5, 5.0, and 10.0 weight percent solids. To a portion of each stock solution was added an amount of BYK TM 361 (a proprietary acrylic copolymer flow modifier available from BYK Chemie USA) and 85% phosphoric acid sufficient to comprise 0.05 and 0.30 weight percent, respectively, based on total solids. To a second portion of each stock solution was added an amount of BYK TM 361 flow modifier and 85% phosphoric acid sufficient to comprise 0.05 and 0.50 weight percent, respectively, based on total solids. To a third portion of each stock solution was added an amount of BYK TM 361 flow modifier and 85% phosphoric acid sufficient to comprise 0.05 and 0.75 weight percent, respectively, based on total solids. To a fourth portion of each stock solution was added an amount of BYK TM 361 flow modifier and 85% phosphoric acid sufficient to comprise 0.05 and 1.00 weight percent, respectively, based on total solids. The portions were then shaken at least 24 hours at room temperature before applying to tin free steel with a wire wound drawdown bar and baking at 400° F. (204.4° C.) for 10 or 20 minutes in a Blue M forced air electric oven. The properties of the cured coatings are given in Table III.

COATING PROCEDURE III

The advanced resins prepared in Examples 16, 17, 18, and 19 and Comparative Experiments A, B, F, and G were formulated into coating compositions employing the following procedure.

The advanced epoxy resin and METHYLON TM 75108 (a mixture of the allyl ethers of mono-, di-, and tri-methylol phenols commercially available from BTL Specialty Resins Corp.) were dissolved in an 80/20 blend of 2-butoxyethanol and cyclohexanone respectively to give a 28 to 36.8% total solids solution. The amount of METHYLON TM 75108 curing agent was adjusted to comprise 10.0, 13.6, 14.0, or 20.0% by weight based on the total solids, then the solution was diluted with more of the solvent blend if needed to attain a Gardner G viscosity at 25° C. To the solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 0.30, 0.75, or 1.00% by weight based on total solids. These acidified solutions were then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE IV

The advanced resins prepared in Examples 21 and 27 and the advanced resin D.E.R. TM 667 (an advanced resin having an EEW of 1767 prepared by reacting a diglycidyl ether of bisphenol A with bisphenol A) were formulated into coating compositions employing the following procedure.

Four solutions of advanced epoxy resin and METHYLON TM 75108 (a mixture of the allyl ethers of mono-, di-, and tri-methylol phenols commercially available from BTL Specialty Resins Corp.) were prepared in an 80/20 by weight blend of 2-butoxyethanol and cyclohexanone respectively to give solutions 20 to 37.8% total solids. The amount of METHYLON TM 75108 curing agent was adjusted to comprise 2.5, 5.0, 10.0, or 20.0% by weight based on the total solids. To each solution was added an amount of BYK TM 361 (a proprietary acrylic copolymer flow modifier available from BYK Chemie USA) sufficient to comprise 0.05% by weight based on total solids, then each solution was divided into four portions and an amount of 85% phosphoric acid sufficient to comprise 0.43, 0.64, 0.85, and 1.3% by weight based on total solids respectively. These acidified solutions were then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE V

The advanced epoxy resin and METHYLON TM 75108 (a mixture of the allyl ethers of mono-, di-, and tri-methylol phenols commercially available from BTL Specialty Resins Corp.) were dissolved in a 60/40 blend by weight of 2-butoxyethanol and cyclohexanone respectively to give a solution 19 to 25% total solids. The amount of METHYLON TM 75108 curing agent was adjusted to comprise 20.0% by weight based on the total solids. To the solution was added an amount of BYK TM 361 (a proprietary acrylic copolymer flow modifier available from BYK Chemie USA) sufficient to comprise 0.05% by weight based on total solids, and an amount of 85% phosphoric acid sufficient to comprise 1.0% by weight based on total solids. The acidified solution was then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE VI

The advanced epoxy resin and METHYLON TM 75108 (a mixture of the allyl ethers of mono-, di-, and tri-methylol phenols commercially available from BTL Specialty Resins Corp.) were dissolved in an 80/20 blend by weight of 2-butoxyethanol and cyclohexanone respectively to give a solution 32% total solids. The amount of METHYLON TM 75108 curing agent was adjusted to comprise 20.0% by weight based on the total solids, then the solution was diluted with more of the solvent blend if needed to attain a Gardner G viscosity at 25° C. To the solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 1.00% by weight based on total solids. The acidified solution was then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE VII

The advanced epoxy resin and METHYLON TM 75108 (a mixture of the allyl ethers of mono-, di-, and tri-methylol phenols commercially available from BTL Specialty Resins Corp.) were dissolved in 2-butoxyethanol give a solution of 33% total solids. The amount of METHYLON TM 75108 curing agent was adjusted to comprise 20.0% by weight based on the total solids, then the solution was divided into five portions and to each portion was added an amount of BYK TM 361 (a proprietary acrylic copolymer flow modifier available from BYK Chemie USA) sufficient to comprise 0.05% by weight based on total solids. To each of four of the portions was added an amount of 85% phosphoric acid sufficient to comprise 0.3%, 0.5%, 0.75%, and 1.00% respectively by weight based on total solids. The solutions were then shaken at least 24 hours at room temperature before applying to tin free steel with a wire wound drawdown bar and baking at 400° F. (204.4° C.) for 10, 15, and 20 minutes in a Blue M forced air electric oven to give a cured coating thickness of 0.2 mils. The properties are given in Table III.

COATING PROCEDURE VIII

The advanced epoxy resin was dissolved in an 80/20 blend by weight of 2-butoxyethanol and cyclohexanone respectively and the % by weight solids were adjusted over a range of 25.5 to 32% to give a solution with viscosity of Gardner G at 25° C. To a portion of the solution was added an amount of METHYLON TM 75108 (a mixture of the allyl ethers of mono-, di-, and tri-methylol phenols commercially available from BTL Specialty Resins Corp.) curing agent to comprise 2.5, 5, 10, 15, or 20.0% by weight based on the total solids. Then to each solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 0.5 or 0.75% by weight based on total solids. The solutions were then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE IX

The advanced epoxy resin was dissolved in an 80/20 blend by weight of 2-butoxyethanol and cyclohexanone respectively and the % by weight solids were adjusted over a range of 27.25 to 32% to give a solution with viscosity of Gardner G-H at 25° C. To a portion of the solution was added an amount of METHYLON TM 75108 (a mixture of the allyl ethers of mono-, di-, and tri-methylol phenols commercially available from BTL Specialty Resin Corp.) curing agent to comprise 2.5, 5, 10, or 15% by weight based on the total solids. Then to each solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 0.5 or 1.0% by weight based on total solids. The solutions were then shaken at least 24 hours at room temperature before applying to tin free steel with a wire wound drawdown bar and baking at 400° F. (204.4° C.) for 10 and 20 minutes in a Blue M forced air electric oven to give a cured coating thickness of 0.2 mils. The properties are given in Table III.

COATING PROCEDURE X

The advanced epoxy resin was dissolved in a 60/40 blend by weight of 2-butoxyethanol and cyclohexanone respectively to give a solution 15% by weight total solids. To a portion of the solution was added an amount of METHYLON TM 75108 (a mixture of the allyl ethers of mono-, di-, and tri-methylol phenols commercially available from BTL Specialty Resins Corp.) curing agent to comprise 5, 10, or 15% by weight based on the total solids. Then to each solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 0.75% by weight based on total solids. The solutions were then shaken at least 24 hours at room temperature before applying to tin free steel with a wire wound drawdown bar and baking at 400° F. (204.4° C.) for 10 minutes in a Blue M forced air electric oven to give a cured coating thickness of 0.2 mils. The properties are given in Table III.

COATING PROCEDURE XI

Stock solutions of epoxy resin and METHYLON TM 75108 (a mixture of the allyl ethers of mono-, di-, and tri-methylol phenols commercially available from BTL Specialty Resins Corp.) were prepared in a blend of 2-butoxyethanol and cyclohexanone in a range of ratios by weight from 100/0 to 60/40 respectively, to give a 20% to 40% solids solution. The amount of METHYLON TM 75108 curing agent was adjusted to comprise 2.5, 5.0, 10.0, 13.6, 14.0, 15.0, or 20.0% by weight based on the total solids, then the solution was diluted with more of the solvent blend if needed to attain a Gardner G viscosity at 25° C. To each solution was added an amount of BYK TM 361 (a proprietary acrylic copolymer flow modifier available from BYK Chemie USA) sufficient to comprise 0.05% by weight based on total solids and an amount of 85% phosphoric acid sufficient to comprise 0.30, 0.50, 0.75, 1.00, or 1.50% by weight based on total solids. These acidified solutions were then shaken at least 24 hours at room temperature before applying to tin free steel with a wire wound drawdown bar and baking at 400° F. (204.4° C.) for 10 or 15 or 20 minutes in a Blue M forced air electric oven.

TABLE III

METHYL ETHYL KETONE RESISTANCE and FLEXIBILITY | ADHESIVE and IMPACT STRENGTH

| Experiment | Resin Prep. (Ex. No.) | CM | % H₃PO₄ | % CA | Cure Time min. | Coating Thickness mil | Coating Thickness mm | MEK Res. (DR) | 1/16 in. (1.59 mm) Wedge Bend (mm fail) | 1/8 in. (3.175 mm) Wedge Bend (mm fail) | Tg (°C.) | Coating Thickness mil | Coating Thickness mm | T-PEEL Dry/Wet (Kg/5 mm) | Reverse Impact in-lbs | Reverse Impact Kg-cm |
|---|---|---|---|---|---|---|---|---|---|---|---|---|---|---|---|---|
| BH | 19 | I | 0.30 | 2.5 | 10 | .17 | .0043 | <5 | 9.1 | — | — | — | — | — | — | — |
| BI* | R1ᵍ | IV | 0.43 | 2.5 | 10 | .19 | .0048 | <5 | 55.6 | — | — | .17 | .0043 | 2.5/2.9 | <40 | <46 |
| BJ | 21 | IV | 0.43 | 2.5 | 10 | .19 | .0048 | <5 | 0 | — | — | .2 | .0051 | 0.6/.31 | 160+ | 184+ |
| BK | 18 | II | 0.50 | 2.5 | 10 | .22 | .0056 | <5 | 9.3 | — | 56.8 | — | — | — | — | — |
| BL | 19 | I | 0.50 | 2.5 | 10 | .17 | .0043 | <5 | 6.4 | — | — | — | — | — | — | — |
| BM* | R1ᵍ | IV | 0.64 | 2.5 | 10 | .18 | .0046 | <5 | 19.9 | — | — | .18 | .0046 | 4.4/0.4 | 85-90 | 98-104 |
| BN | 21 | IV | 0.64 | 2.5 | 10 | .18 | .0046 | <5 | 0 | — | — | .19 | .0048 | 3.5/2.5 | 160+ | 184+ |
| BO | 18 | II | 0.75 | 2.5 | 10 | .14 | .0036 | <5 | 10.0 | — | 57.0 | — | — | — | — | — |
| BP | 19 | I | 0.75 | 2.5 | 10 | .22 | .0056 | <5 | 0 | — | — | — | — | — | — | — |
| BQ | 54 | VIII | 0.75 | 2.5 | 10 | .20 | .0051 | <5 | 0 | — | — | — | — | — | — | — |
| BR* | R1ᵍ | IV | 0.85 | 2.5 | 10 | .19 | .0048 | 10-15 | 9.3 | — | — | .18 | .0046 | 3.5/0.1 | 120-125 | 138-144 |
| BS | 21 | IV | 0.85 | 2.5 | 10 | .18 | .0046 | 5-10 | 0 | — | — | .19 | .0048 | 4.6/1.2 | 160+ | 184+ |
| BT | 18 | II | 1.0 | 2.5 | 10 | .15 | .0038 | 5-10 | 5.7 | — | 59.3 | — | — | — | — | — |
| BU | 19 | I | 1.0 | 2.5 | 10 | .20 | .0051 | 10-15 | 0 | — | — | — | — | — | — | — |
| BV | 27 | IX | 1.0 | 2.5 | 10 | .19 | .0048 | 5-10 | 0 | — | — | — | — | — | — | — |
| BW* | R1ᵍ | IV | 1.3 | 2.5 | 10 | .23 | .0058 | 10-15 | 14.3 | — | — | .17 | .0043 | 1.8/0.1 | 130-135 | 150-156 |
| BX | 21 | IV | 1.3 | 2.5 | 10 | .18 | .0046 | 5-10 | 0 | — | — | .18 | .0046 | 3.6/0.9 | 155-160 | 179-184 |
| BY* | R1ᵍ | IV | 0.43 | 5 | 10 | .19 | .0048 | <5 | 32.1 | — | — | .18 | .0046 | 2.2/3.9 | <40 | <46 |
| BZ | 21 | IV | 0.43 | 5 | 10 | .18 | .0046 | <5 | 0 | — | — | .19 | .0048 | 0.9/3.8 | 160+ | 184+ |
| CA | 27 | IV | 0.42 | 5 | 10 | .20ⁱ | .0051ⁱ | <5 | 0 | — | — | .18 | .0046 | — | 125-130 | 144-150 |
| CB* | C.E.H | IX | .5 | 5 | 10 | .19 | .0048 | <5 | 4.6 | — | — | — | — | — | — | — |
| CC* | C.E.I | IX | .5 | 5 | 10 | .21 | .0053 | <5 | 3.9 | — | — | — | — | — | — | — |
| CD* | R1ᵍ | IX | .5 | 5 | 10 | .22 | .0056 | <5 | 100 | — | — | — | — | — | — | — |
| CE* | C.E.A | IX | .5 | 5 | 10 | .19 | .0048 | <5 | 8.0 | — | 56.5 | — | — | — | — | — |
| CF | 18 | II | 0.50 | 5.0 | 10 | .15 | .0038 | 5-10 | 9.8 | — | — | — | — | — | — | — |
| CG | 19 | I | 0.50 | 5.0 | 10 | .19 | .0048 | <5 | 7.9 | — | — | — | — | — | — | — |
| CH | 27 | IX | 0.50 | 5.0 | 10 | .20 | .0051 | <5 | 0 | — | 47.7 | — | — | — | — | — |
| CI | 54 | VIII | 0.50 | 5.0 | 10 | .20 | .0051 | 10-15 | 0 | — | — | — | — | — | — | — |
| CJ* | R1ᵍ | IV | 0.64 | 5.0 | 10 | .18 | .0046 | 5-10 | 5.4 | — | — | .17 | .043 | 5.1/2.1 | 115-120 | 132-138 |
| CK | 21 | IV | 0.64 | 5.0 | 10 | .18 | .0046 | <5 | 0 | — | — | .19 | .048 | 3.5/2.0 | 155-160 | 179-184 |
| CL* | R1ᵍ | VIII | 0.75 | 5.0 | 10 | .17 | .0043 | 5-10 | 14.6 | — | — | — | — | — | — | — |
| CM* | R1ᵍ | VIII | 0.75 | 5.0 | 10 | .21 | .0053 | 10-25 | 19.9 | — | — | — | — | 5/2.25 | — | — |
| CN* | R1ᵍ | VIII | 0.75 | 5.0 | 10 | .21 | .0053 | <5 | 13.4 | — | — | — | — | 3.5/2.0 | — | — |
| CO | 18 | II | 0.75 | 5.0 | 10 | .14 | .0036 | 10-15 | 0 | — | 58.8 | — | — | — | — | — |
| CP | 19 | I | 0.75 | 5.0 | 10 | .20 | .0051 | 10-15 | 17.5 | — | — | — | — | — | — | — |
| CQ | 46 | VIII | 0.75 | 5.0 | 10 | .20 | .0051 | <5 | 40 | — | — | — | — | — | — | — |
| CR | 48 | VIII | 0.75 | 5.0 | 10 | .26 | .0066 | 20-25 | 0 | — | — | — | — | — | — | — |
| CS | 45 | X | 0.75 | 5.0 | 10 | .21 | .0053 | 5-10 | 0 | — | — | — | — | — | — | — |
| CT | 44 | VIII | 0.75 | 5.0 | 10 | .20 | .0051 | 10-15 | 14.4 | — | 75 | — | — | — | — | — |
| CU* | C.E.J | VIII | 0.75 | 5.0 | 10 | .22 | .0056 | 20-25 | 11.5 | — | 74 | — | — | — | — | — |
| CV* | C.E.I | VIII | 0.75 | 5.0 | 10 | .17 | .0043 | 5-10 | 10.6 | — | 76 | — | — | — | — | — |
| CW* | C.E.M | VIII | 0.75 | 5.0 | 10 | .23 | .0058 | 20-25 | 10.6 | — | 84 | — | — | — | — | — |
| CX | 54 | VIII | 0.75 | 5.0 | 10 | .20 | .0051 | <5 | 11.5 | — | 85.1 | — | — | — | — | — |
| CY | 52 | VIII | 0.75 | 5.0 | 10 | .17 | .0043 | 5-10 | 5.6 | — | 83.4 | — | — | — | — | — |
| CZ | 53 | VIII | 0.75 | 5.0 | 10 | .18 | .0046 | 10-15 | 15.1 | — | — | — | — | — | — | — |
| DA* | R1ᵍ | IV | 0.85 | 5.0 | 10 | .19 | .0048 | 10-15 | — | — | — | .16 | .0041 | 4.1/1.5 | 145-150 | 167-173 |

TABLE III-continued

METHYL ETHYL KETONE RESISTANCE and FLEXIBILITY / ADHESIVE and IMPACT STRENGTH

| Experiment | Resin Prep. (Ex. No.) | CM[f] | % H₃PO₄[h] | % CA[a] | Cure Time min. | Coating Thickness mil | Coating Thickness mm | MEK Res. (DR) | 1/16 in. (1.59 mm)[c] Wedge Bend[b] (mm fail) | 1/8 in. (3.175 mm)[d] Wedge Bend[b] (mm fail) | Tg[e] (°C.) | Coating Thickness mil | Coating Thickness mm | T-PEEL Dry/Wet (Kg/5 mm) | Reverse Impact in.-lbs | Reverse Impact Kg-cm |
|---|---|---|---|---|---|---|---|---|---|---|---|---|---|---|---|---|
| DB | 21 | IV | 0.85 | 5.0 | 10 | .18 | .0046 | 5-10 | 0 | — | — | .19 | .0048 | 4.3/1.6 | 155-160 | 179-184 |
| DC | 18 | II | 1.00 | 5.0 | 10 | .14 | .0036 | 15-20 | 7.2 | — | 60.3 | — | — | — | — | — |
| DD | 19 | I | 1.0 | 5 | 10 | .20 | .0051 | 10-15 | 7.1 | — | — | — | — | — | — | — |
| DE | 27 | IX | 1.0 | 5 | 10 | .20 | .0051 | 5-10 | 0 | — | 50.1 | — | — | — | — | — |
| DF* | R1[g] | IV | 1.3 | 5 | 10 | .18 | .0046 | 10-15 | 18.5 | — | — | .16 | .0041 | 3.5/1.0 | 130-135 | 150-156 |
| DG | 21 | IV | 1.3 | 5 | 10 | .20 | .0051 | 15-20 | 3.8 | — | — | .19 | .0048 | 4.0/1.8 | 155-160 | 179-184 |
| DH* | C.E.B | III | 0.3 | 10 | 10 | .20[j] | .0051[j] | <5 | 13.4 | 6.3 | — | — | — | — | — | — |
| DI | 19 | I | 0.3 | 10 | 10 | .19 | .0048 | <5 | 9.8 | 0 | 51.0 | — | — | — | — | — |
| DJ | 19 | III | 0.3 | 10 | 10 | .20[j] | .0051[j] | <5 | — | — | — | — | — | — | — | — |
| DK* | R1[g] | IV | 0.43 | 10 | 10 | .19 | .0048 | <5 | 17.9 | — | — | .27 | .0069 | 4.6/4.1 | <40 | <46 |
| DL | 21 | IV | 0.43 | 10 | 10 | .19 | .0048 | 5-10 | 0 | — | — | .19 | .0048 | 4.3/3.5 | 150-155 | 173-179 |
| DM* | C.E.H | IX | 0.5 | 10 | 10 | .19 | .0048 | 5-10 | 11.6 | — | — | — | — | — | — | — |
| DN* | C.E.I | IX | 0.5 | 10 | 10 | .20 | .0051 | 10-15 | 11.8 | — | — | — | — | — | — | — |
| DO* | R1[g] | IX | 0.5 | 10 | 10 | .23 | .0058 | 10-15 | 15.0 | — | — | — | — | — | — | — |
| DP* | C.E.A | II | 0.50 | 10 | 10 | .20 | .0051 | 5-10 | 15.1 | — | — | — | — | — | — | — |
| DQ | 16 | I | 0.50 | 10 | 10 | .17 | .0043 | 10-15 | 0 | — | 56.5 | — | — | — | — | — |
| DR | 17 | I | 0.50 | 10 | 10 | .20 | .0051 | 15-20 | 6.4 | — | — | — | — | — | — | — |
| DS | 27 | IX | 0.50 | 10 | 10 | .19 | .0048 | <5 | 0 | — | — | — | — | — | — | — |
| DT* | R1[g] | IV | 0.64 | 10 | 10 | .19 | .0048 | 10-15 | 17.9 | — | — | .26 | .0066 | 5.1/3.1 | 125-130 | 144-150 |
| DU | 21 | IV | 0.64 | 10 | 10 | .19 | .0048 | 10-15 | 0 | — | — | .19 | .0048 | 5.2/2.8 | 155-160 | 179-184 |
| DV* | R1[g] | VIII | 0.75 | 10 | 10 | .22 | .0056 | 10-15 | 12.6 | — | — | — | — | — | — | — |
| DW* | R1[g] | VIII | 0.75 | 10 | 10 | .20 | .0051 | 15-20 | 13.9 | — | — | — | — | — | — | — |
| DX* | R1[g] | VIII | 0.75 | 10 | 10 | .19 | .0048 | 20-25 | 16.1 | — | — | — | — | — | — | — |
| DY* | R3[k] | VIII | 0.75 | 10 | 10 | .21 | .0053 | 25-50 | 13.9 | — | — | — | — | — | — | — |
| DZ* | R1[g] | VIII | 0.75 | 10 | 10 | .21 | .0053 | 10-15 | 13.9 | — | — | — | — | — | — | — |
| EA* | R1[g] | VIII | 0.75 | 10 | 10 | .20 | .0051 | 15-20 | 13.5 | — | — | — | — | — | — | — |
| EB* | R1[g] | VIII | 0.75 | 10 | 10 | .22 | .0056 | 20-25 | 10.3 | — | 71.8 | — | — | — | — | — |
| EF | 16 | II | 0.75 | 10 | 10 | .17 | .0043 | 25-50 | 11.6 | — | 60.3 | — | — | — | — | — |
| EG | 18 | II | 0.75 | 10 | 10 | .22 | .0056 | 15-20 | 0 | — | — | — | — | — | — | — |
| EH | 21 | VIII | 0.75 | 10 | 10 | .19 | .0048 | 10-15 | 0 | — | — | — | — | — | — | — |
| EI | 21 | VIII | 0.75 | 10 | 10 | .22 | .0056 | 15-20 | 0 | — | 64.4 | — | — | — | — | — |
| EJ | 17 | VIII | 0.75 | 10 | 10 | .20 | .0051 | 20-25 | 4.5 | — | — | — | — | — | — | — |
| EK | 17 | VIII | 0.75 | 10 | 10 | .20 | .0051 | 25-50 | 6.8 | — | — | — | — | — | — | — |
| EL | 19 | I | 0.75 | 10 | 10 | .20 | .0051 | 20-25 | 0 | — | — | — | — | — | — | — |
| EM | 19 | VIII | 0.75 | 10 | 10 | .21 | .0053 | 5-10 | 0 | — | — | — | — | — | — | — |
| EN | 19 | VIII | 0.75 | 10 | 10 | .21 | .0053 | 10-15 | 0 | — | — | — | — | — | — | — |
| EO | 27 | VIII | 0.75 | 10 | 10 | .19 | .0048 | 10-15 | 0 | — | — | — | — | — | — | — |
| EP | 45 | X | 0.75 | 10 | 10 | .21 | .0053 | 25-50 | 0 | — | — | — | — | 5/1.25 | — | — |
| EQ | 44 | X | 0.75 | 10 | 10 | .22 | .0056 | 10-15 | 1.7 | — | — | — | — | 2.75/.75 | — | — |
| ER | 43 | X | 0.75 | 10 | 10 | .21 | .0053 | 20-25 | 8.5 | — | — | — | — | 2.25/.75 | — | — |
| ES | 46 | VIII | 0.75 | 10 | 10 | .21 | .0053 | 10-15 | 12.6 | — | 92.0 | — | — | — | — | — |
| ET | 48 | VIII | 0.75 | 10 | 10 | .21 | .0053 | 5-10 | 17.9 | — | 84.4 | — | — | — | — | — |
| EU* | C.E.J | VIII | 0.75 | 10 | 10 | .22 | .0056 | 25-50 | 16.0 | — | — | — | — | — | — | — |
| EV* | C.E.L | VIII | 0.75 | 10 | 10 | .20 | .0051 | 25-50 | 17.8 | — | — | — | — | — | — | — |
| EW* | C.E.M | VIII | 0.75 | 10 | 10 | .25 | .0064 | 20-25 | 11.3 | — | — | — | — | — | — | — |
| EX | 54 | VIII | 0.75 | 10 | 10 | .20 | .0051 | 25-50 | 10.5 | — | — | — | — | — | — | — |

TABLE III-continued

| | | | | | | METHYL ETHYL KETONE RESISTANCE and FLEXIBILITY | | | | | | ADHESIVE and IMPACT STRENGTH | | | | | |
|---|---|---|---|---|---|---|---|---|---|---|---|---|---|---|---|---|---|
| | | | | | | | | 1/16 in. (1.59 mm)$^c$ | ⅛ in. (3.175 mm)$^d$ | | | Coating Thickness | | T-PEEL Dry/Wet | Reverse Impact | | |
| Experiment | Resin Prep. (Ex. No.) | CM$^f$ | % H$_3$PO$_4{}^h$ | % CA$^a$ | Cure Time min. | Coating Thickness mil | mm | MEK Res. (DR) | Wedge Bend$^b$ (mm fail) | Wedge Bend (mm fail) | Tg$^e$ (°C.) | mil | mm | (Kg/5 mm) | in.-lbs | Kg-cm |
| EY | 52 | VIII | 0.75 | 10 | 10 | .17 | .0043 | 5-10 | 13.4 | — | 85.4 | — | — | — | — | — |
| EZ | 53 | VIII | 0.75 | 10 | 10 | .19 | .0048 | 5-10 | 13.3 | — | 83.7 | — | — | — | — | — |
| FA* | R1$^g$ | IV | 0.85 | 10 | 10 | .19 | .0048 | 15-20 | 19 | — | — | .26 | .0066 | 5.5/2.5 | 125-130 | 144-150 |
| FB | 21 | IV | 0.85 | 10 | 10 | .19 | .0048 | 10-15 | 0 | — | — | .19 | .0048 | 4.0/2.5 | 155-160 | 179-184 |
| FC* | C.E.B | III | 1.0 | 10 | 10 | .20 | .0051$^j$ | 25-50 | 0 | 9.5 | — | — | — | — | — | — |
| FD | 18 | II | 1.0 | 10 | 10 | .15 | .0038 | 20-25 | 0 | — | — | — | — | — | — | — |
| FE | 19 | I | 1.0 | 10 | 10 | .20 | .0051$^j$ | 25-50 | 10.9 | — | 58.5 | — | — | — | — | — |
| FG | 19 | III | 1.0 | 10 | 10 | .20 | .0051$^j$ | 25-50 | — | 7.3 | — | — | — | — | — | — |
| FH | 27 | IX | 1.0 | 10 | 10 | .19 | .0048 | 10-15 | 2.6 | — | 52.8 | — | — | — | — | — |
| FI* | R1$^g$ | IV | 1.3 | 10 | 10 | .19 | .0048 | 25-50 | 31.6 | — | — | .25 | .0064 | 4.4/.08 | 120-125 | 138-144 |
| FJ | 21 | IV | 1.3 | 10 | 10 | .19 | .0048 | 20-25 | 13.9 | — | — | .20 | .0051 | 3.6/1.8 | 145-150 | 167-173 |
| FK* | C.E.A | III | 1.0 | 13.6 | 10 | .20 | .0051$^j$ | 75-100 | — | 15 | — | — | — | — | — | — |
| FL* | R1$^g$ | III | 1.0 | 13.6 | 10 | .20 | .0051$^j$ | 15-20 | 29.5 | 18.9 | 79.8 | — | — | — | — | — |
| FM | 16 | III | 1.0 | 13.6 | 10 | .20 | .0051$^j$ | 50-75 | — | 16.2 | — | — | — | — | — | — |
| FN | 18 | III | 1.0 | 13.6 | 10 | .20 | .0051$^j$ | 25-50 | — | 7.0 | — | — | — | — | — | — |
| FO | 17 | III | 1.0 | 13.6 | 10 | .20 | .0051$^j$ | 25-50 | — | 14.0 | — | — | — | — | — | — |
| FP | 27 | III | 1.0 | 13.6 | 10 | .20 | .0051$^j$ | 10-15 | 11.5 | 10.4 | — | — | — | — | — | — |
| FQ | 19 | III | 1.0 | 13.6 | 10 | .20 | .0051$^j$ | 20-25 | 10.9 | 4.0 | — | — | — | — | — | — |
| FR* | C.E.G | III | 1.0 | 14 | 10 | .20 | .0051$^j$ | 75-100 | — | 15 | — | — | — | — | — | — |
| FS* | R1$^g$ | IX | 0.5 | 15 | 10 | .23 | .0058 | 10-15 | 14.8 | — | — | — | — | — | — | — |
| FT* | C.E.H | IX | 0.5 | 15 | 10 | .21 | .0053 | 5-10 | 14.9 | — | — | — | — | — | — | — |
| FU* | C.E.I | IX | 0.5 | 15 | 10 | .21 | .0053 | 15-20 | 17.5 | — | — | — | — | — | — | — |
| FV* | C.E.A | IX | 0.5 | 15 | 10 | .19 | .0048 | 5-10 | 22.4 | — | — | — | — | — | — | — |
| FW | 27 | IX | 0.5 | 15 | 10 | .21 | .0053 | 5-10 | 0 | — | — | — | — | — | — | — |
| FX* | R1$^g$ | VIII | 0.75 | 15 | 10 | .21 | .0053 | 25-50 | 20.4 | — | — | — | — | — | — | — |
| FY* | R1$^g$ | VIII | 0.75 | 15 | 10 | .22 | .0056 | 25-50 | 14.6 | — | — | — | — | — | — | — |
| FZ* | R1$^g$ | VIII | 0.75 | 15 | 10 | .26 | .0066 | 25-50 | 20.3 | — | — | — | — | — | — | — |
| GA | 46 | VIII | 0.75 | 15 | 10 | .19 | .0048 | 25-50 | 22.9 | — | 96.4 | — | — | — | — | — |
| GB | 48 | VIII | 0.75 | 15 | 10 | .19 | .0048 | 10-15 | 21.0 | — | 84.9 | — | — | — | — | — |
| GC | 45 | X | 0.75 | 15 | 10 | .23 | .0058 | 25-50 | 0 | — | 58 | — | — | 2/.75 | — | — |
| GD | 44 | X | 0.75 | 15 | 10 | .24 | .0061 | 15-20 | 2.3 | — | 35 | — | — | 1.25/.5 | — | — |
| GE | 43 | X | 0.75 | 15 | 10 | .22 | .0056 | 20-25 | 13.3 | — | <20 | — | — | — | — | — |
| GF* | C.E.J | VIII | 0.75 | 15 | 10 | .23 | .0058 | 25-50 | 15.3 | — | — | — | — | — | — | — |
| GG* | C.E.L | VIII | 0.75 | 15 | 10 | .19 | .0048 | 25-50 | 25.6 | — | — | — | — | — | — | — |
| GH* | C.E.M | VIII | 0.75 | 15 | 10 | .26 | .0066 | 25-50 | 13.4 | — | — | — | — | — | — | — |
| GI | 54 | VIII | 0.75 | 15 | 10 | .19 | .0048 | 50-75 | 22.1 | — | 88.3 | — | — | — | — | — |
| GJ | 52 | VIII | 0.75 | 15 | 10 | .20 | .0051 | 20-25 | 12.8 | — | 87.3 | — | — | — | — | — |
| GK | 53 | VIII | 0.75 | 15 | 10 | .22 | .0056 | 20-25 | 10.1 | — | — | — | — | — | — | — |
| GL* | R2$^i$ | VII | 0 | 20 | 10 | .18 | .0046 | <5 | — | 100 | — | — | — | — | — | — |
| GM* | C.E.B | III | 0.3 | 20 | 10 | .20 | .0051$^j$ | <5 | — | 10.2 | — | — | — | — | — | — |
| GN* | R2$^i$ | VII | 0.30 | 20 | 10 | .18 | .0046 | <5 | — | 11.4 | — | — | — | — | — | — |
| GO | 19 | I | 0.30 | 20 | 10 | .19 | .0048 | <5 | 3.6 | 0 | 52.7 | — | — | — | — | — |
| GP | 19 | III | 0.30 | 20 | 10 | .20 | .0051$^j$ | 5-10 | 22.9 | — | — | — | — | — | — | — |
| GQ* | R1 | IV | 0.43 | 20 | 10 | .21 | .0053 | 5-10 | 5.8 | — | — | .24 | .0061 | 4.4/1.8 | 125-130 | 144-150 |
| GR | 21 | IV | 0.43 | 20 | 10 | .19 | .0048 | 5-10 | — | 10.9 | — | .21 | .0053 | 4.8/3.0 | 160+ | 184 |
| GS* | R2$^i$ | VII | 0.50 | 20 | 10 | .18 | .0046 | 5-10 | — | — | — | — | — | — | — | — |

TABLE III-continued

METHYL ETHYL KETONE RESISTANCE and FLEXIBILITY | | | | | | | | | | | ADHESIVE and IMPACT STRENGTH | | | |
|---|---|---|---|---|---|---|---|---|---|---|---|---|---|---|---|

| Experiment | Resin Prep. (Ex. No.) | CM[f] | % H$_3$PO$_4$[h] | % CA[a] | Cure Time min. | Coating Thickness mil | Coating Thickness mm | MEK Res. (DR) | 1/16-in. (1.59 mm)[c] Wedge Bend[b] (mm fail) | ⅛ in. (3.175 mm)[d] Wedge Bend[b] (mm fail) | Tg[e] (°C.) | Coating Thickness mil | Coating Thickness mm | T-PEEL Dry/Wet (Kg/5 mm) | Reverse Impact in.-lbs | Reverse Impact Kg-cm |
|---|---|---|---|---|---|---|---|---|---|---|---|---|---|---|---|---|
| GT | 19 | I | 0.50 | 20 | 10 | .19 | .0048 | 5–10 | 7.6 | — | — | — | — | — | — | — |
| GU* | R1 | IV | 0.64 | 20 | 10 | .19 | .0048 | 15–20 | 28.5 | — | — | .23 | .0058 | 5.2/0.9 | 120–125 | 138–144 |
| GV | 21 | IV | 0.64 | 20 | 10 | .20 | .0051 | 5–10 | 15.0 | — | — | .21 | .0053 | 3.8/2.5 | 145–150 | 167–173 |
| GW* | R1[g] | VIII | 0.75 | 20 | 10 | .20 | .0051 | 50–75 | 25 | — | — | — | — | — | — | — |
| GX* | R1[g] | VIII | 0.75 | 20 | 10 | .19 | .0048 | 25–50 | 23.1 | — | — | — | — | — | — | — |
| GY* | R2[j] | VII | 0.75 | 20 | 10 | .18 | .0046 | 15–20 | — | 14.3 | — | — | — | — | — | — |
| GZ | 19 | I | 0.75 | 20 | 10 | .20[j] | .0051[j] | 25–50 | 18.1 | — | — | — | — | — | — | — |
| HA* | C.E.J | VIII | 0.75 | 20 | 10 | .21 | .0053 | 75–100 | 20.1 | — | 83 | — | — | — | — | — |
| HB* | C.E.L | VIII | 0.75 | 20 | 10 | .20 | .0051 | 50–75 | 32.9 | — | 80 | — | — | — | — | — |
| HC* | C.E.M | VIII | 0.75 | 20 | 10 | .25 | .0064 | 25–50 | 20.3 | — | 87 | — | — | — | — | — |
| HD | 54 | — | 0.85 | 20 | 10 | .20 | .0051 | 75–100 | 27.0 | — | 93 | — | — | — | — | — |
| HE* | R1[g] | IV | 0.85 | 20 | 10 | .19 | .0048 | 50–75 | 39.3 | — | — | .23 | .0058 | 3.5/0.4 | 100–105 | 115–121 |
| HF | 21 | IV | 0.85 | 20 | 10 | .20 | .0051 | 20–25 | 20.5 | — | — | .21 | .0053 | 2.2/0.6 | 140–145 | 161–167 |
| HG* | R2[j] | VII | 1.0 | 20 | 10 | .18 | .0046 | 75–100 | 38.4 | 12.9 | — | — | — | — | — | — |
| HH* | C.E.P | V | 1.0 | 20 | 10 | .20 | .0051 | 20–25 | — | 19 | — | — | — | — | — | — |
| HI* | C.E.C | XI | 1.0 | 20 | 10 | .20 | .0051 | 50–75 | — | 21.0 | — | — | — | — | — | — |
| HJ* | C.E.B | XI | 1.0 | 20 | 10 | .22 | .0056 | 75–100 | 28.5 | 20.5 | — | — | — | — | — | — |
| HK* | C.E.B | III | 1.0 | 20 | 10 | .20[j] | .0051[j] | 100–125 | — | 23.3 | — | .22 | .0056 | — | 140–150 | 161–173 |
| HL* | C.E.F | VI | 1.0 | 20 | 10 | .20[j] | .0051[j] | 100–125 | 35.0 | 20.5 | — | — | — | — | — | — |
| HM* | C.E.F | III | 1.0 | 20 | 10 | .20[j] | .0051[j] | 100–125 | — | 12 | — | — | — | — | — | — |
| HN* | C.E.D | XII | 1.0 | 20 | 10 | .20[j] | .0051[j] | 125–150 | — | 17.4 | — | — | — | — | — | — |
| HO* | C.E.E | VI | 1.0 | 20 | 10 | .20[j] | .0051[j] | 75–100 | 19.3 | 25.0 | — | — | — | — | — | — |
| HP | 16 | XI | 1.0 | 20 | 10 | .21 | .0053 | 100–125 | 34.4 | 25.0 | 79.4 | — | — | — | — | — |
| HQ | 17 | VI | 1.0 | 20 | 10 | .20 | .0051 | 50–75 | 20.7 | 13.2 | — | — | — | — | — | — |
| HR | 18 | VI | 1.0 | 20 | 10 | .20[j] | .0051[j] | 25–50 | 20.4 | — | 65.0 | — | — | — | — | — |
| HS | 16 | I | 1.0 | 20 | 10 | .20[j] | .0051[j] | 25–50 | — | 15.5 | — | — | — | — | — | — |
| HT | 19 | III | 1.0 | 20 | 15 | .25 | .0064 | 25–50 | 21.4 | — | — | — | — | — | — | — |
| HU* | C.E.O | V | 1.0 | 20 | 15 | .22 | .0056 | 5–10 | 22.3 | — | — | — | — | — | — | — |
| HV | 41 | V | 1.0 | 20 | 15 | .22 | .0056 | 10–15 | 26.6 | — | — | — | — | — | — | — |
| HW | 55 | V | 1.0 | 20 | 15 | .20 | .0051 | 5–10 | 14.3 | — | — | — | — | — | — | — |
| HX | 35 | V | 1.0 | 20 | 20 | .18 | .0046 | <5 | 9.4 | — | — | — | — | — | — | — |
| HY | 32 | V | 1.0 | 20 | 20 | .19 | .0048 | 5–10 | 9.8 | — | — | — | — | — | — | — |
| HZ | 31 | IV | 1.0 | 20 | 20 | .21 | .0053 | 50–75 | 38.3 | — | 58.1 | — | — | — | — | — |
| IA* | R1[g] | IV | 1.3 | 20 | 20 | .20 | .0051 | 25–50 | 30.4 | — | — | .23 | .0058 | 0.1/0.0 | 90–95 | 104–109 |
| IB | 21 | VII | 1.3 | 20 | 20 | .18 | .0046 | <5 | — | 100 | — | .21 | .0053 | 0.4/0.1 | 135–140 | 156–161 |
| IC* | R2[j] | VII | 0 | 2.5 | 15 | .19 | .0048 | <5 | — | 8.5 | — | — | — | — | — | — |
| ID* | R2[j] | VII | 0.3 | 2.5 | 15 | .19 | .0048 | 5–10 | — | 8.4 | — | — | — | — | — | — |
| IE* | R2[j] | VII | 0.5 | 2.5 | 15 | .19 | .0048 | 5–10 | — | 15.4 | — | — | — | — | — | — |
| IF* | R2[j] | VII | 0.75 | 2.5 | 15 | .18 | .0046 | 20–25 | — | 17.8 | — | — | — | — | — | — |
| IG* | R2[j] | VII | 1.0 | 2.5 | 20 | .19 | .0048 | 100–125 | — | — | — | — | — | — | — | — |
| IH | 19 | I | 0.3 | 2.5 | 20 | .21 | .0053 | <5 | 3.6 | — | — | — | — | — | — | — |
| II | 18 | I | 0.5 | 2.5 | 20 | .20 | .0051 | <5 | 6.7 | — | — | — | — | — | — | — |
| IJ | 19 | II | 0.50 | 2.5 | 20 | .14 | .0036 | 5–10 | 1.4 | — | — | — | — | — | — | — |
| IK | 18 | I | 0.75 | 2.5 | 20 | .20 | .0051 | 15–20 | 0 | — | — | — | — | — | — | — |
| IL | 19 | II | 0.75 | 2.5 | 20 | .15 | .0038 | 5–10 | 0 | — | 61.9 | — | — | — | — | — |
| IM | 18 | II | 1.00 | 2.5 | 20 | — | — | 5–10 | 0 | — | — | — | — | — | — | — |

TABLE III-continued

| Experiment | Resin Prep. (Ex. No.) | CM[f] | % H₃PO₄[h] | % CA[a] | Cure Time min. | Coating Thickness mil | Coating Thickness mm | MEK Res. (DR) | 1/16 in. (1.59 mm)[c] Wedge Bend[b] (mm fail) | 1/8 in. (3.175 mm)[d] Wedge Bend[b] (mm fail) | Tg[e] (°C.) | Coating Thickness mil | Coating Thickness mm | T-PEEL Dry/Wet (Kg/5 mm) | Reverse Impact in.-lbs | Reverse Impact Kg-cm |
|---|---|---|---|---|---|---|---|---|---|---|---|---|---|---|---|---|
| IN | 19 | I | 1.00 | 2.5 | 20 | .19 | .0048 | 20-25 | 1.8 | — | — | — | — | — | — | — |
| IO | 27 | IX | 1.00 | 2.5 | 20 | .20[j] | .0051[j] | 5-10 | 0 | — | — | — | — | — | — | — |
| IP | 18 | II | 0.50 | 5.0 | 20 | .15 | .0038 | 10-15 | 0 | — | — | — | — | — | — | — |
| IQ | 19 | I | 0.50 | 5.0 | 20 | .19 | .0048 | 15-20 | 2.8 | — | — | — | — | — | — | — |
| IR | 18 | II | 0.50 | 5.0 | 20 | .16 | .0041 | 10-15 | 3.8 | — | — | — | — | — | — | — |
| IS | 19 | I | 0.75 | 5.0 | 20 | .19 | .0048 | 15-20 | 0 | — | — | — | — | — | — | — |
| IT | 18 | II | 0.75 | 5.0 | 20 | .21 | .0053 | 15-20 | 3.8 | — | — | — | — | — | — | — |
| IU | 19 | I | 1.00 | 5.0 | 20 | .18 | .0046 | 20-25 | 7.9 | — | — | — | — | — | — | — |
| IV | 27 | IX | 1.00 | 5.0 | 20 | .20 | .0051 | 5-10 | 0 | — | — | — | — | — | — | — |
| IW | 19 | I | 1.00 | 5 | 20 | .18 | .0046 | 5-10 | 8.9 | — | — | — | — | — | — | — |
| IX | 18 | II | 0.30 | 10 | 20 | .16 | .0041 | 20-25 | 2.3 | — | — | — | — | — | — | — |
| IY | 19 | I | 0.50 | 10 | 20 | .19 | .0048 | 15-20 | 6.4 | — | — | — | — | — | — | — |
| IZ | 27 | IX | 0.50 | 10 | 20 | .21 | .0053 | 5-10 | 0 | — | — | — | — | — | — | — |
| JA | 18 | II | 0.75 | 10 | 20 | .18 | .0046 | 20-25 | 2.0 | — | — | — | — | — | — | — |
| JB | 19 | I | 0.75 | 10 | 20 | .18 | .0046 | 15-20 | 5.0 | — | — | — | — | — | — | — |
| JC | 18 | II | 1.00 | 10 | 20 | .19 | .0048 | 20-25 | 13.3 | — | — | — | — | — | — | — |
| JD | 19 | I | 1.00 | 10 | 20 | .20 | .0051 | 25-50 | 18.1 | — | — | — | — | — | — | — |
| JE | 27 | IX | 0.50 | 15 | 20 | .20 | .0051 | 5-10 | 9.5 | — | — | — | — | — | — | — |
| JF* | R2[i] | VII | 0.00 | 20 | 20 | .19 | .0048 | <5 | — | 100 | — | — | — | — | — | — |
| JG* | R2 | VII | 0.30 | 20 | 20 | .18 | .0046 | <5 | — | 9.6 | — | — | — | — | — | — |
| JH | 19 | I | 0.30 | 20 | 20 | .18 | .0046 | 5-10 | 4.1 | — | — | — | — | — | — | — |
| JI* | R2[i] | VII | 0.50 | 20 | 20 | .18 | .0046 | 5-10 | — | 11.6 | — | — | — | — | — | — |
| JJ | 19 | I | 0.50 | 20 | 20 | .18 | .0046 | 5-10 | 10.9 | — | — | — | — | — | — | — |
| JK* | R2[i] | VII | 0.75 | 20 | 20 | .18 | .0048 | 25-50 | — | 14.0 | — | — | — | — | — | — |
| JL | 19 | I | 0.75 | 20 | 20 | .19 | .0048 | 20-25 | 15.4 | — | — | — | — | — | — | — |
| JM* | R2[i] | VII | 1.00 | 20 | 20 | .19 | .0048 | — | — | 20.9 | — | — | — | — | — | — |
| JN* | C.E.P | V | 1.00 | 20 | 20 | .19 | .0048 | 25-30 | 42.1 | — | — | — | — | — | — | — |
| JO | 19 | I | 1.00 | 20 | 20 | .19 | .0048 | 25-50 | 26.8 | — | — | — | — | — | — | — |
| JP | 35 | V | 1.00 | 20 | 20 | .20 | .0051 | 20-25 | 13.8 | — | — | — | — | — | — | — |
| JQ | 32 | V | 1.00 | 20 | 20 | .18 | .0046 | 15-20 | 17.8 | — | — | — | — | — | — | — |
| JR | 31 | V | 1.00 | 20 | 20 | .25 | .0064 | 10-15 | 13.8 | — | — | — | — | — | — | — |
| JS* | C.E.O | V | 1.00 | 20 | 20 | .24 | .0061 | 75-100 | 28.5 | — | — | — | — | — | — | — |
| JT | 41 | V | 1.00 | 20 | 20 | .23 | .0058 | 10-15 | 23.9 | — | — | — | — | — | — | — |
| JU | 55 | V | 1.00 | 20 | 20 | .20 | .0051 | 15-20 | 29.0 | — | — | — | — | — | — | — |

Footnotes to Table III.
*Not an example of the present invention.
[a]Amount of curing Agent.
[b]Average of 4 samples.
[c]Diameter of Wedge Bend at the less strained end was 1/16 inch (1.59 mm).
[d]Diameter of Wedge Bend at the less strained end was 1/8 inch (3.18 mm).
[e]Glass transition temperature of coating as determined by thermomechanical analysis (TMA).
[f]Coating Method.
[g]The diglycidyl ether of bisphenol A advanced with bisphenol A, the resultant advanced resin having an EEW of 1767.
[h]The amount of 85 percent phosphoric acid.
[i]The diglycidyl ether of bisphenol A advanced with bisphenol A, the resultant advanced resin having an EEW of 1702.
[j]+/− 0.02 mils (+/− 0.000508 mm).
[k]The diglycidyl ether of bisphenol A advanced with bisphenol A, the resultant advanced resin having an EEW of 3018.

EXAMPLE 58

Preparation of Aqueous Dispersion

The advanced epoxy resin from Example 22 with an epoxide equivalent weight of 2087 (97.4 grams, 0.0468 equivalents) and 25.00 grams (0.212 moles) of 2-butoxyethanol were added to a four neck 500 milliliter round bottom flask equipped with a means for temperature control, stirring by means of a steel stirrer shaft, condensing and reactant addition under a nitrogen purge of 96 milliliters per minute. The epoxy resin was slowly dissolved by heating between 123° C. and 138° C. for a period of 34 minutes. During this time period, the nitrogen adapter which had no dip leg was replaced with one having a three inch dip leg. Then the resin was cooled to 85° C. In a two ounce (59 ml) bottle was mixed, 21.35 grams (1.19 moles) deionized water, 4.29 grams (0.035 mole) nicotinamide and 4.01 grams (0.038 mole) of an aqueous solution of 85 percent % lactic acid. This solution was then added to the previous mixture dropwise over a period of 36 minutes while maintaining the reaction temperature between 80° C. and 85° C. The resultant mixture was stirred between 90° C. and 92° C. for an additional 129 minutes. Then 198.9 grams deionized water was added to the gray reactor contents over a seventeen minute period while maintaining the reaction temperature between 88° C. and 90° C. The white aqueous dispersion with a non-volatile content of 30 percent by weight and charge density of 0.33 milliequivalent/gram resin was allowed to cool to ambient temperature with stirring. The pH of the stable aqueous dispersion was 4.4. The viscosity which was measured with a No. 4 Ford Cup was 25.5 seconds. The volatile organic content of the dispersion was 1.80 pounds per gallon (216 grams/liter).

EXAMPLE 59

Preparation of Coatings

Coatings were prepared by blending 46.53 grams of the aqueous dispersion prepared in Example 58, with 0.761 grams of CYMEL TM 325 (a highly methylated melamine-formaldehyde resin having a Gardner-Holdt viscosity at 25° C. of X-$Z_1$ commercially available from the American Cyanamid Co.) as a curing agent to give a formulation containing 5.4 parts per hundred parts of resin by weight (phr) CYMEL TM 325. The formulation was applied to degreased 24 gauge×4 inches×12 inches (0.66 mm×101.6 mm×304.8 mm) unpolished clean-treated cold rolled steel panels and degreased 7.5 mils×4.5 inches×9.0 inches (0.19 mm×114.3 mm×228.6 mm) tin free steel panels with a No. 16 wire wound rod according to ASTM D 4147-82. The panels were degreased by washing the panels with Aromatic 100 (a light aromatic solvent containing primarily $C_{8-10}$ aromatic hydrocarbons commercially available from Exxon Company, USA) followed by washing with acetone and drying in an oven at 400° F. for ten minutes. The coated panels were baked in an oven at 400° F. (204.4° C.) for 10 minutes. The thickness of the coating was between 0.21 and 0.26 mils (0.0053 mm and 0.0066 mm). The results are given in Table IV.

EXAMPLE 60

Preparation of Coating

Coatings were prepared by blending 51.26 grams of the aqueous dispersion prepared in Example 58, with 1.58 grams of CYMEL TM 325 as a curing agent to give a formulation containing 10.2 phr CYMEL TM 325. The formulation was applied and cured as described in Example 59. The thickness of the coating was between 0.20 and 0.23 mils (0.0051 mm and 0.0058 mm).

EXAMPLE 61

Preparation of Coating

Coatings were prepared by blending 51.48 grams of the aqueous solution prepared in Example 58, with 2.32 grams of CYMEL TM 325 as a curing agent to give a formulation containing 15.0 phr CYMEL TM 325. The formulation was applied and cured as described in Example 59. The thickness of the coating was between 0.23 and 0.27 mils (0.0058 mm and 0.0068 mm). The results are given in Table IV.

EXAMPLE 62

Preparation of Coating

Coating were prepared by blending 49.62 grams of the aqueous solution prepared in Example 58, with 2.98 grams of CYMEL TM 325 as a curing agent to give a formulation containing 20.1 phr CYMEL TM 325. The formulation was applied and cured as described in Example 59. The thickness of the coating was between 0.20 and 0.25 mils (0.0051 mm and 0.0064 mm). The results are given in Table IV.

EXAMPLE 63

Preparation of Coating

Coatings were prepared by blending 47.02 grams of the aqueous dispersion prepared in Example 58, with 3.53 grams of CYMEL TM 325 as a curing agent to give a formulation containing 25.3 phr CYMEL TM 325. The formulation was applied and cured as described in Example 59. The thickness of the coating was between 0.22 and 0.26 mils (0.0056 mm and 0.0066 mm). The results are given in Table IV.

EXAMPLE 64

Preparation of Coating

Coatings were prepared in Example 46.42 grams of the aqueous dispersion prepared in Example 58, with 1.16 grams of CYMEL TM 325 as a curing agent to give a formulation containing 10.0 phr CYMEL TM 325. The formulation was applied as described in Example 59. However, the coated panels were baked in an oven at 400° F. (204.4° C.) for 20 minutes. The thickness of the coating was between 0.26 mils and 0.31 mils (0.0066 mm and 0.0079 mm). The results are given in Table IV.

COMPARATIVE EXPERIMENT Q

A bisphenol A based epoxy resin having an expoxide equivalent weight of 1755 (100.0 grams, 0.0570 equivalents) and 25.66 grams (0.217 moles) of ethylene glycol n-butyl ether were added to a reactor of the type described in Example 58. The epoxy resin was slowly dissolved by heating between 122° C. and 139° C. thirty-seven minutes under a nitrogen purge of 96 milliliters per minute. During this time period, the nitrogen adapter having no dip leg was replaced with one having a three inch dip leg. Then the resin was cooled to 70° C. In a two ounce bottle was mixed 25.70 grams deionized water (1.43 moles), 5.24 grams nicotinamide (0.0429 mole) and 4.85 grams of an aqueous solution of 85 percent % lactic acid (0.0458 mole). This solution was then added dropwise over a period of thirty-two minutes while maintaining the reaction temperature between 70° C. and 82° C. The mixture was stirred between 88° C. and 90° C. for an additional 125 minutes. Then 228.6 grams deionized water was added to the yellow reactor contents over a nineteen minute period while maintaining the reaction temperature at 88° C. The yellow aqueous dispersion with a non-volatile content of 28 percent and charge density of 0.39 milliequivalent/gram resin was allowed to cool to ambient temperature with stirring. The pH of the stable aqueous dispersion was 5.5. The viscosity which was measured with a Ford Cup No. 4 was 13.4 seconds. The volatile organic content of the dispersion was 1.79 pounds per gallon (214 grams/liter).

EXAMPLE 65

Preparation of Coating

Coatings were prepared by blending 21.02 grams of the aqueous dispersion prepared in Example 58, 18.798 grams of the aqueous dispersion prepared in Comparative Experiment Q, with 1.10 grams of CYMEL TM 325 as a curing agent to give a formulation containing 10.5 phr CYMEL TM 325. The formulation was applied and cured as described in Example 59. The thickness of the coating was between 0.18 mils and 0.21 mils (0.0046 mm and 0.0053 mm). The results are given in Table IV.

TABLE IV

| Base Dispersion | Curing Agent phr | MEK Resistance DR | FLEXIBILITY | | | WATER PASTEURIZATION | |
|---|---|---|---|---|---|---|---|
| | | | T-Bend | Rev. Impact In-Lb | J | Adhesion | Blush |
| Ex. 28 | 5.4 | 9 | T2 | 112 | 12.6 | 5A/5A | B1 |
| Ex. 29 | 10.2 | 25 | T2 | 88 | 9.9 | 5A/5A | B1 |
| Ex. 30 | 15.5 | 25 | T3 | 76 | 8.6 | 5A/5A | B1 |
| Ex. 31 | 20.2 | 15 | T3 | 44 | 5.0 | 5A/4A | B1 |
| Ex. 32 | 25.3 | 15 | T5 | 28 | 3.2 | 5A/5A | B6 |
| Ex. 33 | 10.0 | 80 | T2 | 100 | 11.3 | 5A/5A | B1 |
| Ex. 34 | 10.5 | 50 | T2 | 96 | 10.8 | 5A/5A | B1 |

ELECTRODEPOSITION COATINGS

Preparation of Crosslinker A

Into a five liter round bottom flask equipped with a condenser, mechanical stirrer, nitrogen inlet, addition funnel and a thermometer was charged 1610.6 grams (12.88 equiv) of Methylene-di-phenylene di-isocyanate (MDI) and 1301 g of MIBK. The isocyanate was 48 percent % of the 2,4 isomer and had an equivalent weight of 125. The mixture was heated to about 60 deg C at which time 1.6 g (0.1 wt percent %) of T-12 catalyst was added. While maintaining the temperature between 60 and 70 deg C, 210 g of a mixture of polypropylene glycols (1.288 equiv of di-propylene glycol and 1.288 equiv of tri-propylene glycol) was added over a period of 25 minutes through the addition funnel. Next 1216 grams (10.31 equiv) of Dowanol EB (Ethylene Glycol Butyl Ether) was added over a period of 80 minutes. The mixture was maintained at 70 deg C for an additional 90 minutes at which time an Infrared spectrum was taken to assure no free isocyanate. The resulting blocked isocyanate was 70 percent % non-volatile.

Preparation of Surfactant A

In a 500 ml beaker a slurry was made by adding 80 grams of Geigy Amine C (Imidazoline) to 222.3 grams of D.I. water. Then 14.7 g of Acetic Acid and 105 g of Dowanol EB was added. The solution was then heated until it turned clear. Then 80 g of melted Surfynol 104 was added and the mixture was heated to 75 deg C. When the solution again turned clear, it was cooled down and filtered through a 25 micron bag filter bag. The resulting surfactant was approximately 40 percent % non-volatile.

EXAMPLE 66

Into a one liter round bottom flask equipped with a mechanical stirrer, condenser, nitrogen inlet, and a thermometer was charged 132 g (0.7 equiv) of the diglycidyl ether of bisphenol A, (having an epoxide equivalent weight of 188.7), 198.2 g (0.58 equiv) of a product which was substantially the diglycidyl ether of an adduct of 3.4 moles of propylene oxide and one mole of bisphenol A (Epoxide equivalent weight of 341.3, prepared by treating the adduct of bisphenol A and propylene oxide with epichlorohydrin in the presence of lewis acid catalyst, followed by treatment with sodium hydroxide), and 109.8 g (0.88 equiv) of 1,2-bis(3-hydroxyphenoxy)ethane prepared as in Example 1. The mixture was heated to 85° C. and 0.23 g of a 70 percent % solution of ethyltriphenyl phosphonium phosphate in methanol was added as a catalyst. The mixture was heated to 175° C. and allowed to exotherm to 185° C. The temperature was maintained at 175° C. for an additional hour. The epoxide equivalent weight of the advanced resin was 1125. The resin was cooled to 100° C. and 169.8 g of methyl isobutyl ketone was added. At 90° C., 43.3 g (0.41 equiv) of 2-(methylamino)ethanol was added and allowed to react with the epoxy for one hour at a temperature between 95° and 100° C. The solution was then cooled to room temperature and the non-volatile content was measured at 73.7 percent %.

An aqueous dispersion was prepared by combining 285 grams of the above resin solution, 165 g of Crosslinker A (70 percent % non-volatile), 13.0 g of propylene glycol phenyl ether, 4.2 g of Surfactant A, and 12.8 g of lactic acid solution (73.5 percent %) into a suitable reaction vessel. The mixture was stirred very rapidly as 537 grams of D.I. water was added in a dropwise fashion over a 90 minute period. The resultant aqueous dispersion was then stripped of methyl isobutyl ketone solvent to yield a dispersion of about 32 percent solids.

The dispersion was then pigmented with a commercial ED-4 pigment paste to a pigment/binder ratio of 0.25. The final bath had a non-volatile content of 20 percent.

COMPARATIVE EXPERIMENT R

Into a Two liter round bottom flask equipped with a mechanical stirrer, condenser, nitrogen inlet, and a thermometer was charged 313.3 g (1.6 equiv.) of the Diglycidyl ether of bisphenol A, (having an epoxide equivalent weight of 188.7), 234.2 g (2.07 equiv) of Bisphenol A, and 450.5 g (1.32 equiv) of a product which was substantially the diglycidyl ether of an adduct of 3.4 moles of propylene oxide and one mole of bisphenol A (Epoxide equivalent weight of 341.3, prepared by treating the adduct of Bisphenol A and propylene oxide with epichlorohydrin in the presence of Lewis acid catalyst, followed by treatment with sodium hydroxide). The mixture was heated to 85° C. and 1.22 g of a 70 percent % solution of ethyltriphenyl phosphonium phosphate in methanol was added as a catalyst. The mixture was heated to 175° C. and allowed to exotherm to 185° C. The temperature was maintained at 175° C. for an additional hour. The epoxide equivalent weight of the advanced resin was 1050. The resin was cooled to 110° C. and 366.7 g of methyl isobutyl ketone (MIBK) was added. At 90° C. 100 g (0.95 equiv) of 2-(methylamino)ethnaol was added and allowed to react with the epoxy for 45 minutes at a temperature between 95° and 100° C. The solution was then cooled to room temperature and the non-volatile content was measured at 74.0 percent %.

An aqueous dispersion was prepared by combining 285 g of the above resin solution, 165 g of Crosslinker A (70 percent % non-volatile), 13.1 g of propylene glycol phenyl ether, 4.2 g of Surfactant A, and 13.1 g of lactic acid solution (73.5 percent %) into a suitable reaction vessel. The mixture was stirred very rapidly as 540.7 g of D.I. water was added in a dropwise fashion over a period of 90 minutes. The resultant aqueous dispersion was then stripped of methyl isobutyl ketone solvent to yield a dispersion of about 32 percent solids.

The dispersion was then pigmented with a commercial ED-4 pigment paste to a pigment/binder ratio of 0.25. The final bath had a non-volatile content of 20 percent.

The following Table V contains physical properties of the coatings from Example 66 and Comparative Experiment R.

TABLE V

|  |  | Example 66 | Comp. Expt. R* |
|---|---|---|---|
| Thickness (250 v) | | | |
| | , mils | 1.2 | 1.1 |
| | , mm | 0.031 | 0.028 |
| G. M. SCAB CORROSION | | | |
| (Bonderite 40), mm | | 1.8 | 2.0 |
| (Bare Steel), mm | | 9.6 | 15.8 |
| Tg$^a$, °C. | | 81.6 | 96.5 |
| Flexibility 1/16" (1.59 mm) Wedge Bend, mm of failure | | 8.0 | 9.0 |
| Throwpower (275 v) | | | |
| | , in. | 11.9 | 11.3 |
| | , cm | 30.2 | 28.7 |
| Chip Resistance | | 35.8 | 41.2 |

*Not an example of the present invention.
$^a$Determined by DSC.

The data in Table V showed that by substituting an alkylenedioxydiphenol in place of a bisphenol, the resultant coatings exhibit improved chip resistance, throwpower, flexibility, corrosion resistance and the like.

EXAMPLE 67

Into a 1 liter round bottom flask equipped with a condenser, a thermometer, nitrogen inlet, and a mechanical stirrer was charged 334.5 grams (1.77 equiv) of the diglycidyl ether of bisphenol A (having an EEW of 188.7), and 165.5 g (1.33 equiv) of 1,2-bis(3-hydroxyphenoxy)ethane prepared as in Example 1. The mixture was heated to 100° C. and 0.31 g of a 70 percent % solution of ethyltriphenyl phosphonium phosphate in methanol was added as a catalyst. The mixture was heated to 150° C. and allowed to exotherm to 185° C. The temperature was maintained at 175 for 20 minutes and the epoxide equivalent weight was 1155. The mixture was cooled to 110° C. and 181 g of methyl isobutyl ketone was added. At 75° C. 45.5 g of 2-(methylamino)ethanol was added and allowed to react with the epoxy for 80 minutes. The solution was then cooled to room temperature and the non-volatile content was measured at 77.3 percent %.

An aqueous dispersion was prepared by combining 275 grams of the above resin solution, 167.1 g of Crosslinker A, 13.2 g of propylene glycol phenyl ether, 4.3 g of Surfactant A, and 12.1 g of lactic acid (73.5 percent % non-volatile) in a suitable reaction vessel. The mixture was stirred very rapidly as 558 g of D.I. water was added dropwise over a period of 90 minutes. The resulting aqueous dispersion was then stripped of methyl isobutyl ketone solvent to yield a dispersion of about 32 percent solids.

The dispersion was then pigmented with a commercial ED-4 pigment paste to a pigment/binder ratio of 0.25/1. The final bath had a non-volatile content of 20 percent.

COMPARATIVE EXPERIMENT S

Into a one liter round bottom flask equipped with a condenser, nitrogen inlet, thermometer, and mechanical stirrer was charged 341.6 grams (1.81 equiv) of the diglycidyl ether of bisphenol A (Epoxide equivalent weight of 188.7) and 158.4 grams (1.39 equiv) of Bisphenol A. The mixture was heated to 95° C. and 0.96 g of a 70 percent % solution of ethyltriphenyl phosphonium phosphate was added as a catalyst. The mixture was heated to 150° C. and allowed to exotherm to 194° C. The temperature was then maintained at 175° C. for an additional 40 minutes at which time the percent % epoxy was at 3.55 percent %. The solution was cooled and 223.5 g of methyl isobutyl ketone was added. At 95° C., 41.6 g (0.4 equiv) of 2-(methylamino)ethanol was added and allowed to react between 95° and 100° C. for at least an hour. The final solution was then cooled to room temperature and the non-volatile content was measured at 70.1 percent %.

An aqueous dispersion was prepared by combining 300 g of the above resin solution, 165.2 g of Crosslinker A, 13.0 g of propylene glycol phenyl ether, 4.2 g of Surfactant A, and 12.4 g of lactic acid solution (73.5 percent %) into a reaction vessel. The mixture was stirred very rapidly as 524 g of D.I. water was added in a dropwise fashion over a period of 90 minutes. The resultant aqueous dispersion was then stripped of methyl isobutyl ketone solvent to yield a dispersion of about 32 percent solids.

The dispersion was then pigmented with a commercial ED-4 pigment paste to a pigment/binder ratio of 0.25/1. The final bath had a non-volatile content of 20 percent.

The following Table VI contains physical properties of the coatings from Example 66 and Comparative Experiment R.

TABLE VI

|  |  | Example 67 | Comp. Expt. S* |
|---|---|---|---|
| Thickness (250 v) | | | |
| | , mils | 0.32 | 0.28 |
| | , mm | 0.01 | 0.01 |
| G. M. SCAB CORROSION | | | |
| (Bonderite 40), mm | | — | 3.2 |
| (Bare Steel), mm | | — | 30 |
| Tg$^a$, °C. | | 117 | 133 |
| Flexibility 1/16" (1.59 mm) Wedge Bend, mm of failure | | 25.0 | 30.0 |
| Throwpower (275 v) | | | |
| | , in. | >16 | 12.6 |
| | , cm | >40.64 | 30.2 |

TABLE VI-continued

|  | Example 67 | Comp. Expt. S* |
|---|---|---|
| Chip Resistance | — | 74 |

*Not an example of the present invention.
"Determined by DSC.

EXAMPLE 68

Into a one liter round bottom flask equipped with a condenser, thermometer, nitrogen inlet, and a mechanical stirrer was charged 134.6 grams (0.71 equiv) of the diglycidyl ether of bisphenol A (having an EEW of 188.7), and 154.6 grams (1.36 equiv) of bisphenol A, and 201.9 grams (1.09 equiv) of the diglycidyl ether of 1,2-bis(3-hydroxyphenoxy)ethane prepared as in Example 8 having an EEW of 185.5. The mixture was heated to 105° C. and 0.57 g of a 70 percent solution of ethyltriphenyl phsophonium phosphate in methanol was added as a catalyst. The mixture was heated to 150 deg C. and allowed to exotherm. The temperature was maintained at 165°-170° C. for an additional 40 minutes and the epoxide equivalent weight was analyzed to be 1115. The mixture was cooled to 110° C. and 179.1 g of methyl isobutyl ketone was added. At 85° C., 46.2 g of 2-(methylamino)ethanol was added and allowed to react with the epoxy for 60 minutes. The resin solution was then cooled to room temperature and the non-volatile content was measured at 76.0 percent.

An aqueous dispersion was prepared by combining 280 grams of the above resin solution, 167.2 grams of Crosslinker A, 13.2 g of propylene glycol phenyl ether, 4.3 g of Surfactant A, and 13.0 grams of lactic acid (73.5 percent non-volatile) in a suitable reaction vessel. The mixture was stirred very rapidly as 553 grams of D.I. water was added dropwise over a period of 90 minutes. The resulting aqueous dispersion was then stripped of methyl isobutyl ketone solvent to yield a dispersion of about 32 percent solids.

The dispersion was then pigmented with a commercial ED-4 pigment paste to a pigment/binder ratio of 0.25. The final bath had a non-volatile content of 20 percent.

The results are given in Table VII.

EXAMPLE 69

Into a 1 liter round bottom flask equipped with a condenser, thermometer, nitrogen inlet, and a mechanical stirrer was charged 100.4 grams (0.053 equiv) of the diglycidyl ether of bisphenol A having an EEW of 188.7, and 150.1 grams (0.81 equiv) of the diglycidyl ether of 1,2-bis(3-hydroxyphenoxy)ethane prepared as in Example 8 having an EEW of 185.5, and 124.7 grams (1 equiv) of 1,2-bis(3-hydroxyphenoxy)ethane prepared as in Example 1. The mixture was heated to 110° C. and 0.3 grams of a 70 percent solution of ethyltriphenyl phosphonium phosphate in methanol was added as a catalyst. The mixture was heated to 160° C. and allowed to exotherm. The temperature was then maintained between 165° and 170° C. for 30 minutes. The epoxide equivalent weight was measured at 1181. The mixture was then cooled to 120° C. and 136.2 grams of methyl isobutyl ketone was added. At 90° C., 33.3 grams of 2-(methylamino)ethanol was added and allowed to react with the epoxy for 60 minutes at a temperature between 90° and 95° C. The solution was then cooled to room temperature and the non-volatile content was measured at 75.4 percent.

An aqueous dispersion was prepared by combining 280 grams of the above resin solution, 165.9 g of Crosslinker A, 13.1 g of propylene glycol phenyl ether, 4.2 g of Surfactant A, and 12.2 g of lactic acid (73.5 percent non-volatile) in a suitable reaction vessel. The mixture was stirred very rapidly as 547 g of D.I. water was added dropwise over a period of 90 minutes. The resulting aqueous dispersion was then stripped of methyl isobutyl ketone solvent to yield a dispersion of about 32 percent solids.

The dispersion was then pigmented with a commercial ED-4 pigment paste to a pigment/binder ratio of 0.25/1. The final bath had a non-volatile content of 20 percent.

The results are given in Table VII.

TABLE VII

|  |  | Example 68 | Example 69 |
|---|---|---|---|
| Thickness (250 v) |  |  |  |
|  | , mils | 0.31 | 0.33 |
|  | , mm | 0.01 | 0.01 |
| G. M. SCAB CORROSION |  |  |  |
| (Bonderite 40), mm |  | — | 3.2 |
| (Bare Steel), mm |  | — | 30 |
| $Tg^a$, °C. |  | 147 | 101 |
| Flexibility 1/16" (1.59 mm) Wedge Bend, mm of failure |  | 19 | 14 |
| Throwpower (275 v) |  |  |  |
|  | , in. | >16 | >16 |
|  | , cm | >40.6 | >40.6 |

$^a$Determined by DSC.

TEST PROCEDURES

Epoxide Equivalent Weight (EEW)

The epoxide equivalent weight was determined by titration with perchloric acid and tetramethyl ammonium bromide by the procedure of ASTM D-1652-87.

Glass Transition Temperature (Tg)

The glass transition temperature of the resins were determined on a DuPont 912 Differential Scanning Calorimeter (DSC). The glass transition temperature of the cured coatings was determined on a DuPont 943 Thermomechanical Analyzer (TMA). The glass transition temperature of the cured coatings prepared in Examples 66-69 and comparative experiments S and R were determined by differential scanning calorimetry (DSC).

Molecular Weight

Molecular weight was determined by Gel Permeation Chromatography (GPC) on a Waters model 150-C Gel Permeation Chromatograph equipped with a Bimodal Column Set using tetrahydrofuran eluant at 1 cc/min. calibrated against polystyrene standards.

Wedge Bend

Wedge bend was determined according to a modified ASTM D3281-84 procedure, where the diameter of the bend at the less stressed end was either ⅛ inch (3.175 mm) or 1/16 inch (1.5875 mm). The bend was taped and pulled with Scotch brand 610 tape and treated with acidic copper sulfate solution to highlight the exposed metal. The results are reported as millimeters of coating failure.

Methyl Ethyl Ketone (MEK) Resistance

The resistance of the cured coating on a cold rolled steel panel to removal with methyl ethyl ketone was determined by rubbing across the baked panels a two pound ball pein hammer with the ball end covered with eight layers of cheesecloth which had been saturated with methyl ethyl ketone (MEK). No force was applied to the hammer other than that necessary to guide the hammer back and forth over the same area. A twelve inch ruler clamped into place was used to guide the hammer in the same path. The coated panels after rubbed were dipped into a mixture of 20 percent CuSO4 5H2O and 10 percent concentrated hydrochloric acid in water for 30 seconds and then dipped into deionized water to determine breakthrough. A forward and reverse stroke returning to the starting point was considered as being one MEK double rub.

T-Bend

T-bend was used as a measure of the flexibility of the coating on the panel at a slow rate of deformation. The edges of the cold rolled steel panel were cut to leave a two inch wide specimen of uniform thickness. A bend was made in the panel at approximately 0.75 inches from the end of the coated panel by using a fingerbrake. The bend was squeezed tight with the palm of the hand. Then the bent specimen was placed in a vice, which was previously taped with plastic tape to prevent scratching the substrate, and the panel was bent back on itself to form a 180 degree bend. The stressed area was then tested for adhesion by taping with Scotch 610 tape. The tape was applied in such a manner where no air bubbles were trapped under the tape. The tape was then pulled with a rapid and forceful fashion at a 90 degree angle in an attempt to pull the coating away from the substrate. Next the bend was dipped into a solution of copper sulfate (10 grams) in 1.0N hydrochloric acid for 30 seconds and then dipped into deionized water. The purpose of this step was to oxidize any resulting bare metal in order to more accurately observe adhesion failures. The specimen was examined under a magnifying glass to determine failure. The first bend was noted as T0 (T zero) because there was no panel sandwiched between the bend. The process of bending the panel by using the fingerbrake and vice was continued until there was no sign of cracking or adhesion loss. Each successive bend was noted as T1, T2, T3, T4, etc. because of the number of layers of panel sandwiched between plys. The lower the number of T-bends, the better the flexibility.

Impact Resistance

Impact resistance was a measure of the formability of a coating on a panel at a rapid rate of deformation.

Coated cold rolled steel panels were subjected to the impact of a falling weight from a Gardner Impact Tester at different calibrated heights ranging from 0 to 160 inch-pounds. The impacted area was then tested for adhesion by taping with Scotch 610 tape. The tape was applied in such a manner that no air bubbles were trapped under the tape. The tape was then pulled with a rapid and forceful fashion at a 90 degree angle in an attempt to pull the coating away from the substrate. Next, a solution of copper sulfate (10 grams) in 1.0N hydrochloric acid (90 grams) was applied to the impacted area to check for failure. The specimen was examined under a table-top illuminated magnification system with lenses having a total of 11 diopter power to determine failure.

Water Pasteurization Resistance

Water pasteurization resistance was performed on a single specimen for each coating to determine the permeability of the coating to water with pressure and heat. The coating substrate was tin free steel. The width of each specimen was about 12 centimeters while the length was about 6 centimeters. A mold and the Gardner Impacter Tester were used to form a semi-circular bend in each specimen. The semi-circular bend was used to simulate a stressed area. The dart impacter rod was dropped from 56 inch-pounds for all the specimens when forming the bend. The specimens were then placed in a Model 8100-TD NORCO Autoclave with deionized water for 90 minutes at 121° C. (250° F.) and 1 bar (15 psi) pressure. The clock was only started after both the desired temperature and pressure were reached. After the specimens were pasteurized for the prescribed conditions, the heat was turned off, the pressure bled off and the panels removed for testing. The coated specimens were submerged in deionized water after removal from the autoclave. The specimens were blotted dry after removal from the water with a paper towel. They were rated for blush and adhesion.

The tested coatings were rated for blush by placing the specimens next to the panels from which the specimens were cut. The coatings were rated for blush according to the following scale:

| Rating | Description |
| --- | --- |
| B1 | No blush |
| B2 | Dull, loss of luster |
| B3 | Total loss of luster |
| B4 | Blush, cloudy, starting to loose transparency |
| B5 | Cloudy, expanded coating, few bubbles, a little roughness |
| B6 | No longer clear, rough surface, bubbles |
| B7 | Very rough or cracked surface, many bubbles |

Adhesion was determined by using the tape test described in method A of ASTM 3359-87. The tape was Scotch 610 tape. X-cuts were made in the stressed and non-stressed areas of each specimen. The adhesion of the non-stressed specimen was listed first while the adhesion in the stressed area was listed second. The coatings were listed for adhesion according to the following scale.

Wet and Dry Adhesion

The coatings were tested for wet and dry adhesion under wet and dry conditions, using the T-peel test ASTM D1876 (1978). A wet adhesion test was performed on test panels by first immersing the test panels in 90° C. water for four days and then carrying out the T-peel test.

| Rating | Description |
| --- | --- |
| 5A | No peeling or removal |
| 4A | Trace peeling or removal along incisions. |
| 3A | Jagged removal along most of incisions up to 1/16 inch (1.6 mm) on either side |
| 2A | Jagged removal along most of the |

-continued

| Rating | Description |
|---|---|
|  | incisions up to ⅛ inch (3.2 mm) on either side |
| 1A | Removal from most of the area of the X under the tape |
| 0A | Removal beyond the area of the X |

A dry adhesion test was carried out on test panels without immersing the test panels in 90° C. water.

Throwpower

Two 18"×4" (45.72 cm×10.16 cm) phosphated panels were assembled face-to-face and parallel with a ⅜" (9.5 mm) space between them using a slotted rubber strip down each side. Only the bottom of the assembly was open for paint and current. The coatings were electrodeposited for two minutes at 275 volts at 80° F. (26.7° C.). A linear measurement of how high the coating plated on the inside of the assembly was referred to as throw, the results being indicated in the tables as throwpower.

CHIP RESISTANCE

The Chip Resistance was determined by the procedure of ASTM D3170-87 and the results were quantified using a Que-2 Image analyzer. The number recorded represents the number of chips in an 80 cm² area multiplied by the average area of each chip. The smaller the number, the better the chip resistance.

GM Scab Corrosion Test

This test was a cyclic test where the panels were scribed and subjected to 20 corrosion cycles. One cycle consists of a 24 hour period which the panels were immersed in ambient temperature 5 percent salt solution for 15 minutes followed by a room temperature drying period for one hour and 15 minutes and then placed in a humidity cabinet (60° C. and 85 percent relative humidity) for 22 hours and 30 minutes. During cycles 1, 6, 11 and 16, the panels were additionally exposed to hot and cold by placing them in an oven at 60° C. for 1 hour followed by a freezer at −10° F. (−23.9° C.) for 30 minutes. During these cycles, the total time the panels were in the humidity cabinet was 22 hours and 30 minutes. After 20 cycles, the panels were scraped to remove any loose coatings. Then the width of the scribe was measured in millimeters at ten different positions. The results are reported as the average width of the total creep. A lower number represents better corrosion resistance.

What is claimed is:

1. An acidified advanced resin comprising the product resulting from reacting a composition comprising
   (A) at least one nucleophilic compound;
   (B) at least one advanced resin comprising the product prepared by reacting
      (1) at least one diglycidyl ether of a compound containing an average of more than one but not more than two phenolic hydroxyl groups per molecule; with
      (2) at least one compound containing an average of more than one but not more than two phenolic hydroxyl groups per molecule;
   wherein components (1) and (2) are employed in amounts which provide a ratio of phenolic hydroxyl groups per epoxide group of from 0.5:1 to 0.95:1; and characterized in that at least one of the components (1) or (2) contains at least one —O—$R^1$—O— group or —(O—$CH_2$—$CHR^2$)$_n$—O— group as a bridge between two groups selected independently from the group consisting of (1) a saturated or unsaturated cycloaliphatic group, (2) an aromatic group, (3) a group represented by the formula

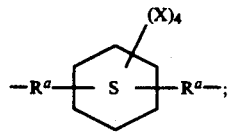

or (4) a group represented by the formula

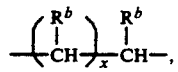

wherein each $R^a$ is independently a divalent hydrocarbyl group having from 1 to 6 carbon atoms; each $R^b$ is independently hydrogen or a monovalent hydrocarbyl group having from 1 to 6 carbon atoms; $R^1$ is a divalent hydrocarbyl group having from 1 to 36 carbon atoms; $R^2$ is hydrogen, methyl, ethyl or phenyl; each X is independently hydrogen, a halogen, —SO—$R^4$, —$SO_2$—$R^4$, —CO—$R^4$, —CO—O—$R^4$, —O—CO—$R^4$, —S—$R^4$, —O$R^4$, or —$R^4$; $R^4$ is a monovalent hydrocarbyl group having from 1 to 12 carbon atoms; n has a value from 1 to 10; and x has a value from 2 to 19; and
(C) at least one Bronsted acid.

2. An acidified advanced resin of claim 1 wherein
(a) component (A) is a monopyridine compound represented by the formulas VII-IX

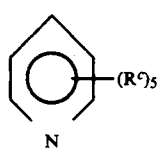

Formula VII

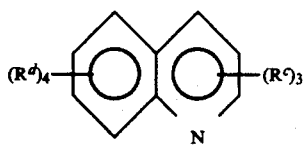

Formula VIII

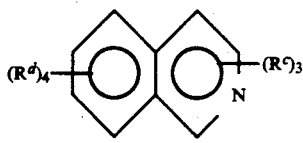

Formula IX wherein each $R^c$ and $R^d$ is independently hydrogen, a halogen atom, particularly chlorine or bromine, a hydrocarbyl or hydrocarbyloxy or a hydroxy substituted hydrocarbyl group having from 1 to 10, carbon atoms, a carbamoyl group (—CO—$NH_2$), or a hydroxyl group, a polypyridine compound represented by the formulas X-XII

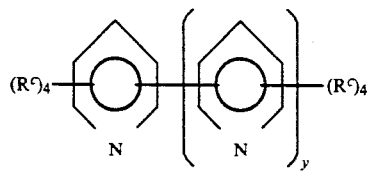

Formula X

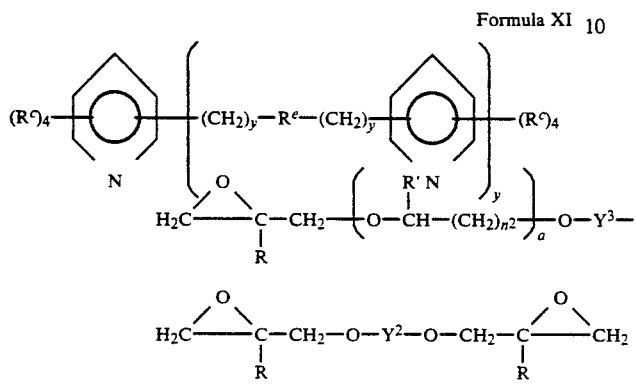

Formula XI

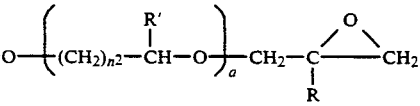

Formula IE

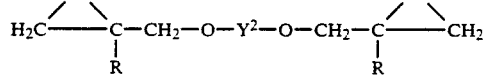

Formula II

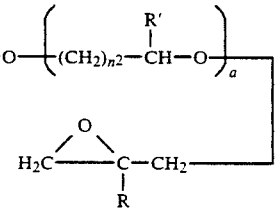

Formula III

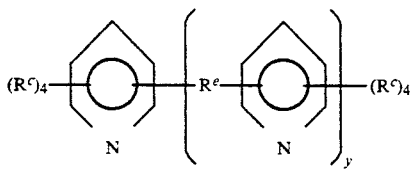

Formula XII wherein each $R^c$ is independently hydrogen, a halogen atom, particularly chlorine or bromine, a hydrocarbyl or hydrocarbyloxy or a hydroxy substituted hydrocarbyl group having from 1 to 10, preferably from 1 to 4, carbon atoms, a carbamoyl group (—CO—NH$_2$), or a hydroxyl group; each $R^{ec}$ is independently an alkyl group having from 1 to 10 carbon atoms, an amine group, a urea group, a thiourea group, a carbonyl group, —S—S— group, —S—CH$_2$—CH$_2$—S— group, —C(OH)H—CO—group, or an amide group; and each y independently has a value from 1 to 5; tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, tri-methylphosphine, triethylphosphine, tri-n-butylphosphine, trimethylamine, triethylamine, tri-n-propylamine, tri-isobutylamine, hydroxyethyldimethylamine, butyldimethylamine, trihydroxyethylamine, triphenylphosphorus, N,N,N-dimethylphenethylamine, methyldiethanolamine, dimethylethanolamine, or any combination thereof;

(b) component (B1) is a compound represented by the following formulas IE, II or III wherein each A is independently a single bond, —O—, —S—, —S—S—, —SO—, —SO$_2$—, —CO—, —O—CO—O—, —O—R$^1$—O—, —(O—CH$_2$—CHR$^2$)$_n$—O— or —R$^3$—; each R is hydrogen or a C$_1$ to C$_4$ alkyl group; each R' is independently hydrogen or an alkyl group having from 1 to 6 carbon atoms; each R$^a$ is independently a divalent hydrocarbyl group having from 1 to 6 carbon atoms; each R$^b$ is independently hydrogen or a monovalent hydrocarbyl group having from 1 to 6, carbon atoms; R$^1$ is a divalent hydrocarbyl group having from 1 to 24 carbon atoms; R$^2$ is hydrogen, methyl, ethyl or phenyl; R$^3$ is a divalent hydrocarbyl group having from 1 to 36 carbon atoms; T is —OR$^1$O— or —(O—CH$_2$—CHR$_2$—)$_n$—O—; each Y$^1$ is independently —(Q—T)$_m$—Q—; each Y$^2$ is independently —(Q—T)$_m$—Q— or —(Q'—T)$_m$—Q', or —(Q—T)$_m$—Q—(O—CH$_2$—C(OH)(R)—CH$_2$—O—(-Q—T)$_m$—Q)$_{n3}$; each Y$^3$ is independently a divalent group represented by the formulas —(Q$^1$—T)$_{m1}$—Q$^1$—,

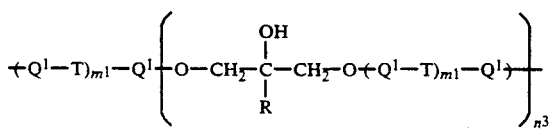

or

—(Q$^2$—T)$_{m1}$—Q$^2$—;

each X is independently hydrogen, a halogen, —SO—R⁴, —SO₂—R⁴, —CO—R⁴, —CO—O—R⁴, —O—CO—R⁴, —S—R⁴, —OR⁴ or —R⁴, wherein R⁴ is a monovalent hydrocarbyl group having from 1 to 12 carbon atoms; m has a value from zero to 25; and n has a value from 1 to 10;

(c) component (B2) is a compound represented by the following formulas IB, VIA or VIB

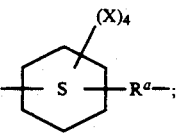

are —O—R¹—O— groups or —(O—CH₂—CHR²)ₙ—O— groups.

Formula IB

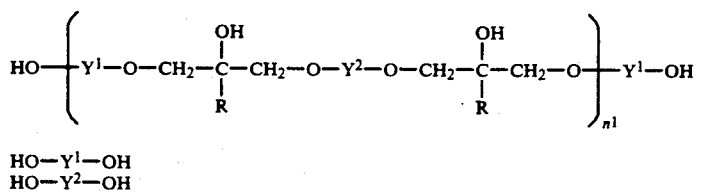

HO—Y¹—OH
HO—Y²—OH

Formula VIA
Formula VIB wherein R, Y¹, Y², and n¹ are as defined above;
(d) components (B1) and (B2) are employed in quantities which provide a ratio of phenolic hydroxyl groups to epoxide group of from 0.7:1 to 1:1; and
(e) components (A) and (B) are employed in amounts which provide a ratio of moles of nucleophilic compound per epoxide group of from 0.15 to 1.1:1;
(f) component (C) is present in an amount which provides a ratio of moles of acid per mole of nucleophilic compound of from 0.2:1 to 10:1; and
(g) at least 50 percent of the groups between two groups selected independently from the group consisting of (1) a saturated or unsaturated cycloaliphatic group, (2) an aromatic group, (3) a group represented by the formula

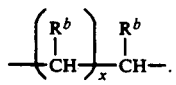

and (4) a group represented by the formula

3. An acidified advanced resin of claim 1 wherein
(a) component (A) is nicotinamide;
(b) component (B1) is a diglycidyl ether of: bisphenol A, bisphenol F, 1,8-bis(4-hydroxyphenoxy)octane, 1,2-bis(3-hydroxyphenoxy)ethane, 1,8-bis(3-hydroxyphenoxy)octane, poly(bisphenol A)ether of ethylene glycol, poly(bisphenol F)ether of ethylene glycol, the reaction product of bisphenol A with from 2 to 6 moles of propylene oxide, or any combination thereof;
(c) component (B2) is: bisphenol A, bisphenol F, 1,2-bis(3-hydroxyphenoxy)ethane, 1,4-bis(3-hydroxyphenoxy)butane, 1,8-bis(4-hydroxyphenoxy)octane, 1,8-bis(3-hydroxyphenoxy)octane, 1,4-bis(4-hydroxyphenoxy)butane, poly(bisphenol A)ether of ethylene glycol, poly(bisphenol F)ether of ethylene glycol, or any combination thereof;
(d) component (C) is lactic acid;
(e) components (B1) and (B2) are employed in quantities which provide a ratio of phenolic hydroxyl groups to epoxide group of from 0.75:1 to 0.95:1;
(f) components (A) and (B) are employed in amounts which provide a ratio of pyridine groups per epoxide group of from 0.4 to 1:1; and
(g) component (C) is present in an amount which provides a ratio of moles of acid per pyridine group of from 0.5:1 to 1.5:1.

4. An aqueous dispersion comprising an acidified advanced resin of claim 1, 2 or 3, water and a curing amount of a suitable curing agent.

5. A coating composition comprising an aqueous dispersion of claim 4.

* * * * *